(12) United States Patent
Rausch et al.

(10) Patent No.: US 9,753,767 B2
(45) Date of Patent: Sep. 5, 2017

(54) DISTRIBUTED DATA SET TASK SELECTION

(71) Applicant: SAS Institute Inc., Cary, NC (US)

(72) Inventors: Nancy Anne Rausch, Apex, NC (US); Ronald Agresta, Raleigh, NC (US); Roger Jay Barney, Fuquay-Varina, NC (US); Willem Abraham Hazejager, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/431,573

(22) Filed: Feb. 13, 2017

(65) Prior Publication Data
US 2017/0153914 A1 Jun. 1, 2017

Related U.S. Application Data

(63) Continuation-in-part of application No. 14/643,747, filed on Mar. 10, 2015, now Pat. No. 9,569,263, which is a continuation of application No. 14/643,692, filed on Mar. 10, 2015, now Pat. No. 9,223,619.

(60) Provisional application No. 62/295,538, filed on Feb. 16, 2016, provisional application No. 62/115,836, filed on Feb. 13, 2015, provisional application No.
(Continued)

(51) Int. Cl.
*G06F 9/46* (2006.01)
*G06F 9/48* (2006.01)
*G06F 17/30* (2006.01)

(52) U.S. Cl.
CPC .......... *G06F 9/4843* (2013.01); *G06F 9/4806* (2013.01); *G06F 9/4881* (2013.01); *G06F 17/30424* (2013.01); *G06F 17/30445* (2013.01)

(58) Field of Classification Search
None
See application file for complete search history.

(56) References Cited

U.S. PATENT DOCUMENTS 7,283,988 B1 * 10/2007 Peterson ............... G06F 9/5083
7,447,686 B2   11/2008 Levine
7,676,478 B2    3/2010 Rausch
(Continued)

OTHER PUBLICATIONS

Rausch et al., "What's New in SAS Data Management", SAS Global Forum, Mar. 24, 2014, 15 pages.
(Continued)

*Primary Examiner* — Tammy Lee

(57) ABSTRACT

An apparatus may include a processor and storage to store instructions that cause the processor to perform operations including: generate a current data set model descriptive of a characteristic of a current data set; compare the current data set model to at least one previously generated data set model descriptive of a characteristic of a previously analyzed data set; in response to detection of a match within a similarity threshold: retrieve an indication from a correlation database of an action previously performed on a previously analyzed data set; select a computer language based on node data descriptive of characteristics of a node device execution environment; generate node instructions in the selected computer language and based on the current data set model to cause the node device to perform the previously performed action on a portion of the current data set; and transmit the node instructions to the node device.

30 Claims, 38 Drawing Sheets

Related U.S. Application Data

62/090,362, filed on Dec. 11, 2014, provisional application No. 61/951,520, filed on Mar. 11, 2014.

(56) References Cited

U.S. PATENT DOCUMENTS

| | | |
|---|---|---|
| 7,908,266 B2 | 3/2011 | Zeringue et al. |
| 8,661,065 B2 | 2/2014 | Rausch et al. |
| 8,726,177 B2 | 5/2014 | Zeringue et al. |
| 9,239,854 B2 | 1/2016 | Rausch et al. |
| 9,268,828 B2 | 2/2016 | Rausch et al. |
| 2007/0174308 A1 | 7/2007 | Rausch |
| 2009/0024940 A1 | 1/2009 | Zeringue et al. |
| 2009/0024951 A1 | 1/2009 | Zeringue et al. |
| 2009/0070767 A1* | 3/2009 | Garbow ............ G06F 9/5066 718/104 |
| 2012/0324387 A1 | 12/2012 | Rausch et al. |
| 2013/0318068 A1 | 11/2013 | Apte et al. |
| 2014/0122691 A1* | 5/2014 | Simhon ............ H04L 41/142 709/224 |
| 2014/0280349 A1 | 9/2014 | Rausch et al. |

OTHER PUBLICATIONS

"Bringing on the Power of SAS to Hadoop", White Paper, SAS Institute Inc. 2014, 8 pages (author unknown).
Loahin, David, "Understanding Big Data Quality for Maximum Information Usability", White Paper, SASA Institute Inc. (2014) 10 pages.

\* cited by examiner

```
┌─────────────────────────────────────────────────────┐
│ RECEIVE GRID STATUS INFORMATION INCLUDING A PROJECT │
│  STATUS OF A PORTION OF A PROJECT BEING EXECUTED BY │
│            A NODE IN THE COMMUNICATIONS GRID         │
│                         502                          │
└─────────────────────────────────────────────────────┘
                          │
                          ▼
┌─────────────────────────────────────────────────────┐
│           STORE THE GRID STATUS INFORMATION          │
│                         504                          │
└─────────────────────────────────────────────────────┘
                          │
                          ▼
┌─────────────────────────────────────────────────────┐
│  RECEIVE A FAILURE COMMUNICATION CORRESPONDING TO A  │
│            NODE IN THE COMMUNICATIONS GRID           │
│                         506                          │
└─────────────────────────────────────────────────────┘
                          │
                          ▼
┌─────────────────────────────────────────────────────┐
│   REASSIGN A NODE OR A PORTION OF THE PROJECT BEING  │
│             EXECUTED BY THE FAILED NODE              │
│                         508                          │
└─────────────────────────────────────────────────────┘
                          │
                          ▼
┌─────────────────────────────────────────────────────┐
│   RECEIVE UPDATED GRID STATUS INFORMATION BASED ON   │
│                  THE REASSIGNMENT                    │
│                         510                          │
└─────────────────────────────────────────────────────┘
                          │
                          ▼
┌─────────────────────────────────────────────────────┐
│  TRANSMIT A SET OF INSTRUCTIONS BASED ON THE UPDATED │
│ GRID STATUS INFORMATION TO ONE OR MORE NODES IN THE  │
│                  COMMUNICATIONS GRID                 │
│                         512                          │
└─────────────────────────────────────────────────────┘
```

FIG. 5

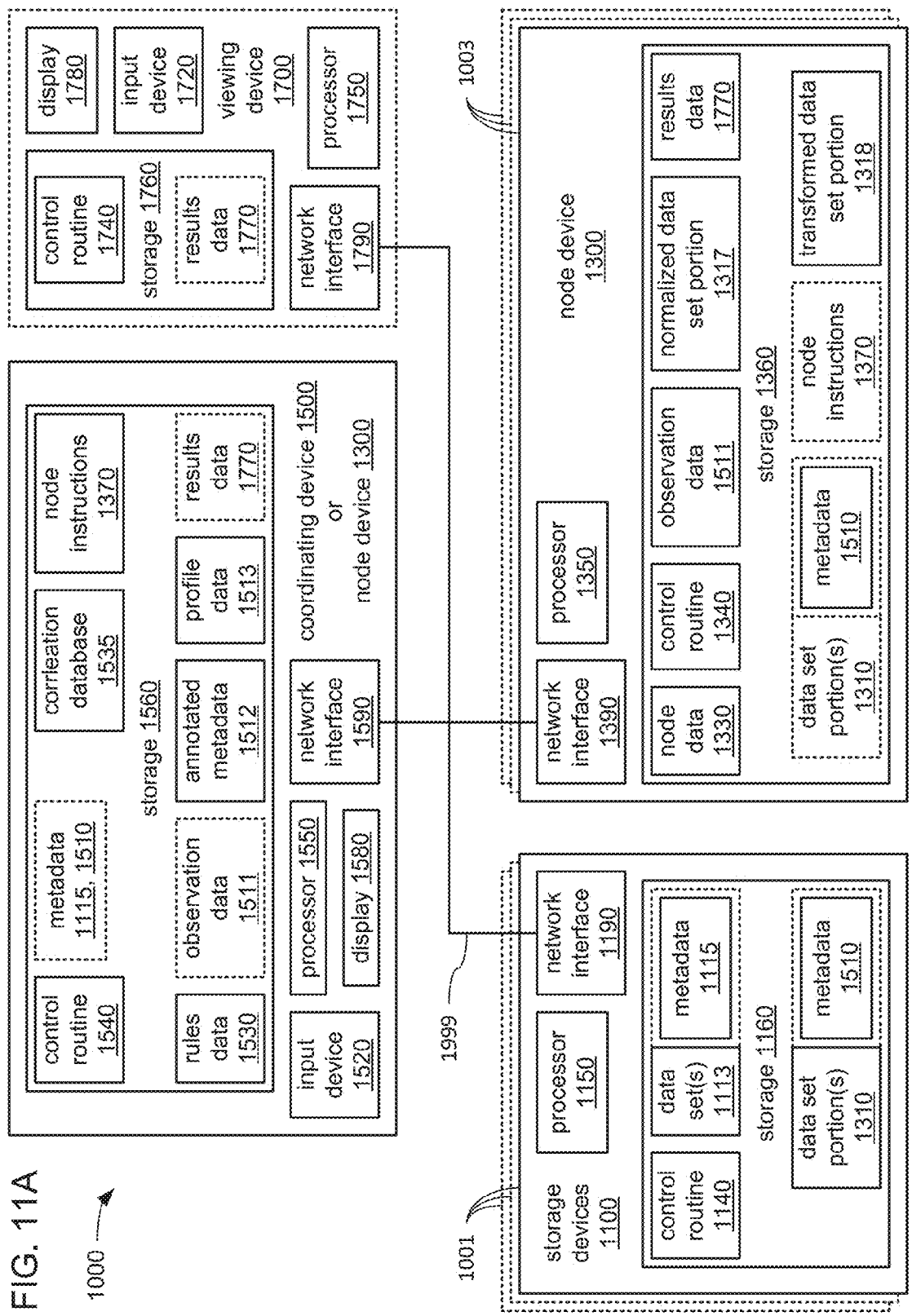

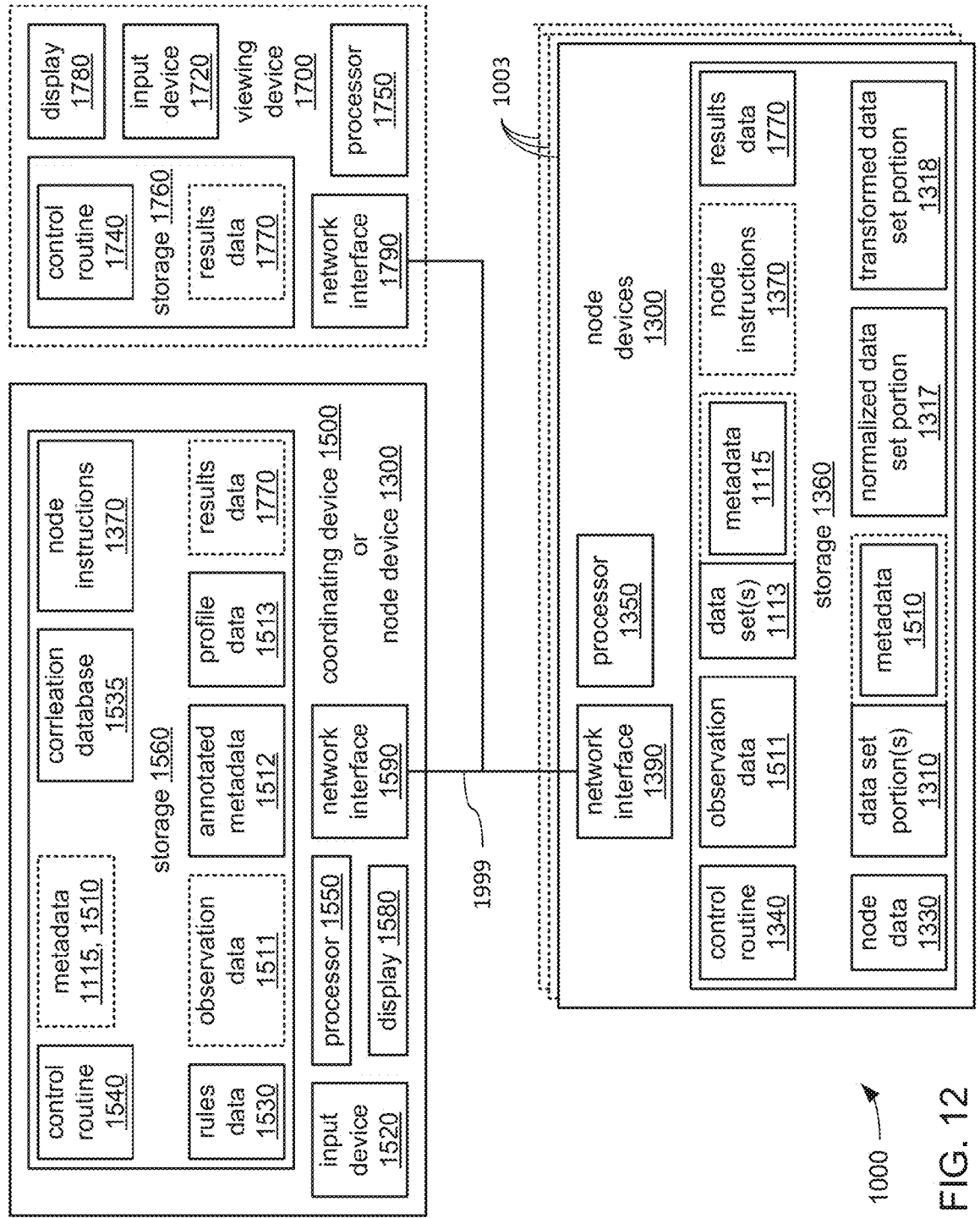

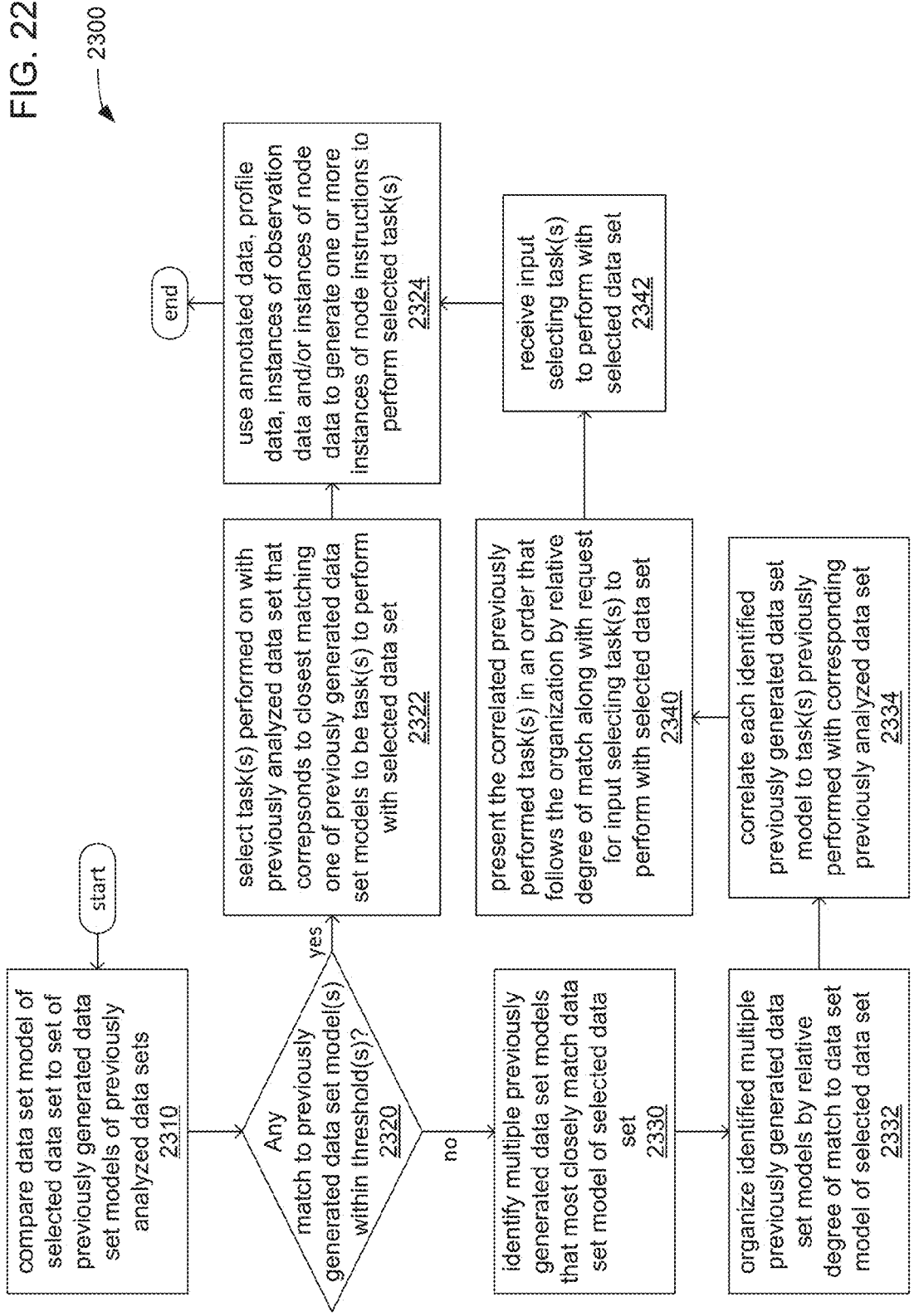

DISTRIBUTED DATA SET TASK SELECTION

CROSS-REFERENCE TO RELATED APPLICATIONS

This application claims the benefit of priority under 35 U.S.C. §119(e) to U.S. Provisional Application Ser. No. 62/295,538 filed Feb. 16, 2016, the entirety of which is incorporated herein by reference. This application is a also continuation-in-part of and claims the benefit of priority under 35 U.S.C. §120 to U.S. patent application Ser. No. 14/643,747 filed Mar. 10, 2015, which is a continuation of U.S. patent application Ser. No. 14/643,692 also filed Mar. 10, 2015 (since issued as U.S. Pat. No. 9,223,619), and which claims the benefit of priority of to Provisional Application Ser. No. 62/115,836 filed Feb. 13, 2015, Provisional Application Ser. No. 62/090,362 filed Dec. 11, 2014, and Provisional Application Ser. No. 61/951,520 filed Mar. 11, 2014, the entirety of each of which is incorporated herein by reference.

BACKGROUND

It has become increasingly commonplace to use grids of multiple node devices to perform widely varied analyses of large data sets (e.g., what is commonly referred to as "big data") of widely varied types. Such grids of nodes often receive such data sets from one or more grids of storage devices at which such data sets may be assembled in what may be a queue of data sets awaiting analysis. Such a queue of data sets may be formed among the one or more grids of storage devices in an effort to cause a grid of node devices to be as fully utilized as possible.

SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

An apparatus may include a processor and a storage to store instructions that, when executed by the processor, cause the processor to perform operations comprising: retrieve, from a node device, node data descriptive of at least one characteristic of an execution environment of the node device; generate a current data set model descriptive of at least one characteristic of a current data set; and compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set. In response to detection of a match that meets a similarity threshold between the at least one characteristic described in the current data set model and the at least one characteristic described in the at least one previously generated data set model, the processor may be caused to perform operations including: retrieve an indication from a correlation database of at least one previously performed action previously performed on the at least one previously analyzed data set, wherein the at least one previously performed action comprises at least one of normalization, a transform or a task performed on the at least one previously analyzed data set; select a computer language based on the node data; generate node instructions, in the selected computer language and based on at least the current data set model, to cause the node device to perform the at least one previously performed action on at least a portion of the current data set; and transmit the node instructions to the node device. In response to detection of a lack of a match that meets the similarity threshold between the at least one characteristic described in the current data set model and the at least one characteristic described in the at least one previously generated data set model, the processor may be caused to present a request for input indicative of a current action to perform on the current data set, wherein the current action comprises at least one of normalization, a transform or a task to be performed on the current data set.

In response to the detection of a lack of a match that meets the similarity threshold between the at least one characteristic described in the current data set model and the at least one characteristic described in the at least one previously generated data set model, the processor may be caused to perform operations including: select a predetermined quantity of previously generated data set models in which the at least one characteristic described in each of the previously generated data set models is more similar to the at least one characteristic described in the current data set model than all other previously generated data set models among multiple previously generated data set models that are included in the correlation database; for each selected previously generated data set model, retrieve an indication of a corresponding previously performed action previously performed on a corresponding previously analyzed data set correlated to the selected previously generated data set model by the correlation database; and present the request for input along with a listing of the corresponding previously performed action previously performed on each of the corresponding previously analyzed data sets correlated by the correlation database to one of the selected previously generated data set models in an order based on a degree of similarity in the at least one characteristic of each of the selected previously generated data set models to the at least one characteristic of the current data set model.

The processor may be caused to perform operations including: retrieve multiple instances of descriptive data from multiple node devices, wherein the multiple node devices comprises the node device, and each instance of descriptive data is descriptive of at least one characteristic of a portion of the current data set that is stored by a corresponding one of the multiple node devices; combine the multiple instances of descriptive data to generate an annotated metadata, wherein the annotated metadata comprises an indication of at least one of a label by which the current data set is organized, a delimiter used to separate two data items within the current data set, or a format of data item within the current data set; and generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set. The processor may be caused to perform operations including retrieve multiple instances of node data from the multiple node devices, wherein the multiple instances of node data comprises the node data retrieved from the node device. Also, in response to the detection of a match that meets a similarity threshold between the at least one characteristic described in the current data set model and the at least one characteristic described in the at least one previously generated data set model, the processor may be caused to perform operations including: select at least one computer language from which to generate multiple instances of node instructions to cause each node device of the multiple node devices to perform the at least one previously performed action on a corresponding portion of the current data set, wherein in the multiple instances of node instructions comprises the node instructions transmitted to the node device; and transmit the multiple instances of node instructions to the multiple node devices. The processor may be caused to perform operations including minimize a quantity of instances of the node instructions generated for the multiple node devices by minimizing a quantity of computer languages within the at least one computer language.

The processor may be caused to perform operations including: retrieve a first portion of the current data set from a storage device; identify at least one characteristic of the first portion to generate first descriptive data descriptive of the at least one characteristic of the portion of the current data set; retrieve, from the node device, second descriptive data that is descriptive of at least one characteristic of a second portion of the current data set stored by the node device; combine at least the first and second descriptive data to generate an annotated metadata, wherein the annotated metadata comprises an indication of at least one of a label by which the current data set is organized, a delimiter used to separate two data items within the current data set, or a format of a data item within the current data set; and generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set. In response to the detection of a match that meets a similarity threshold between the at least one characteristic described in the current data set model and the at least one characteristic described in the at least one previously generated data set model, the processor may be caused to perform operations including selecting at least one computer language from which to generate multiple instances of node instructions to cause at least the processor to perform the previously performed action on the first portion of the current data set and to cause the node device to perform the previously performed action on the second portion of the current data set, wherein in the multiple instances of node instructions comprises the node instructions transmitted to the node device.

The processor may be caused to perform operations including: monitor previously performed actions performed on each previously analyzed data set of the at least one previously analyzed data set; for each previously analyzed data set of the at least one previously analyzed data set, store previously generated data set model that corresponds to the previously analyzed data set correlated to an indication of a previously performed action performed on the previously analyzed data set in the correlation database; derive a correlation between the at least one characteristic and the at least one previously performed action from the correlation database; and determine the at least one previously performed action to cause the node device to perform on the current data set based on the correlation. The apparatus may include a display and an input device, wherein the processor is caused to present the request on the display and monitor the input device for receipt of the requested input. The task performed on the at least one previously analyzed data set may include at least one of a region-specific normalization, an industry-specific transform, a statistical analysis, or an aggregation of results of multiple statistical analyses.

A computer-program product tangibly embodied in a non-transitory machine-readable storage medium, the computer-program product including instructions operable to cause a processor to perform operations including: retrieve, from a node device, node data descriptive of at least one characteristic of an execution environment of the node device; generate a current data set model descriptive of at least one characteristic of a current data set; and compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set. In response to detection of a match that meets a similarity threshold between the at least one characteristic described in the current data set model and the at least one characteristic described in the at least one previously generated data set model, the processor may be caused to perform operations including: retrieve an indication from a correlation database of at least one previously performed action previously performed on the at least one previously analyzed data set, wherein the at least one previously performed action comprises at least one of normalization, a transform or a task performed on the at least one previously analyzed data set; select a computer language based on the node data; generate node instructions, in the selected computer language and based on at least the current data set model, to cause the node device to perform the at least one previously performed action on at least a portion of the current data set; and transmit the node instructions to the node device. In response to detection of a lack of a match that meets the similarity threshold between the at least one characteristic described in the current data set model and the at least one characteristic described in the at least one previously generated data set model present a request for input indicative of a current action to perform on the current data set, wherein the current action comprises at least one of normalization, a transform or a task to be performed on the current data set.

In response to the detection of a lack of a match that meets the similarity threshold between the at least one characteristic described in the current data set model and the at least one characteristic described in the at least one previously generated data set model, the processor may be caused to perform operations including: select a predetermined quantity of previously generated data set models in which the at least one characteristic described in each of the previously generated data set models is more similar to the at least one characteristic described in the current data set model than all other previously generated data set models among multiple previously generated data set models that are included in the correlation database; for each selected previously generated data set model, retrieve an indication of a corresponding previously performed action previously performed on a corresponding previously analyzed data set correlated to the selected previously generated data set model by the correlation database; and present the request for input along with a listing of the corresponding previously performed action previously performed on each of the corresponding previously analyzed data sets correlated by the correlation database to one of the selected previously generated data set models in an order based on a degree of similarity in the at least one characteristic of each of the selected previously generated data set models to the at least one characteristic of the current data set model.

The processor may be caused to perform operations including: retrieve multiple instances of descriptive data from multiple node devices, wherein the multiple node devices comprises the node device, and each instance of descriptive data is descriptive of at least one characteristic of a portion of the current data set that is stored by a corresponding one of the multiple node devices; combine the multiple instances of descriptive data to generate an annotated metadata, wherein the annotated metadata comprises an indication of at least one of a label by which the current data set is organized, a delimiter used to separate two data items within the current data set, or a format of data item within the current data set; and generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set. The processor may be caused to perform operations including retrieve multiple instances of node data from the multiple node devices, wherein the multiple instances of node data comprises the node data retrieved from the node device. Also, in response to the detection of a match that meets a similarity threshold between the at least one characteristic described in the current data set model and the at least one characteristic described in the at least one previously generated data set model, the processor may be caused to: select at least one computer language from which to generate multiple instances of node instructions to cause each node device of the multiple node devices to perform the at least one previously performed action on a corresponding portion of the current data set, wherein in the multiple instances of node instructions comprises the node instructions transmitted to the node device; and transmit the multiple instances of node instructions to the multiple node devices. The processor may be caused to perform operations including minimize a quantity of instances of the node instructions generated for the multiple node devices by minimizing a quantity of computer languages within the at least one computer language.

The processor may be caused to perform operations including: retrieve a first portion of the current data set from a storage device; identify at least one characteristic of the first portion to generate first descriptive data descriptive of the at least one characteristic of the portion of the current data set; retrieve, from the node device, second descriptive data that is descriptive of at least one characteristic of a second portion of the current data set stored by the node device; combine at least the first and second descriptive data to generate an annotated metadata, wherein the annotated metadata comprises an indication of at least one of a label by which the current data set is organized, a delimiter used to separate two data items within the current data set, or a format of a data item within the current data set; and generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set. In response to the detection of a match that meets a similarity threshold between the at least one characteristic described in the current data set model and the at least one characteristic described in the at least one previously generated data set model, the processor may be caused to perform operations including selecting at least one computer language from which to generate multiple instances of node instructions to cause at least the processor to perform the previously performed action on the first portion of the current data set and to cause the node device to perform the previously performed action on the second portion of the current data set, wherein in the multiple instances of node instructions comprises the node instructions transmitted to the node device.

The processor may be caused to perform operations including: monitor previously performed actions performed on each previously analyzed data set of the at least one previously analyzed data set; for each previously analyzed data set of the at least one previously analyzed data set, store previously generated data set model that corresponds to the previously analyzed data set correlated to an indication of a previously performed action performed on the previously analyzed data set in the correlation database; derive a correlation between the at least one characteristic and the at least one previously performed action from the correlation database; and determine the at least one previously performed action to cause the node device to perform on the current data set based on the correlation. The processor may be caused to visually present the request on a display and monitor an input device for receipt of the requested input. The node data may include an indication of at least one of a processor type of the node device, a quantity of storage space within the node device, a type of operating system executed by the node device, a type of language interpreter executed by the node device, or a configuration setting of the node device.

A computer-implemented method may include: retrieving, from a node device, node data descriptive of at least one characteristic of an execution environment of the node device; generating, at a coordinating device, current data set model descriptive of at least one characteristic of a current data set; and comparing the current data set model to at least one previously generated data set model of at least one previously analyzed data set to detect a match in the at least one characteristic that meets a similarity threshold, wherein the at least one previously generated data set model is descriptive the of at least one characteristic of the at least one previously analyzed data set. The method may include, in response to detection of a match that meets a similarity threshold between the at least one characteristic described in the current data set model and the at least one characteristic described in the at least one previously generated data set model, the method may include performing operations including: retrieving an indication from a correlation database of at least one previously performed action previously performed on the at least one previously analyzed data set, wherein the at least one previously performed action comprises at least one of normalization, a transform or a task performed on the at least one previously analyzed data set; selecting a computer language based on the node data; generating, at the coordinating device, node instructions, in the selected computer language and based on at least the current data set model, to cause the node device to perform the at least one previously performed action on at least a portion of the current data set; and transmitting the node instructions to the node device.

The method may include: retrieving multiple instances of descriptive data from multiple node devices, wherein the multiple node devices comprises the node device, and each instance of descriptive data is descriptive of at least one characteristic of a portion of the current data set that is stored by a corresponding one of the multiple node devices; combining the multiple instances of descriptive data to generate an annotated metadata, wherein the annotated metadata comprises an indication of at least one of a label by which the current data set is organized, a delimiter used to separate two data items within the current data set, or a format of a data item within the current data set; and generating, at the coordinating device, the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set. The method may include retrieving multiple instances of node data from the multiple node devices, wherein the multiple instances of node data comprises the node data retrieved from the node device. The method may also include, in response to the detection of a match that meets a similarity threshold between the at least one characteristic described in the current data set model and the at least one characteristic described in the at least one previously generated data set model, performing operations including: selecting at least one computer language from which to generate multiple instances of node instructions to cause each node device of the multiple node devices to perform the at least one previously performed action on a corresponding portion of the current data set, wherein in the multiple instances of node instructions comprises the node instructions transmitted to the node device; and transmitting the multiple instances of node instructions to the multiple node devices. Selecting the computer language may include minimizing a quantity of instances of the node instructions generated for the multiple node devices by minimizing a quantity of computer languages within the at least one computer language.

The method may include: retrieving a first portion of the current data set from a storage device; identifying at least one characteristic of the first portion to generate first descriptive data descriptive of the at least one characteristic of the portion of the current data set; retrieving, from the node device, second descriptive data that is descriptive of at least one characteristic of a second portion of the current data set stored by the node device; combining at least the first and second descriptive data to generate an annotated metadata, wherein the annotated metadata comprises an indication of at least one of a label by which the current data set is organized, a delimiter used to separate two data items within the current data set, or a format of a data item within the current data set; and generating, at the coordinating device, the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set. The method may include, in response to the detection of a match that meets a similarity threshold between the at least one characteristic described in the current data set model and the at least one characteristic described in the at least one previously generated data set model, selecting at least one computer language from which to generate multiple instances of node instructions to cause at least the coordinating device to perform the previously performed action on the first portion of the current data set and to cause the node device to perform the previously performed action on the second portion of the current data set, wherein in the multiple instances of node instructions comprises the node instructions transmitted to the node device.

The method may include, monitoring previously performed actions performed on each previously analyzed data set of the at least one previously analyzed data set; for each previously analyzed data set of the at least one previously analyzed data set, storing previously generated data set model that corresponds to the previously analyzed data set correlated to an indication of a previously performed action performed on the previously analyzed data set in the correlation database; deriving a correlation between the at least one characteristic and the at least one previously performed action from the correlation database; and determining the at least one previously performed action to cause the node device to perform on the current data set based on the correlation. The node data may include an indication of at least one of a processor type of the node device, a quantity of storage space within the node device, a type of operating system executed by the node device, a type of language interpreter executed by the node device, or a configuration setting of the node device. The computer language is selected from a group consisting of a programming language, a scripting language, a database query language and a machine language.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures:

FIG. 5 illustrates a flow chart showing an example process for adjusting a communications grid or a work project in a communications grid after a failure of a node, according to some embodiments of the present technology.

FIGS. 11A and 11B, together, illustrate an example embodiment of a distributed processing system.

FIG. 12 illustrates an example alternate embodiment of a distributed processing system.

FIG. 22 illustrates another example embodiment of a logic flow of a coordinating device selecting one or more tasks for node devices to perform with a selected data set.

DETAILED DESCRIPTION

Figure 1:
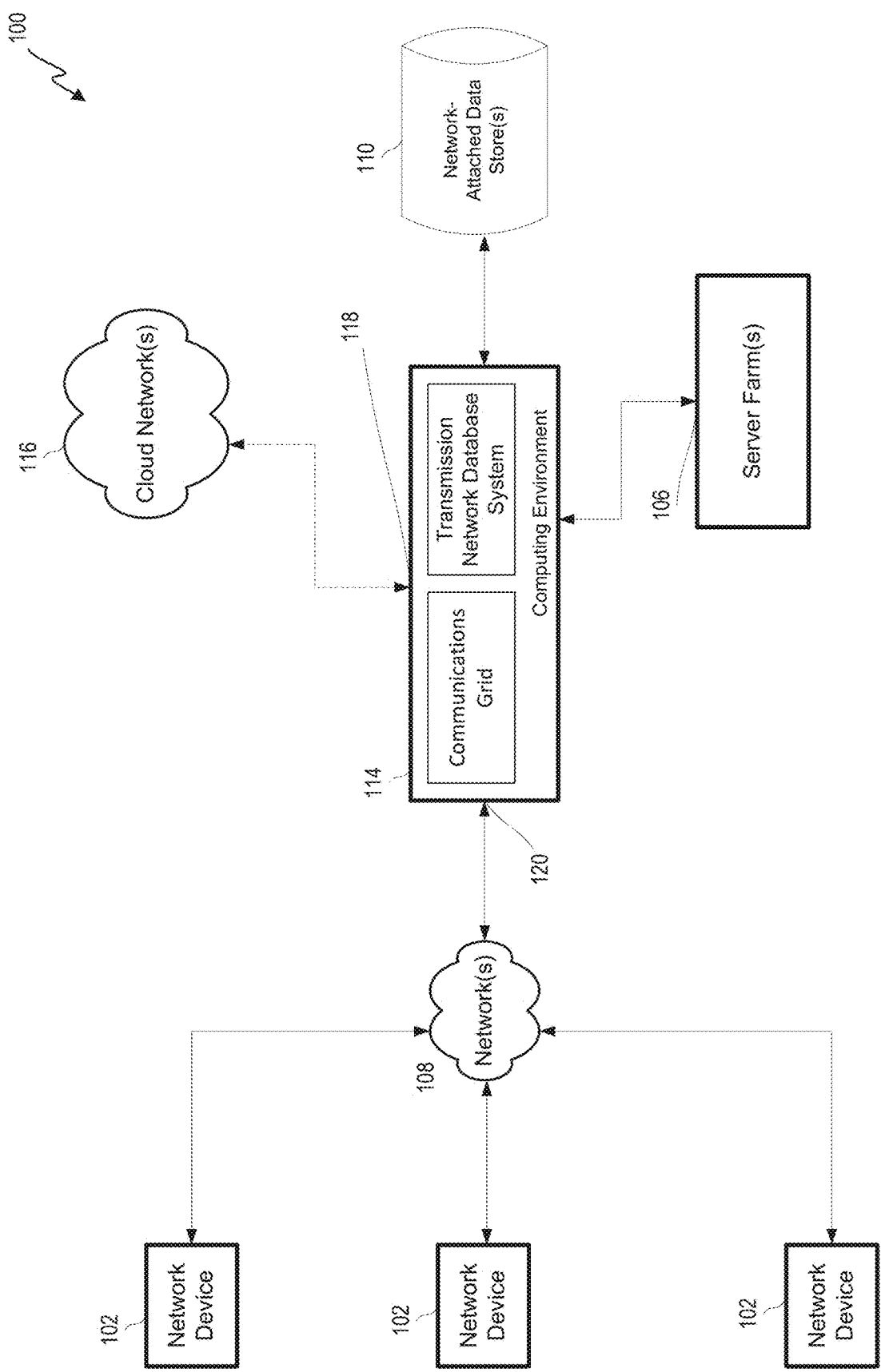
FIG. 1 illustrates a block diagram that provides an illustration of the hardware components of a computing system, according to some embodiments of the present technology.

Various embodiments described herein are generally directed to techniques for generating instructions for execution by a grid of node devices based on features of a data set provided by a grid of storage devices via a network. More precisely, each node device of the grid of node devices may separately, and at least partially in parallel, analyze a separate data set portion of a data set distributed among the grid of node devices by the grid of storage devices to determine structural features of and/or features of data items within each data set portion. A coordinating device may then derive a data set model from the determinations of data set features made by the node devices. The coordinating device may then compare the data set model to other data set models previously generated from previously analyzed data sets to identify one or more sufficiently similar ones of the previously generated data set models. The coordinating device may correlate one of the sufficiently similar previously generated data set models to one or more tasks previously performed with a corresponding one of the previously analyzed data sets. The coordinating device may then generate node task instructions to cause the node devices of the grid of node devices to perform the one or more tasks with the data set portions, at least partially in parallel. In so doing, the coordinating device may generate multiple versions of the node instructions to accommodate differences in the processing environments that may exist among different ones of the node devices.

The grid of storage devices may provide distributed storage for large data sets. Such distributed storage may be used to provide one or both of fault tolerance in the storage of data sets and/or faster access to large data sets through the use of parallelism in the reception, storage, retrieval and/or transmission of portions of large data sets via network connections operated at least partially in parallel. The data set may include any of a wide variety of types of data concerning any of a wide variety of subjects. By way of example, the data set may include scientific observation data concerning geological and/or meteorological events, or from sensors laboratory experiments in areas such as particle physics. By way of another example, the data set may include indications of activities performed by a random sample of individuals of a population of people in a selected country or municipality, or of a population of a threatened species under study in the wild.

In some embodiments, the grid of storage devices may be employed to store numerous data sets as each data set is assembled from data items detected and/or collected by various source devices, and/or data items generated as an output of various analyses performed by various source devices. Regardless of the exact manner in which each data set is formed, as each data set is formed, the data set portions that make up each data set may then be provided by the grid of storage devices to the grid of node devices in an at least partially parallel transmission of multiple data set portions. Such provision of each data set as each is formed may be part of a strategy to make as thorough and efficient utilization of the processing resources of the grid of node devices as possible. As a result of such a strategy, any of a wide variety of data sets may be selected to be provided by the grid of storage devices to the grid of node devices in any order at any time of a day and/or during any day of a week. Unfortunately, such opportunistic selection and timing in the provision of data sets to the grid of node devices may not afford effective opportunities to request and/or receive input from an operator of the grid of node devices concerning what tasks are to be performed with each data set by the grid of node devices.

Upon the provision of a separate data set portion of a selected data set to each of the node devices, each of the node devices may analyze its corresponding data set portion to determine various structural features thereof at least partially in parallel with others of the node devices. By way of example, each node device may determine a type of index system employed in organizing and accessing data items within its corresponding data set portion, including and not limited to, a binary tree, linked list, array of one or more dimensions, etc. In determining a type of index system, each node device may determine identifiers and/or range(s) of identifiers employed as indices in the index system for its corresponding data set portion. In making such determinations, each of the node devices may analyze its corresponding data set portion for occurrences of various bit values associated with any of a variety of delimiters, including and not limited to, tab and/or space codes, carriage return and/or end-of-line codes, end-of-page and/or end-of-row codes, one or more punctuation characters, etc. Each of the node devices may then transmit an indication of such structural features of its corresponding data set portion to the coordinating device as observation data.

In some embodiments, one or more of the node devices may be provided with a data set portion that is accompanied by at least a portion of metadata associated with the selected data set that may provide indications of one or more of such structural features of at least the data set portion that it accompanies. In such embodiments, where a node device of the grid of node devices is so provided with such metadata, the node device may analyze such metadata to determine whether it provides indications of all of the various structural features that the node device may provide indications of to the coordinating device. If the metadata does so, then the node device may forego the performance of at least some of such analyses of its corresponding data set portion, and may instead, relay the metadata to the coordinating device in lieu of or in addition to observation data. However, if the metadata does not do so, then the node device may perform at least a subset of such analyses to determine the one or more structural features of its corresponding data set portion that are not included in the metadata, and then provide both the metadata and indications of those determinations to the coordinating device as observation data.

Upon the provision of such observation data and/or metadata by each of the node devices to the coordinating device, the coordinating device may combine the indications of structural features of each of the data set portions into a single annotated metadata that indicates structural features of the whole selected data set. In so doing, the coordinating device may match and combine indications of the different portions of the index system associated with different data set portions that were provided by different ones of the node devices. By way of example, the coordinating device may match corresponding identifiers and/or range(s) of identifiers employed as indices within each of the data set portions.

In some embodiments, the coordinating device may be directly provided by one of the storage devices with metadata concerning the whole selected data set. In such embodiments, where the coordinating device is so provided with such metadata, the coordinating device may analyze such metadata to determine whether it provides indications of all of the various structural features that the coordinating device may include in generating the annotated metadata. If the provided metadata does so, then the coordinating device may forego the generation of the annotated metadata from the observation data provided by each of the node devices, and may instead, use the provided metadata as the annotated metadata. However, if the provided metadata does not do so, then the coordinating device may use the observation data provided by each of the node devices to augment the provided metadata to thereby generate the annotated metadata from the provided metadata.

Regardless of the exact manner in which the coordinating device generates the annotated metadata, the coordinating device may then provide the annotated metadata to the grid of node devices. In some embodiments, this may be done to provide each node device with access to indications of structural features of the whole selected data set, including a more complete description of the indexing system thereof, to enable the performance of one or more task operations by the node devices with their corresponding data set portions.

Each of the node devices may additionally analyze its corresponding data set portion to determine one or more features of the data items therein at least partially in parallel with others of the node devices. By way of example, each node device may determine the type(s) of data within its corresponding data set portion, including and not limited to, binary values, integer values, floating point values, text characters, bit mapped still images, frames of video data, samples of audio data, etc. Also by way of example, each node device may determine a density and/or sparsity of the data items, and/or may determine a size of the data items within its corresponding data set portion. Each of the node devices may then provide an indication of such features of the data within its corresponding data set portion to the coordinating device as additional observation data. In some embodiments, such provision of an indication of some features of the data within each of the data set portions may entail providing the coordinating device with one or more statistical measures, including and not limited to, an indication of an average or mean size measured in bits, bytes, words, doublewords, etc. of each item of data in a row or column. In other embodiments, such provision of an indication of some features of the data within each of the data set portions may entail providing the coordinating device with a randomly selected sample of each of the data set portions that represents a relatively small subset thereof, including and not limited to, a single row or column of data from therein.

In some embodiments, such analyses and provision of observation data indicative of features of the data items within each of the data set portions to the coordinating device may be at least partially enabled by the provision of the annotated metadata to each of the node devices. Thus, one or more of the node devices may employ the indications of structural features of the whole of the selected data set provided in the annotated metadata as input to such an analysis of the data items within one or more of the data set portions.

Upon the provision of such additional observation data by each of the node devices to the coordinating device, the coordinating device may combine the indications of features of the data items within each of the data set portions in a statistical analysis of those indications of features to derive statistically based profile data indicative of the features of the data items of the whole of the selected data set. Such profile data may include indications of one or more average or mean values that quantify such features, and/or one or more ranges of values that indicate highest and lowest quantities associated with such features. By way of example, the coordinating device may derive a range of sizes for the data items within the whole of the selected data set that may be expressed as highest and/or lowest quantities of bits, bytes, words, doublewords, etc.

In some embodiments, the combination of annotated metadata and profile data may define a data set model of the selected data set. The coordinating device may compare the data set model to other data set models that were previously generated from previously analyzed data sets to determine whether there are any of the previously generated data set models that are similar in one or more characteristics to the data set model of the selected data set to a degree that meets one or more predetermined thresholds. If there are, then the coordinating device may select the task(s) to be performed with the selected data set based on what task(s) were previously selected to be performed with the one of the previously analyzed data sets that is associated with the most similar one of the previously derived models. The coordinating device may then generate node instructions to be executed by the processor(s) of each of the node devices to perform, at least partially in parallel, the selected task(s) with their corresponding data set portions.

In some embodiments, the coordinating device may provide and/or employ a user interface (UI), either directly or through another remote device, to provide an operator of the grid of node devices an opportunity to make an alternate selection of one or more task to be performed by the grid of node devices with the selected data set. By way of example, the coordinating device may directly (or through the remote device) visually and/or audibly present an indication to an operator of the one or more tasks selected by the coordinating device. The coordinating device may also present a request for the operator to provide input to confirm the selection of one or more tasks made by the coordinating device, to alter the selection of the one or more tasks, and/or to command that the grid of node devices perform an entirely different selection of one or more tasks.

More specifically, the coordinating device may provide a UI in which an assortment of tasks and/or sets of tasks that may be performed are presented on a display for selection by an operator of the grid of node devices. In some embodiments, such tasks and/or combinations of tasks may be presented in a manner that is ordered to prioritize, or to otherwise more prominently display, the tasks and/or combinations of tasks that are associated with the one or more previously generated data set models that were determined to be more similar to the data set model generated from the selected data set. The coordinating device may then directly (or through the remote device) monitor an input device for an indication of the provision of such input by an operator in response to the presented request. If no such input is received within a predetermined period of time, then the coordinating device may proceed with generating and/or providing the node instructions to the node devices of the grid of node devices to perform the selected one or more with their corresponding data set portions. However, if such input is received within the predetermined period of time, then the coordinating device may generate and/or provide node instructions to the grid of node devices to perform one or more tasks that are consistent with the received input.

Regardless of the exact manner in which the one or more tasks to be performed by the node devices on their corresponding data set portions of the selected data set are selected, the coordinating devices may store an indication of the one or more tasks that are selected to be performed with the dataset. More specifically, the database (or other type of data structure) in which each of the previously generated data set models is stored, and in which each of the previously generated data set models is correlated to a corresponding one or more previously performed tasks, may be augmented to store the data set model generated from the selected data set, along with an indication of correlation between the data set model and the selected one or more tasks to be performed by the node devices with the data set portions of the selected data set. With the storage of each new data set model and corresponding indication of correlation to one or more newly selected tasks, a form of machine learning may occur in which the ability of the processor of the coordinating device to select one or more tasks to be performed with each new data set that is analyzed may be improved. To further enable such machine learning in some embodiments, a weighting value may also be correlated to each previously generated data set model within the database (or other data structure) in which the previously generated data set models are stored. The weighting value of the most similar one of the previously generated data set models may be adjusted to reflect whether there is input received from an operator of the grid of node devices that confirms the selection made by the processor of the coordinating device of one or more tasks to be performed with the selected data set. Such a weighting value may be employed to prevent an atypical selection of one or more tasks by the operator from exerting an outsized influence on future automatic selections of one or more tasks by the processor of the coordinating device.

The one or more tasks so performed by the node devices may include any of a variety of data normalization tasks. By way of example, the processor(s) of each of the node devices may be caused by the node instructions provided by the coordinating device to normalize time, date, monetary value, character spacing, use of delimiter characters and/or codes, and/or other aspects of formatting employed in representing data items within one or more of the data set portions. Also by way of example, the processors of the node devices may be caused to normalize aspects of the encoding of data items, including and not limited to, use of big or little Endian encoding of binary values, use or lack of use of sign bits, the quantity of bits to be employed in representations of integers and/or floating point values (e.g., bytes, words, doublewords or quadwords), etc. It should be noted that, in some embodiments, the node devices of the grid of node devices may be instructed to perform one or more normalizing tasks as a prelude to then performing one or more other tasks, such as transformation and/or analysis tasks.

Alternatively or additionally, the one or more tasks to be performed by the node devices may include any of a variety of data transformation tasks. By way of example, the processor(s) of each of the node devices may be caused by the node instructions provided by the coordinating device to perform one or more sorting, one or more row and/or column-based mathematical operations. Also by way of example, the processors of the node devices may be caused to filter rows and/or columns based on the values of data items within a specified row or column, and/or to reorder at least a specified subset of the data items among the data set portions into a specified ascending, descending or other order. It should be noted that, in some embodiments, the node devices of the grid of node devices may be instructed to perform one or more transformation tasks as a prelude to then performing one or more analysis tasks.

Also alternatively or additionally, the one or more tasks to be performed by the node devices may include any of a variety of data analysis tasks. By way of example, the processor(s) of each of the node devices may be caused by the node instructions provided by the coordinating device to perform one or more searches of their corresponding data set portions for one or more particular data items. Also by way of example, the processors of the node devices may be caused to perform one or more statistical analyses with their corresponding data set portions, including and not limited to, aggregation, identifying and quantifying trends, subsampling, calculating values that characterize at least a subset of the data items within the selected data set, deriving models, testing hypothesis with such derived models, making predictions, generating simulated samples, etc. It should be noted that, in some embodiments, the node devices of the grid of node devices may be instructed to perform one or more normalizing tasks as a prelude to then performing one or more database and/or data analysis tasks.

In preparation for the generation of the node instructions, each of the node devices may provide the coordinating device with node data that includes indications of various aspects of the processing environment provided within each of the node devices. Such indications may include, and are not limited to, indications of type and/or revision level of processor and/or operating system, type and/or revision level of interpreting and/or compiling routine(s), database and/or other programming languages supported, etc. In generating node instructions, the coordinating component may select one or more database, scripting, programming, and/or other types of language(s) based on one or more of such indications. Alternatively or additionally, even where a single language is used by the coordinating device in generating different instances of node instructions for different node devices, the coordinating device may employ different instructions from the instruction set of that single language in instructing the processors of different node devices to perform the same task(s) based on indications of differences between the different node devices provided by their different node data.

In some embodiments, the node data provided to the coordinating device by each of the node devices may additionally specify dynamic aspects of the processing environment provided by each of the node devices. By way of example, indications of currently available quantities of storage and/or measures of current levels of performance of processor(s) and/or other components of a node device may be provided. In such embodiments, each of the node devices may provide such node data to the coordinating device at a recurring interval and/or in response to one or more predetermined types and/or degrees of change in their processing environments. The coordinating device may additionally employ such indications of dynamic aspects of processing environments in selecting one or more database, scripting, programming, and/or other types of language(s).

Following performances of the selected one or more tasks with the data set portions by the node devices, the coordinating device may directly, or through a remote device, present an indication of the results of those performances to an operator of the grid of node devices. By way of example, the coordinating device may directly (or through the remote device) visually and/or audibly present an indication of the results to an operator. In embodiments in which the results of the performances of the selected one or more tasks includes the generation of a new data set, the grid of node devices and the coordinating device may again cooperate to select and/or perform a one or more further tasks with the new data set in a manner not unlike what has been described in reference to the data set from which the new data set was generated.

Through such analysis of structural features of data sets, the selection of one or more tasks to be performed with each received data set may be made automatically, at least in most cases. The removal of the requirement to wait for personnel to make selections of one or more tasks to be performed with each data set may enable the performance of the automatically selected one or more tasks for each data set to begin immediately once the necessary processing resources of a grid of node devices become available to do so. This may enable the processing resources of a grid of node devices to be more fully utilized on a continuous basis throughout each hour of each day. The limiting factor in effecting such full utilization may become the ongoing availability of data sets for which tasks are to be selected and performed, instead of the availability of personnel to select the tasks to be performed for each data set. As a result, personnel may be relieved of at least the majority of the time consuming work of making manual selections of what normalization and/or transform tasks need to be performed with each data set, followed by making manual selections of what analysis tasks are to be performed, once any normalization and/or transformation tasks have been performed.

Through the ability to introduce rules specific to organizations, geography, culture, nationality, legal environment, field of technology, industry, etc., to the inputs employed in the automatic recognition of structural features of data sets and/or in the automatic selection of tasks to be performed, a high degree of customization of the automated selections and performances of tasks is enabled. Also, through use of correlations made between manual selections of tasks made by personnel and the structural features of the data sets for which those manual selections are made, machine learning is enabled that determine what tasks are to be automatically selected. As a result, over time, as occasional corrections may be made by personnel to automatic selections of tasks, the ability to make such automatic selections of tasks may be continuously refined. The ability to introduce such rules and/or to provide such corrective input may also enable the adoption of changes to the automatic selections in response to changes in laws, changes in technology and/or within an industry, changes in the sources of data sets, etc.

As a result, personnel typically need not be presented with the data of a data set until after one or more tasks have already been automatically performed therewith. Personnel are not required to first view and comprehend data sets in unpolished form to select normalization, transformation and/or other tasks to be performed therewith before those personnel will then view and work to comprehend the same data sets a second time in a more polished form. Thus, a considerable savings in time and effort on the part of personnel is alleviated as a result of doing away with such a need to view and comprehend data multiple times.

With general reference to notations and nomenclature used herein, portions of the detailed description that follows may be presented in terms of program procedures executed by a processor of a machine or of multiple networked machines. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include machines selectively activated or configured by a routine stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Systems depicted in some of the figures may be provided in various configurations. In some embodiments, the systems may be configured as a distributed system where one or more components of the system are distributed across one or more networks in a cloud computing system and/or a fog computing system.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
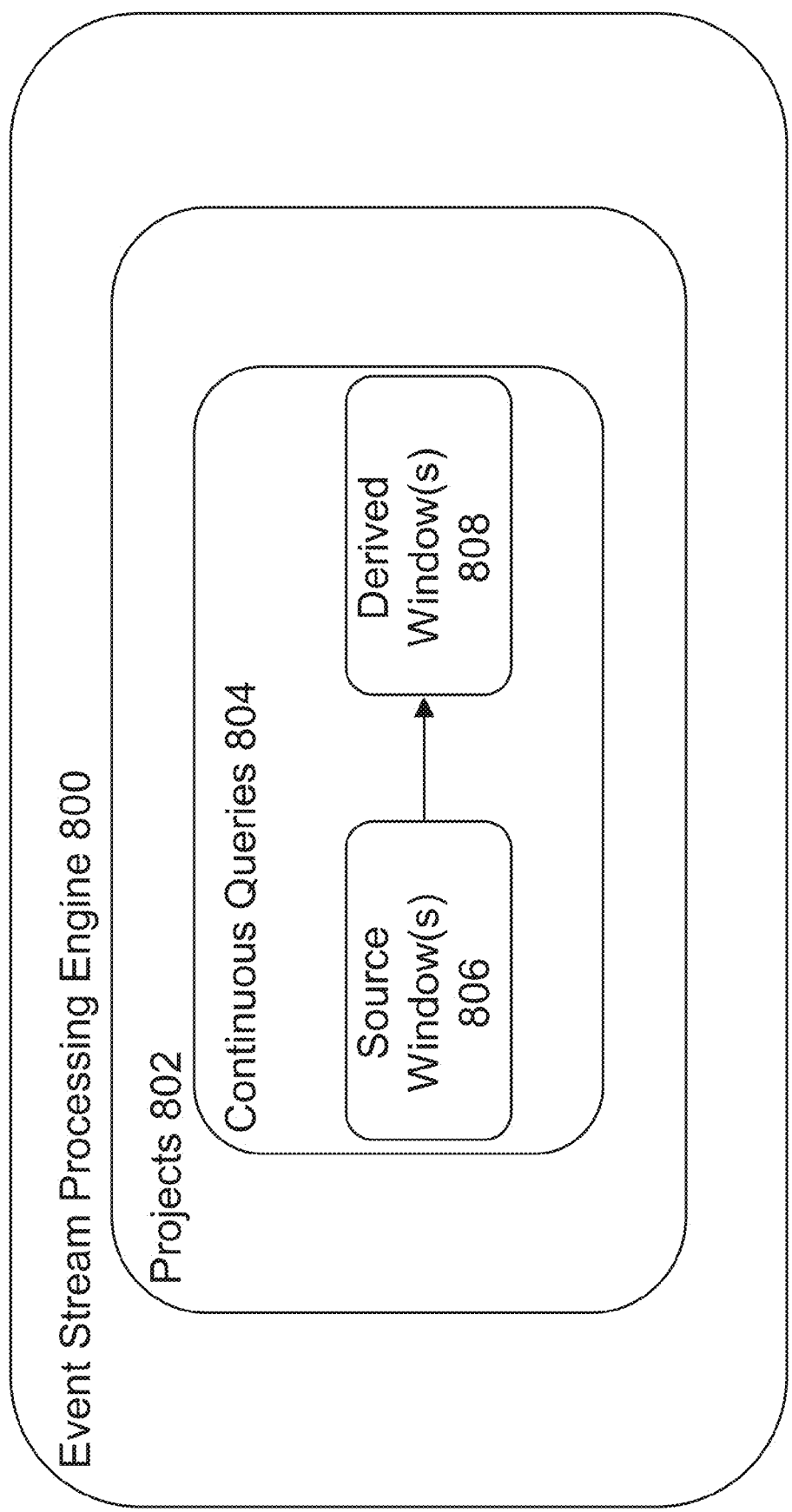
FIG. 8 illustrates a block diagram including components of an Event Stream Processing Engine (ESPE), according to embodiments of the present technology.
Figure 9:
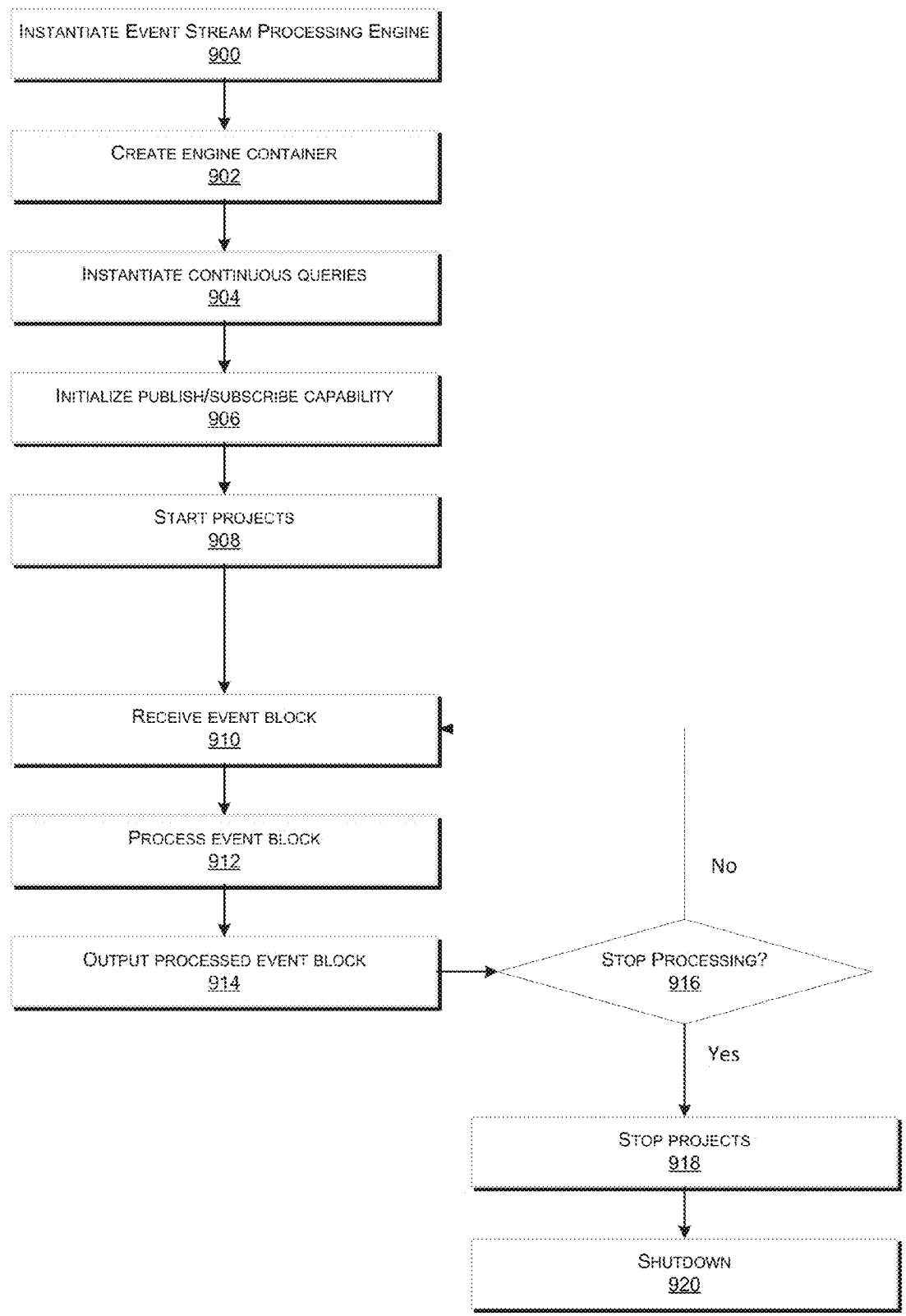
FIG. 9 illustrates a flow chart showing an example process including operations performed by an event stream processing engine, according to some embodiments of the present technology.
Figure 10:
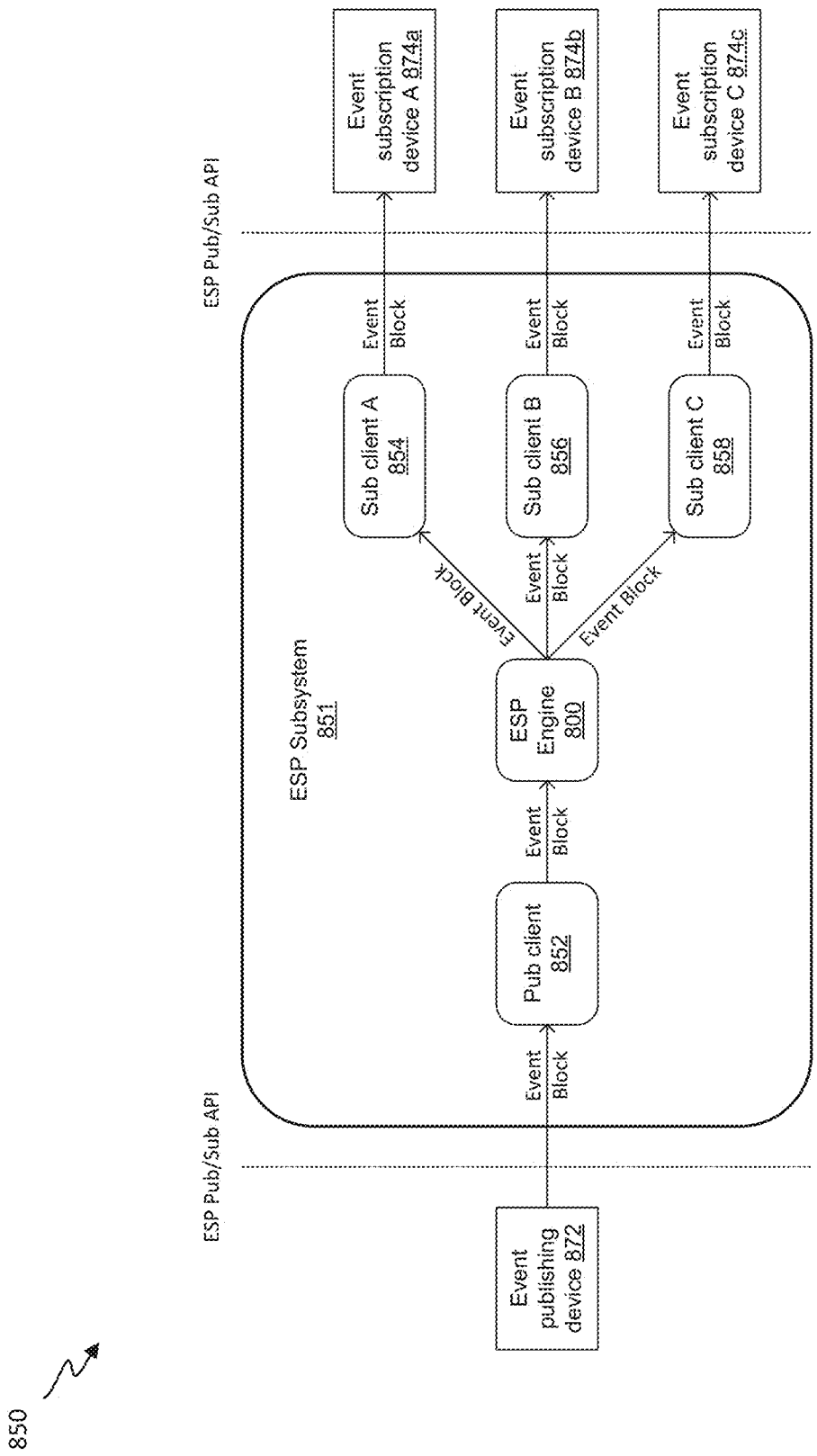
FIG. 10 illustrates an ESP system interfacing between a publishing device and multiple event subscribing devices, according to embodiments of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables).

For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more server farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may comprise one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 114, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
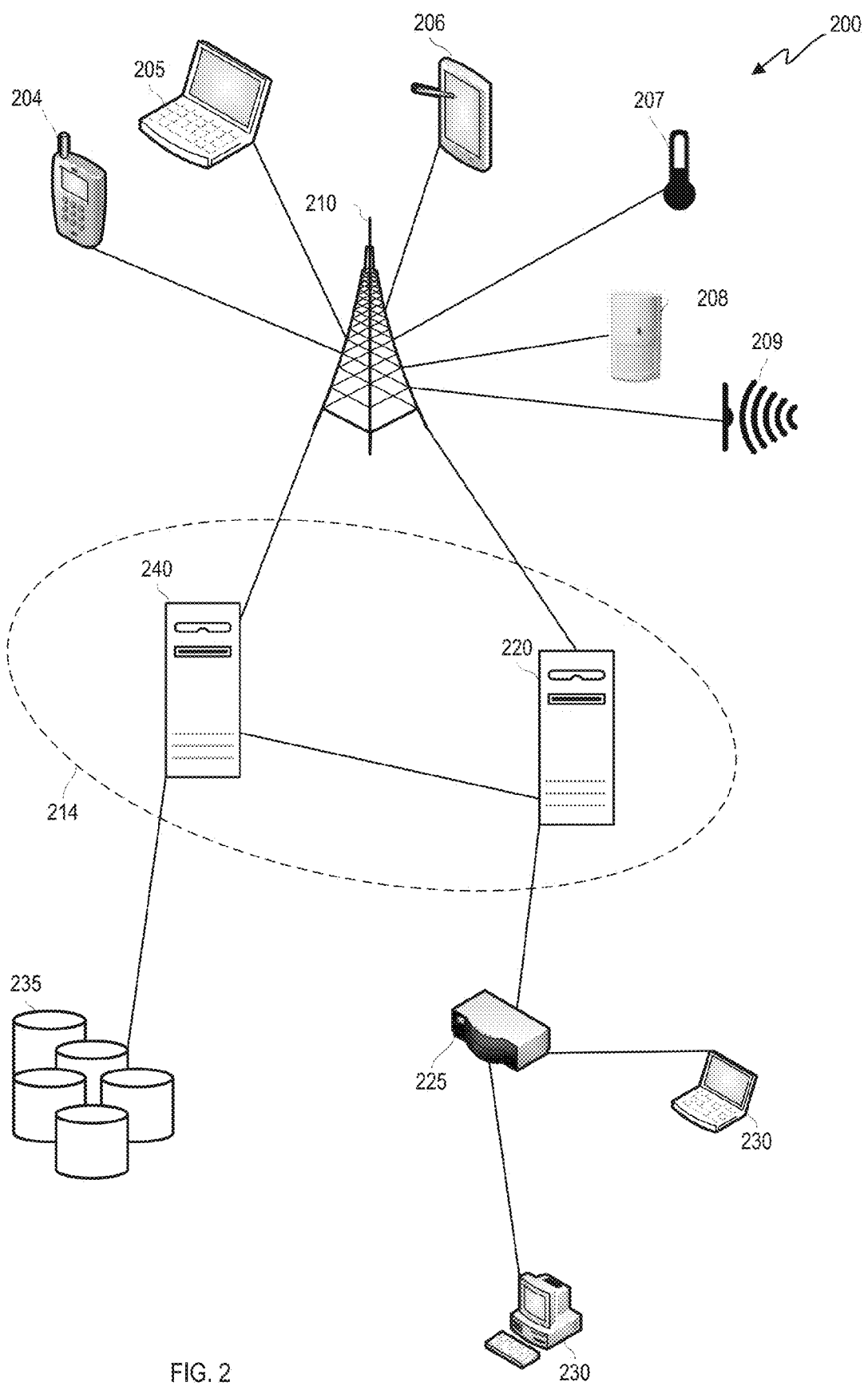
FIG. 2 illustrates an example network including an example set of devices communicating with each other over an exchange system and via a network, according to some embodiments of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
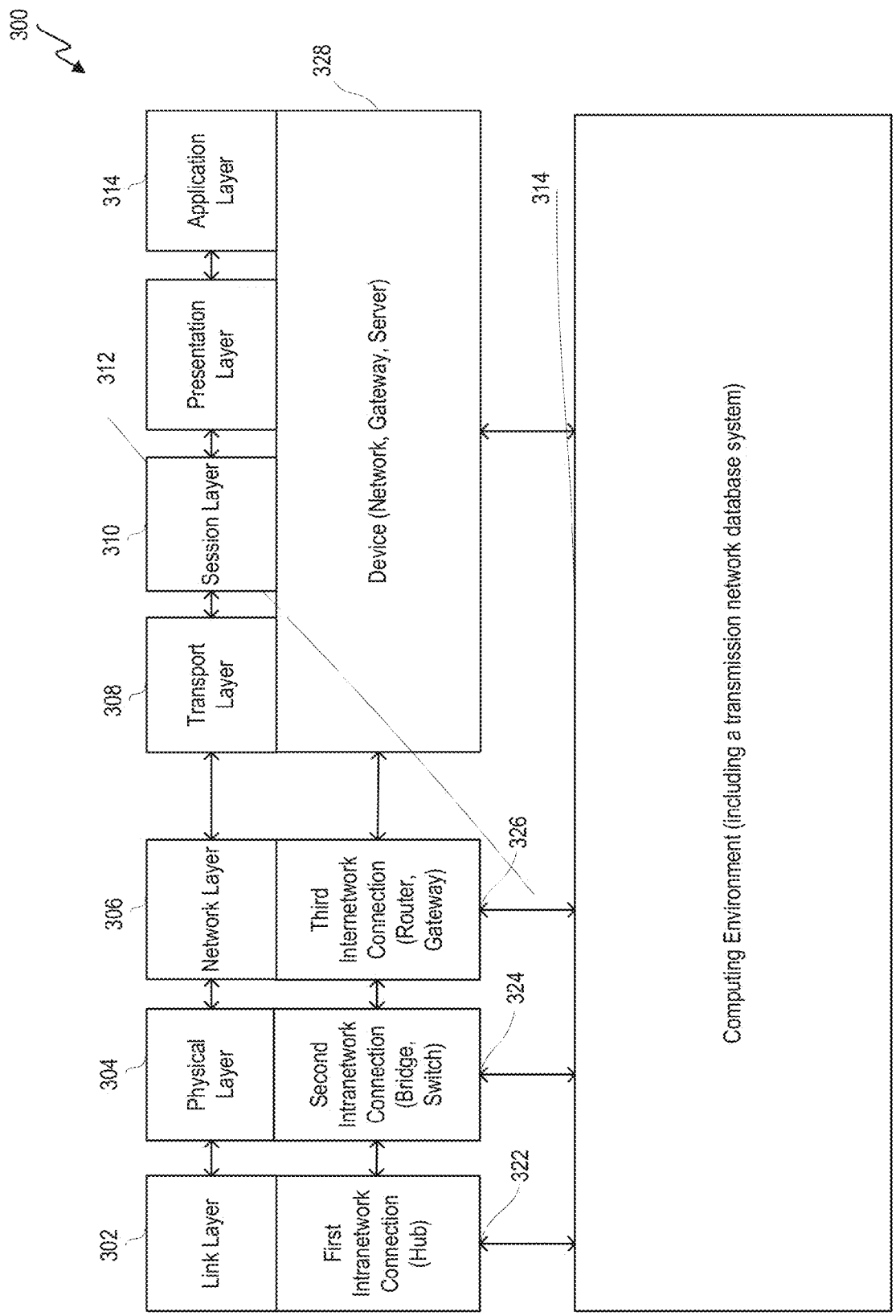
FIG. 3 illustrates a representation of a conceptual model of a communications protocol system, according to some embodiments of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types and/or encodings known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
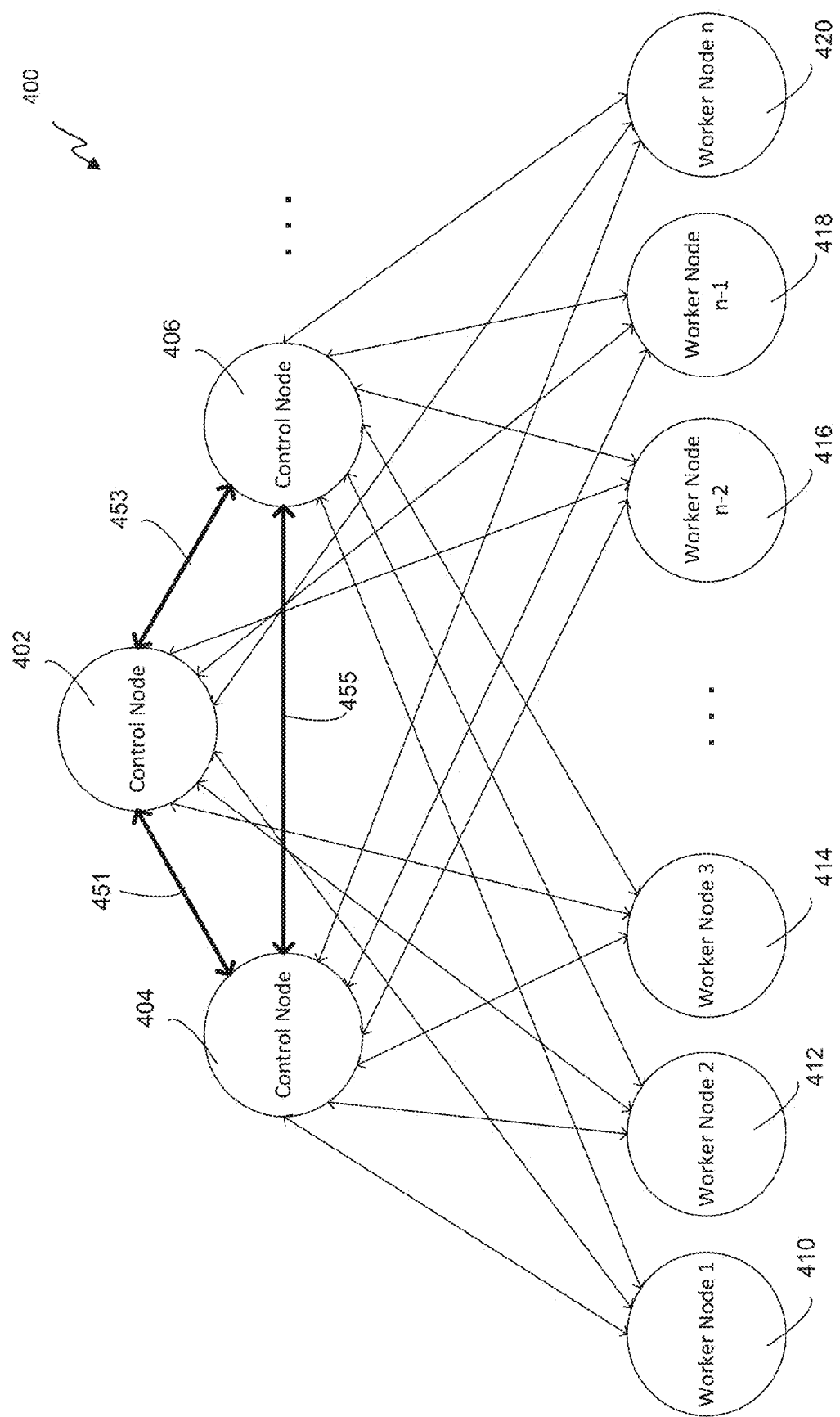
FIG. 4 illustrates a communications grid computing system including a variety of control and worker nodes, according to some embodiments of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node employing Hadoop Distributed File System, or HDFS).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

FIG. 5 illustrates a flow chart showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
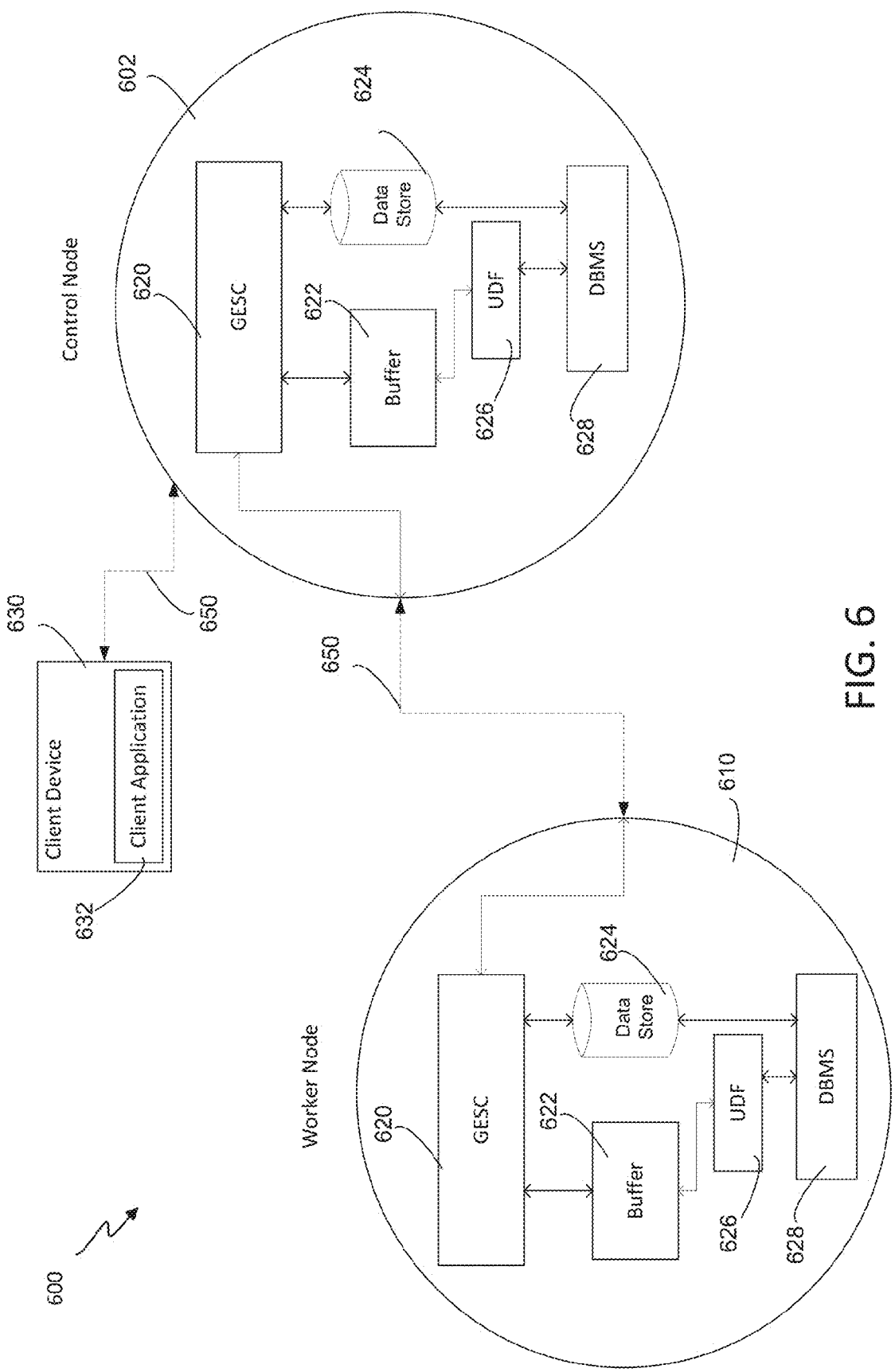
FIG. 6 illustrates a portion of a communications grid computing system including a control node and a worker node, according to some embodiments of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 620 may be connected via a network, such as network 108 shown in FIG. 1.

Therefore, nodes 602 and 620 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within a nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
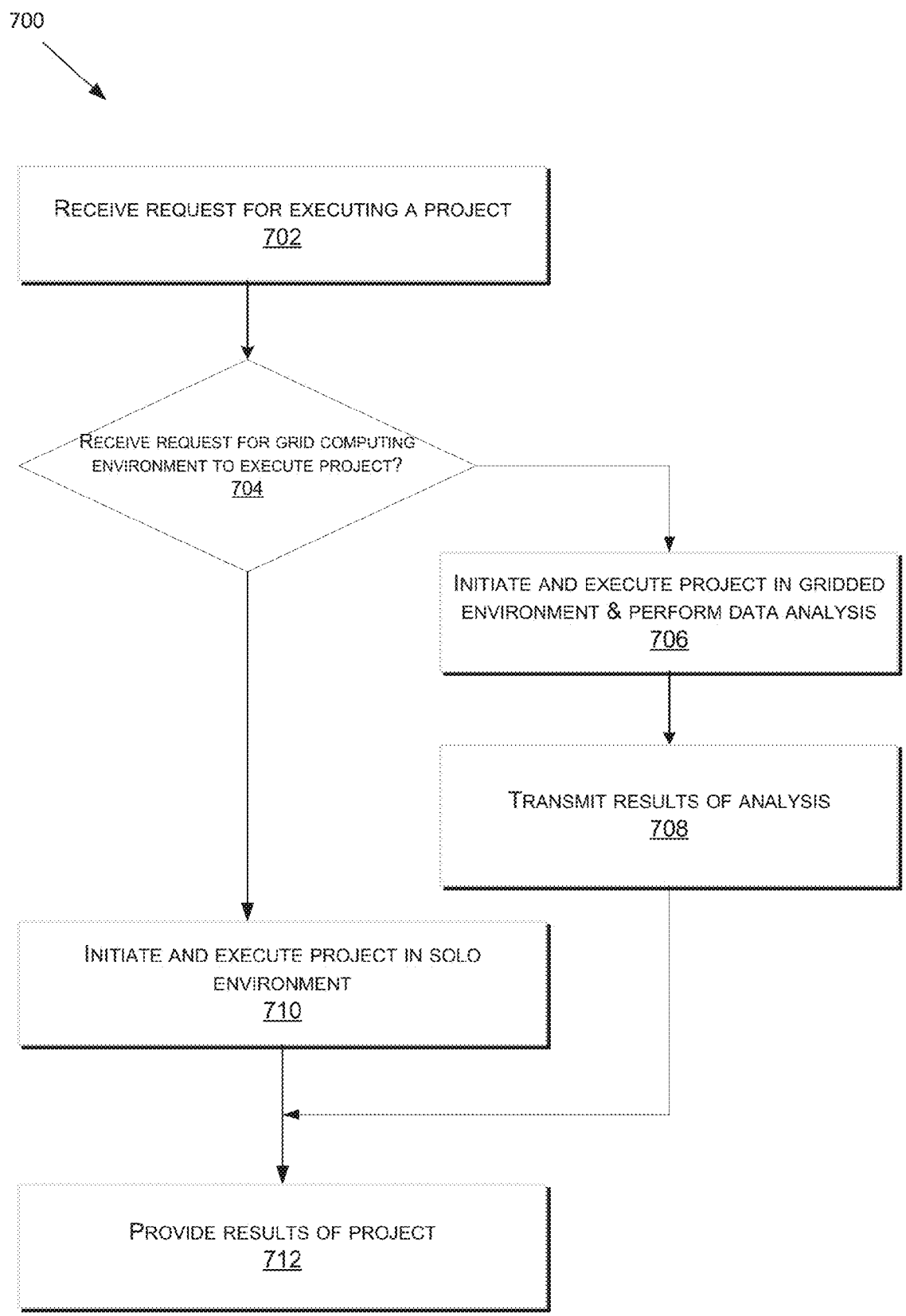
FIG. 7 illustrates a flow chart showing an example process for executing a data analysis or processing project, according to some embodiments of the present technology.

FIG. 7 illustrates a flow chart showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 874*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 850 interfacing between publishing device 872 and event subscribing devices 874a-c, according to embodiments of the present technology. ESP system 850 may include ESP device or subsystem 851, event publishing device 872, an event subscribing device A 874a, an event subscribing device B 874b, and an event subscribing device C 874c. Input event streams are output to ESP device 851 by publishing device 872. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 874a, event subscribing device B 874b, and event subscribing device C 874c. ESP system 850 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 872, to publish event streams into ESPE 800 or an event subscriber, such as event subscribing device A 874a, event subscribing device B 874b, and event subscribing device C 874c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 872, and event subscription applications instantiated at one or more of event subscribing device A 874a, event subscribing device B 874b, and event subscribing device C 874c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 872.

ESP subsystem 800 may include a publishing client 852, ESPE 800, a subscribing client A 854, a subscribing client B 856, and a subscribing client C 858. Publishing client 852 may be started by an event publishing application executing at publishing device 872 using the publish/subscribe API. Subscribing client A 854 may be started by an event subscription application A, executing at event subscribing device A 874a using the publish/subscribe API. Subscribing client B 856 may be started by an event subscription application B executing at event subscribing device B 874b using the publish/subscribe API. Subscribing client C 858 may be started by an event subscription application C executing at event subscribing device C 874c using the publish/subscribe API.

An event block object containing one or more event objects is injected into a source window of the one or more source windows 806 from an instance of an event publishing application on event publishing device 872. The event block object may generated, for example, by the event publishing application and may be received by publishing client 852. A unique ID may be maintained as the event block object is passed between the one or more source windows 806 and/or the one or more derived windows 808 of ESPE 800, and to subscribing client A 854, subscribing client B 806, and subscribing client C 808 and to event subscription device A 874a, event subscription device B 874b, and event subscription device C 874c. Publishing client 852 may further generate and include a unique embedded transaction ID in the event block object as the event block object is processed by a continuous query, as well as the unique ID that publishing device 872 assigned to the event block object.

In an operation 912, the event block object is processed through the one or more continuous queries 804. In an operation 914, the processed event block object is output to one or more computing devices of the event subscribing devices 874a-c. For example, subscribing client A 804, subscribing client B 806, and subscribing client C 808 may send the received event block object to event subscription device A 874a, event subscription device B 874b, and event subscription device C 874c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 872, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11B:
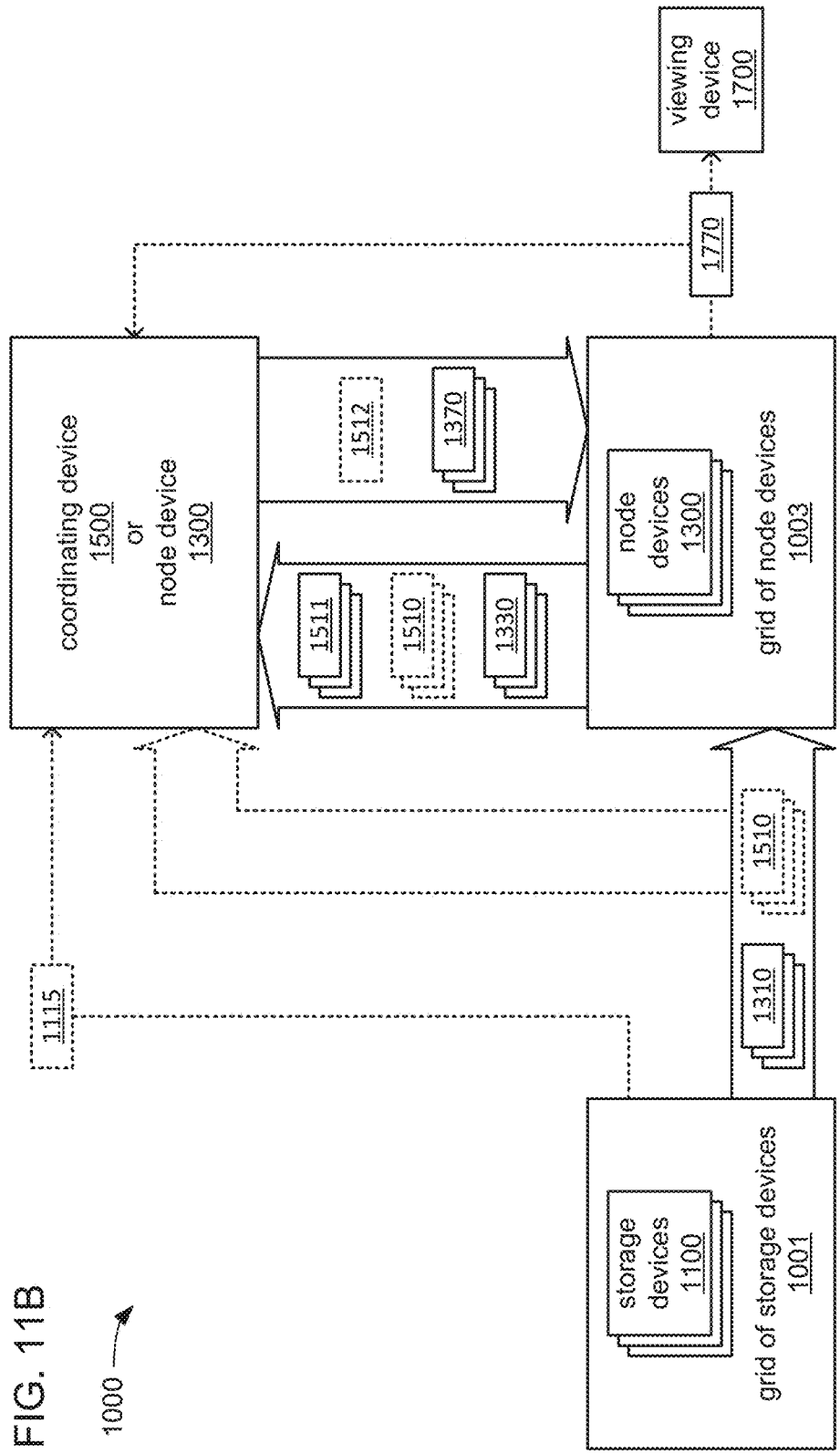

FIG. 11A illustrates a block diagram of an example embodiment of a distributed processing system 1000 incorporating multiple storage devices 1100 that form a storage device grid 1001, multiple node devices 1300 that form a node device grid 1003, a coordinating device 1500 and/or a viewing device 1700. FIG. 11B illustrates exchanges, through a network 1999, of communications among the devices 1100, 1300, 1500 and 1700 associated with a distributed analysis of and a distributed performance of tasks with multiple data set portions 1310 of a data set 1113. Referring to both FIGS. 11A and 11B, such communications may include the exchange of the data set portions 1310, metadata 1115 and/or 1510, observation data 1511, node data 1330, node instructions 1370 and/or results data 1770. However, one or more of the devices 1100, 1300, 1500 and/or 1700 may also exchange, via the network 1999, other data entirely unrelated to either of such distributed analysis or distributed task performance. In various embodiments, the network 1999 may be a single network that may extend within a single building or other relatively limited area, a combination of connected networks that may extend a considerable distance, and/or may include the Internet. Thus, the network 1999 may be based on any of a variety (or combination) of communications technologies by which communications may be effected, including without limitation, wired technologies employing electrically and/or optically conductive cabling, and wireless technologies employing infrared, radio frequency (RF) or other forms of wireless transmission.

In various embodiments, each of the storage devices 1100 may incorporate one or more of a processor 1150, a storage 1160 and a network interface 1190 to couple each of the storage devices 1100 to the network 1999. The storage 1160 may store a control routine 1140, one or more data sets 1113, and/or one or more data set portions 1310. The control routine 1140 may incorporate a sequence of instructions operative on the processor 1150 of each of the storage devices 1100 to implement logic to perform various functions, at least partially in parallel with the processors 1150 of others of the storage devices 1100. In executing the control routine 1140, the processor 1150 of each of the storage devices 1100 may operate the network interface 1190 thereof to receive data items of each of one or more of the data sets 1113 via the network 1999, and may store such data items. The processor 1150 of each of the storage devices 1100 may also generate one or more of the data set portions 1310, and may operate the network interface 1190 to provide one or more of the data set portions 1310 to one or more of the node devices 1300 via the network 1999.

Each of the one or more data sets 1113 may include any of a wide variety of types of data associated with any of a wide variety of subjects. By way of example, the data set may include scientific observation data concerning geological and/or meteorological events, or from sensors employed in laboratory experiments in areas such as particle physics. By way of another example, the data set may include indications of activities performed by a random sample of individuals of a population of people in a selected country or municipality, or of a population of a threatened species under study in the wild.

Each of the one or more data sets 1113 may be divisible into multiple ones of the data set portions 1310 for at least partially parallel transmission, and/or at least partially parallel performance of tasks thereon. Each data set 1113 may be stored as one or more data files and/or as one or more instances of at least one other type of data structure stored in a distributed manner among the multiple storage devices 1100 of the storage device grid 1001. Such distributed storage of a data set 1113 may be carried out to provide redundancy in its storage as a protection against data loss arising from a malfunction or other event associated with one or more of the storage devices 1100. Alternatively or additionally, in embodiments in which a data set 1113 is of considerably large size, such distributed storage of the data set 1113 may be carried out to improve the speed and efficiency with which the data set 1113 is able to be accessed and/or exchanged with other devices, including with the multiple node devices 1300 of the node device grid 1003. Indeed, a data set 1113 may be sufficiently large that there may be no single storage device available that has sufficient storage and/or throughput capacity.

In some embodiments, and as depicted, each of the data sets 1113 may incorporate metadata 1115 that provides indications of structural features, including and not limited to, aspects of the manner in which data items are organized and/or are made accessible within a data set 1113. Just as each of the data sets 1113 may be divisible into multiple ones of the data set portions 1310, the metadata 1115 within each of the data sets 1113 may be divisible into multiple instances of the metadata 1510. Thus, each data set portion 1310 may incorporate a corresponding instance of the metadata 1510 that provides indications of structural features of the data set portion 1310, including and not limited to, aspects of the manner in which data items are organized and/or made accessible within the data set portion 1310. Therefore, in such embodiments, each exchange of a data set portion 1310 through the network 1999 by one of the processors 1150 may include the exchange of corresponding metadata 1510. However, in other embodiments, and also depicted through the use of dotted lines, the metadata 1115 of a data set 1113 may not be incorporated into the data set 1113, and/or an instance of the metadata 1510 of a data set portion 1310 may not be incorporated into the data set portion 1310. Thus, in such other embodiments, each of the processors 1150 may separately operate the network interface 1190 to also exchange one or more instances of the metadata 1510 in addition to exchanging one or more of the data set portions 1310.

In some embodiments, the processors 1150 of the storage devices 1100 may cooperate to perform a collection function in which each of the processors 1150 operates a corresponding one of the network interfaces 1190 to receive data items of one or more of the data sets 1113 via the network 1999, and may assemble the data items into the one or more data sets 1113 over a period of time. In such embodiments, data items of a data set 1113 may be received via the network 1999 and/or in other ways from one or more other devices (not shown). By way of example, a multitude of remotely located sensor devices (e.g., geological sensors dispersed about a particular geological region, or particle detection sensors disposed at various portions of a particle accelerator) may generate numerous data items that are then provided via the network 1999 to the storage devices 1100 where the numerous data items are then assembled to form a data set 1113. In other embodiments, the storage devices 1100 may receive one or more of the data sets 1113 from a multitude of other devices (not shown), such as a grid of other node devices. By way of example, such other devices may perform one or more processing operations that generates a data set 1113 (e.g., employ a Bayesian analysis to derive a prediction of the behavior of people in a simulation of evacuating a burning building, or to derive a prediction of behavior of structural components of a bridge in response to various wind flows), and may then transmit a data set 1113 as an output to the storage device grid 1001.

In various embodiments, each of the node devices 1300 may incorporate one or more of a processor 1350, a storage 1360 and a network interface 1390 to couple each of the node devices 1300 to the network 1999. The storage 1360 may store a control routine 1340, one or more data set portions 1310, observation data 1511, node data 1330, node instructions 1370, one or more normalized data set portions 1317, one or more transformed data set portions 1318, and/or results data 1770. The control routine 1340 may incorporate a sequence of instructions operative on the processor 1350 of each of the node devices 1300 to implement logic to perform various functions, at least partially in parallel with the processors 1350 of others of the node devices 1300.

In various embodiments, the coordinating device 1500 may incorporate one or more of a processor 1550, a storage 1560, an input device 1520, a display 1580, and a network interface 1590 to couple the control device 1500 to the network 1999. The storage 1560 may store a control routine 1540, the metadata 1115 and/or multiple instances of the metadata 1510, multiple instances of the observation data 1511, annotated metadata 1512, profile data 1513, one or more instances of node instructions 1370, and/or results data 1770. The control routine 1540 may incorporate a sequence of instructions operative on the processor 1550 to implement logic to perform various functions.

As will be explained in greater detail, in executing the control routine 1340, the processor 1350 of each of the node devices 1300 may operate the network interface 1390 thereof to receive a data set portion 1310 of a data set 1113 from one of the storage devices 1100 via the network 1999. In so doing, a corresponding instance of metadata 1510 may also be received via the network 1999, in some embodiments. Thus, as depicted, there may be an at least partially parallel transmission of data set portions 1310 and/or corresponding instances of metadata 1510 from multiple storage devices 1100 of the storage device grid 1001 to multiple node devices 1300 of the node device grid 1003.

Following receipt of a data set portion 1310 and/or a corresponding instance of metadata 1510, the processor 1350 of each of the node devices 1300 may perform part of a distributed analysis of at least structural features the received data set portion 1310. In so doing, the processor 1350 of each of the node devices 1300 may generate a corresponding instance of the observation data 1511 providing indications of such features. The processor 1350 of each of the node devices 1300 may then operate the network interface 1390 to transmit the instance of the observation data 1511, along with any corresponding received instance of the metadata 1510 and/or an instance of the node data 1330 providing indications of features of the node device 1300, to the coordinating device 1500 via the network 1999.

As will also be explained in greater detail, in executing the control routine 1540, the processor 1550 of the coordination device 1500 may operate the network interface 1590 thereof to receive an instance of observation data 1511 and/or node data 1330 from each of the node devices 1300 via the network 1999. Thus, as depicted, there may be an at least partially parallel transmission of instances of observation data 1511 and/or instances of node data 1330 from multiple node devices 1300 of the node device grid 1003 to the coordinating device 1500. Such an at least partially parallel transmission may additionally include transmissions of corresponding instances of metadata 1510 from the node devices 1300 of the node device grid 1003 to the coordinating device 1500 in some embodiments. Alternatively, in other embodiments, the coordination device 1500 may receive, more directly from one of the storage devices 1100 of the storage device grid 1001, the metadata 1115 associated with the data set 1113 of which the multiple node devices 1300 of the node device grid 1003 are provided the multiple data set portions 1310.

Following receipt of the instances of observation data 1511, the processor 1550 of each of the node devices 1300 may perform an analysis of the received instances of observation data 1511. In so doing, the processor 1550 may derive the annotated metadata 1512 in which indications of structural features of all of the multiple data set portions 1310 are combined. The processor 1550 may also derive one or more instances of the node instructions 1370 for execution by the processor 1350 of each of the node devices 1300 to perform one or more tasks with its corresponding data set portion(s) 1310. The processor 1550 may further operate the display 1580 and/or the input device 1520 of the coordinating device 1500 to request input from an operator of the node device grid 1003 concerning such task(s). Alternatively or additionally, the processor 1550 may further operate the network interface 1590 to use the viewing device 1700 to so request such input. The processor 1550 may also operate the network interface 1590 to transmit the annotated metadata 1512 to the node devices 1300 in embodiments in which the metadata 1115 was received by the coordinating device 1500 from the one of the storage devices 1100. The processor 1550 may further operate the network interface 1590 to transmit the one or more instances of the node instructions 1370 to the node devices 1300 to cause the performance, at least partially in parallel, of the one or more tasks by each of the node devices 1300 with their corresponding data set portions 1310.

The processor 1350 of each of the node devices 1300 may further operate their corresponding network interfaces 1390 to receive an instance of the node instructions 1370 from the coordinating device 1500. The processor 1350 of each of the node devices 1300 may then execute its received instance of the node instructions 1370 to perform the one or more tasks with its corresponding data set portion 1310. Such execution may occur at least partially in parallel among the processors 1350 of multiple ones of the node devices 1300. In so doing, the processors 1350 of multiple ones of the node devices 1300 may cooperate to generate the results data 1770 as an output of the performance of the one or more tasks. The processor 1350 of one of the node devices 1300 may then operate its corresponding network interface 1390 to transmit the results data 1700, via the network 1999, to the coordinating device 1500 and/or the viewing device 1700.

It should be noted that, in some embodiments, the functions performed by the coordinating device 1500 may be performed by one of the node devices 1300 in lieu of the coordinating device 1500 doing so. In such embodiments, such a one of the node devices 1300 may additionally receive the metadata 1115 from a storage device 1100 and/or may receive multiple instances of metadata 1510 from multiple others of the node devices 1300. Also, such a one of the node devices may additionally receive instances of the node data 1330 and/or the observation data 1511 from multiple others of the node devices 1300. Further, such a one of the node devices 1300 may additionally transmit the annotated metadata 1512 and/or instance(s) of the node instructions 1370 to the other node devices 1300.

In various embodiments, the viewing device 1700 incorporates one or more of a processor 1750, a storage 1760, an input device 1720, a display 1780, and a network interface 1790 to couple the viewing device 1700 to the network 1999. The storage 1760 may store one or more of a control routine 1740 and the results data 1770. The control routine 1740 may incorporate a sequence of instructions operative on the processor 1750 to implement logic to perform various functions. The processor 1750 may be caused by its execution of the control routine 1740 to operate the network interface 1790 to receive the results data 1770 from one of the node devices 1300 or from the coordinating device 1500 via the network 1999. In some embodiments, the processor 1750 may also be caused to generate a visualization based on the results data 1770 to present a depiction of the results of the performance of the one or more tasks by the node device grid 1003 on the display 1780.

FIG. 12 illustrates a block diagram of an alternate example embodiment of the distributed processing system 1000 that is substantially similar to the example of FIG. 11A, but featuring an alternate embodiment of the node devices 1300 that additionally performs the storage functions of the storage devices 1100 in lieu of there being the separate and distinct storage devices 1100. Thus, as depicted, in such embodiments, the node device grid 1003 may additionally perform the function of storing one or more of the data set(s) 1113 and/or corresponding instance(s) of the metadata 1115 in lieu of the distributed processing system 1000 including the storage device grid 1001 of FIG. 11A to do so.

Figure 13:
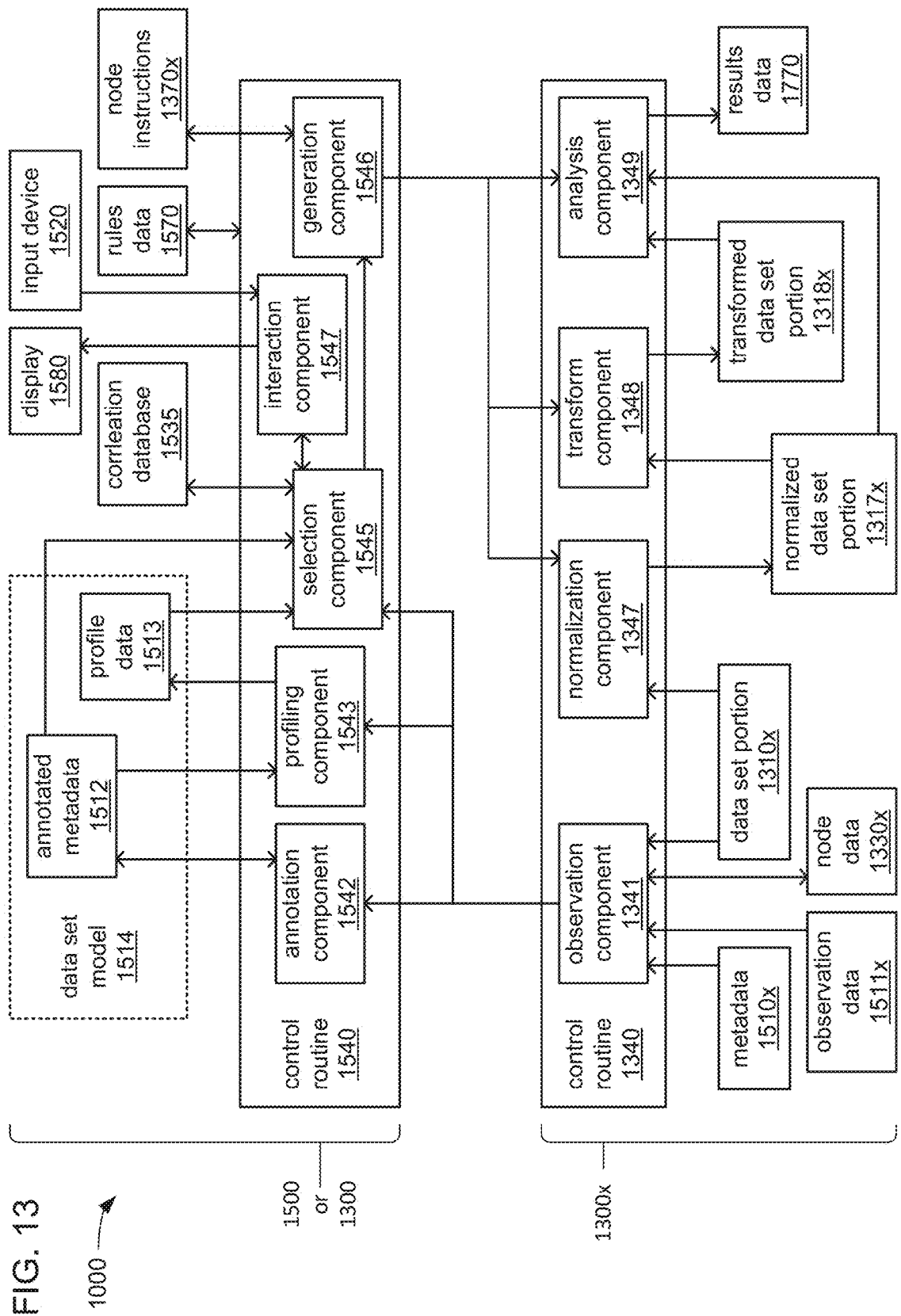
FIG. 13 illustrates an example of distributed generation and execution of instructions to perform one or more tasks with a data set.

FIG. 13 illustrates an example of distributed analysis and selection of one or more tasks to perform with data set portions 1310 of a selected data set 1113 by an embodiment of the distributed processing system 1000 of FIG. 11A or 12. More specifically, FIG. 13 illustrates aspects of an example of cooperation between the processor 1550 of the coordination device 1500 and the processor 1350 of an example node device 1300x of the node device grid 1003 to analyze an example data set portion 1310x of the selected data set 1113, select one or more tasks to be performed, and generate node instructions 1370x to be executed by the processor 1350 of the node device 1300x to perform the one or more tasks with the data set portion 1310x. The node device 1300x is an example of one of multiple ones of the node devices 1300 of the node device grid 1003, and therefore, may be an instance of one of the node devices 1300 of the grid of node devices 1003 of either FIG. 11A or 12. The node device 1300x is depicted and discussed herein as performing tasks that may be performed at least partially in parallel by multiple ones of the node devices 1300 of the node device grid 1003.

As recognizable to those skilled in the art, the control routines 1340 and 1540, including the components of which each is composed, are selected to be operative on whatever type of processor or processors that are selected to implement applicable ones of the processors 1350 and/or 1550. The instance of the control routine 1340 executed by the processor 1350 of the node device 1300x is an example of the instances of the control routine 1340 that may be executed by the processors 1350 of multiple ones of the node devices 1300 of the node device grid. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1350 and/or 1550. Where one or more device drivers are included, those device drivers may provide support for any of a variety of other components, whether hardware or software components, of the node devices 1300 and/or the coordinating device 1500.

Figure 14A:
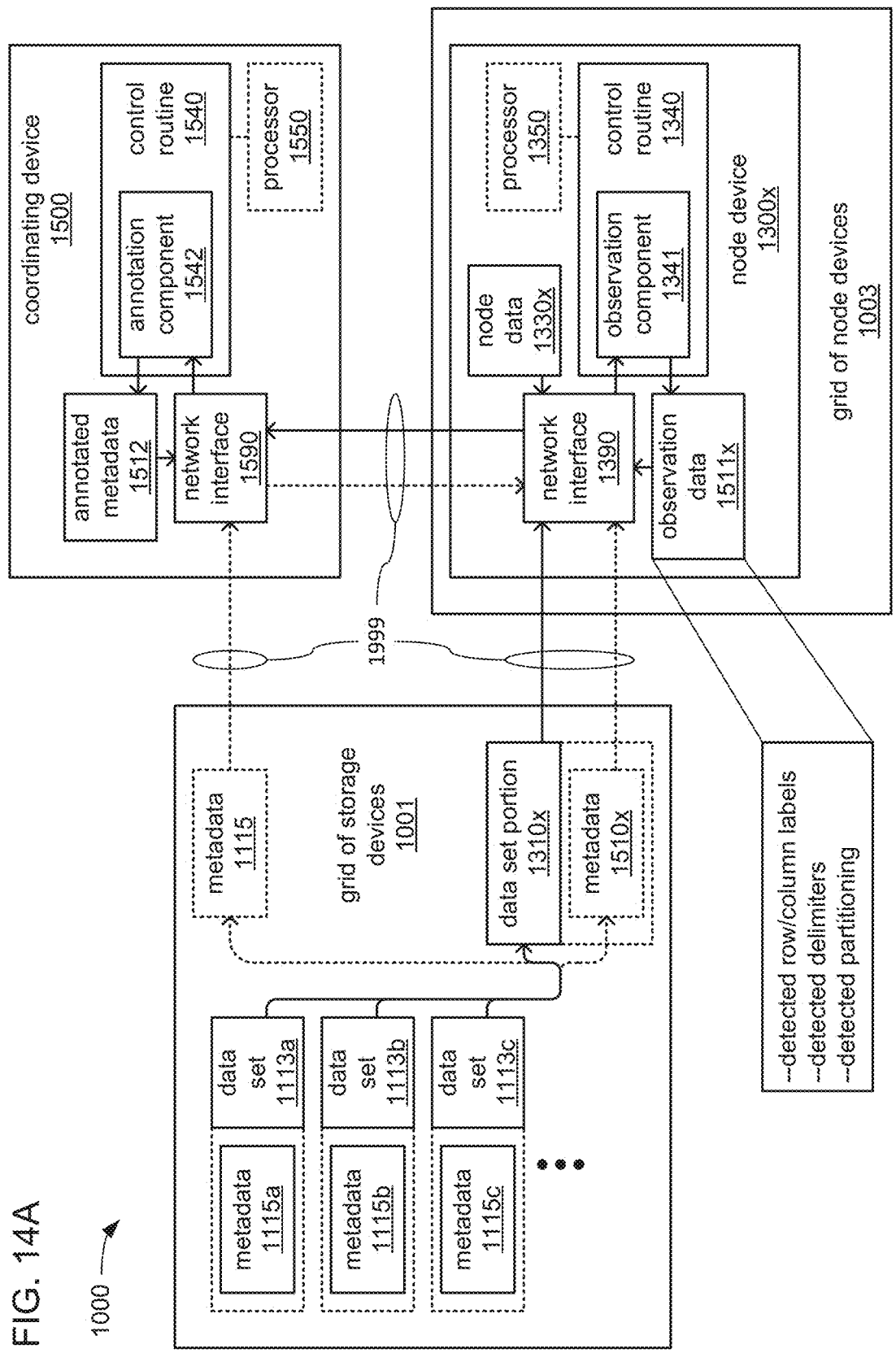
FIGS. 14A, 14B and 14C, together, illustrate an example of distributed analysis of the data set.
Figure 14B:
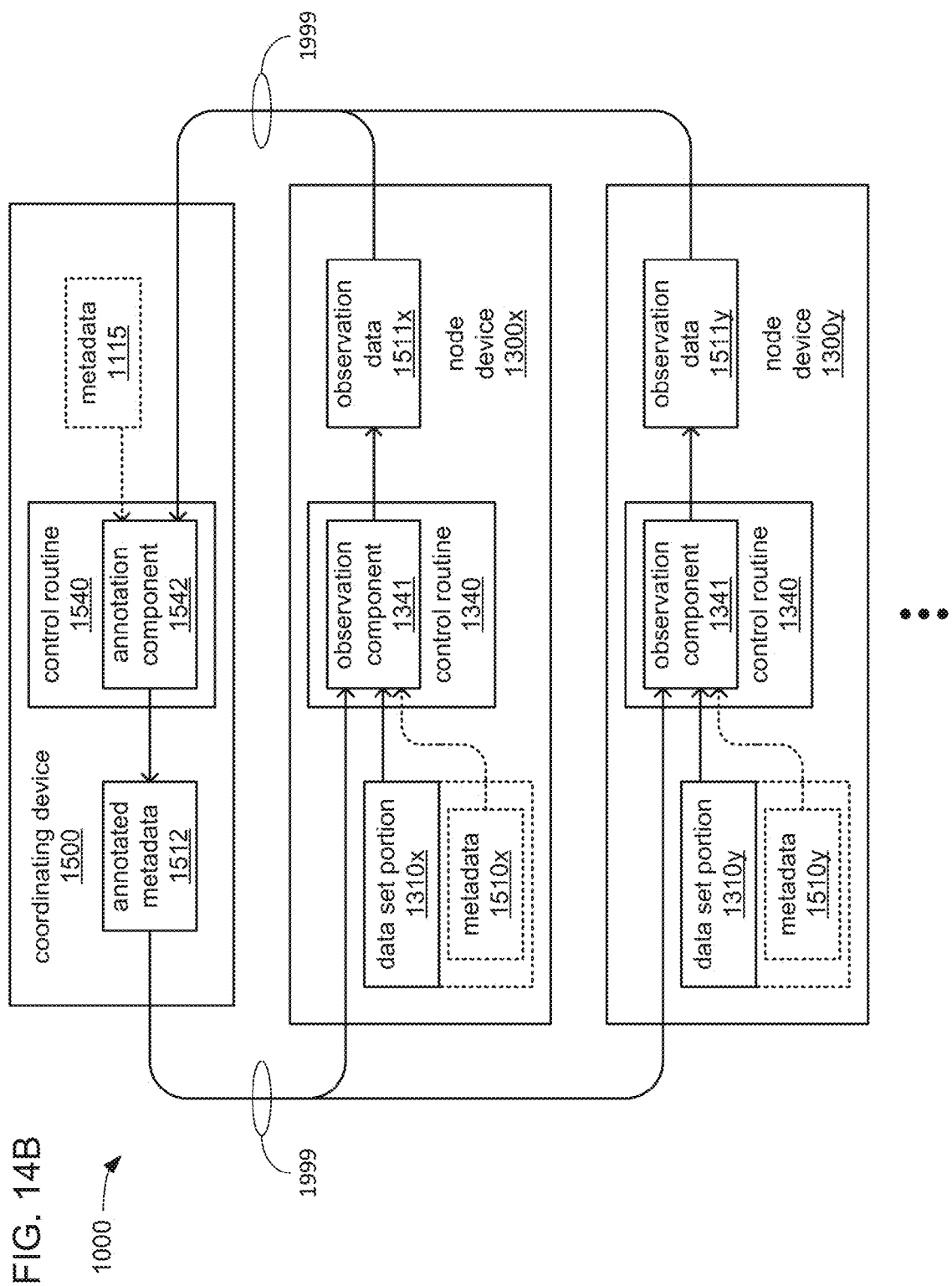
Figure 14C:
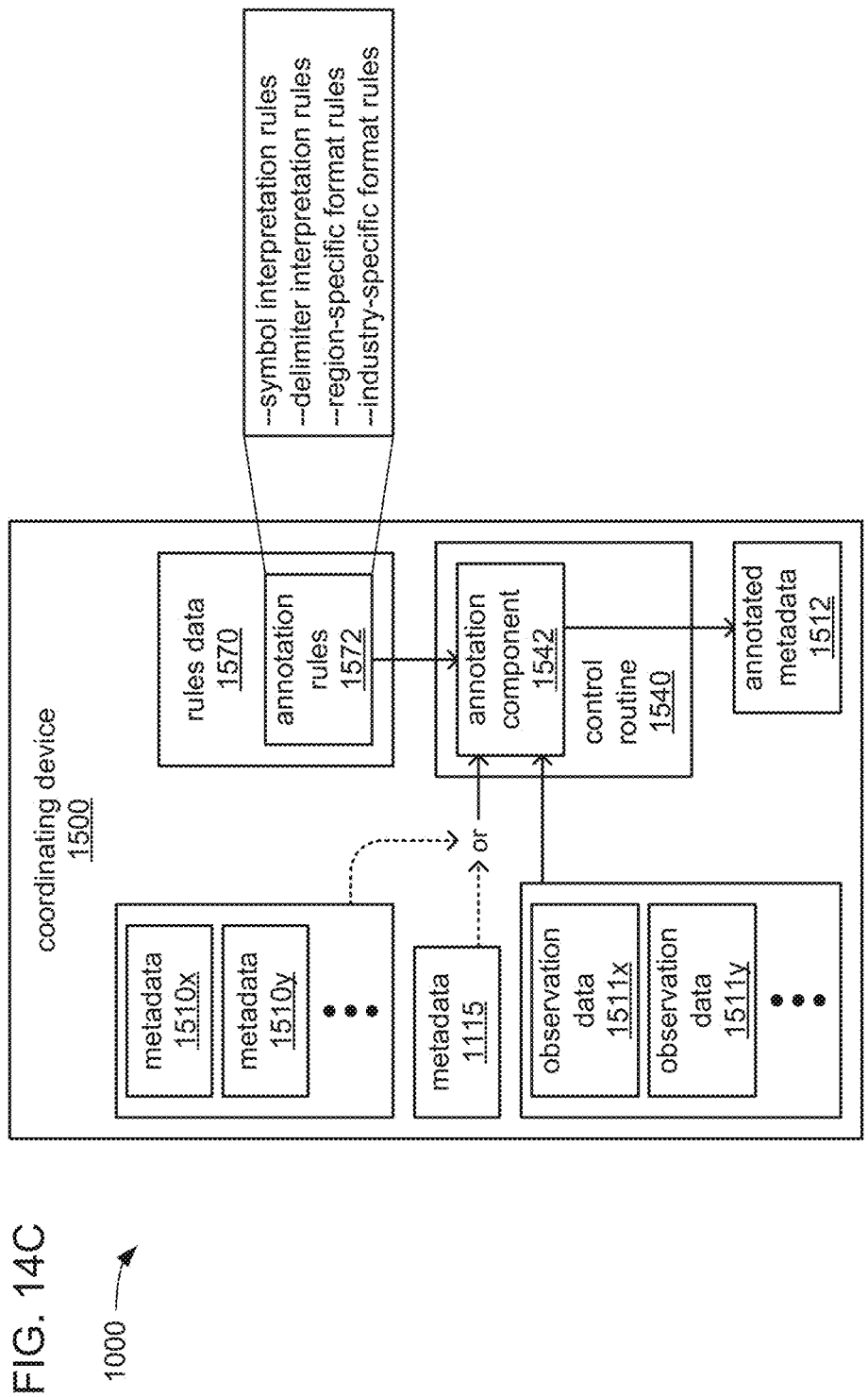

As depicted, the instance of the control routine 1340 executed by the processor 1350 of the node device 1300x may include an observation component 1341 to analyze at least the data set portion 1310x to generate an instance of the observation data 1511x that is indicative of structural features of the data set portion 1310. The observation routine 1341 may then transmit the observation data 1511 to the coordinating device 1500 via the network 1999. As also depicted, the control routine 1540 executed by the processor 1550 may include an annotation component 1542 to generate the annotated metadata 1512 indicative of structural features of the selected data set 1113 from at least the instances of the observation data 1511 provided by the multiple node devices 1300 of the node device grid 1003, including the observation data 1511x provided by the node device 1300x. FIGS. 14A-C depict aspects of such generation of the observation data 1511x and the annotated metadata 1512 in greater detail.

Turning to FIG. 14A, in some embodiments, the node device 1300x may be provided with the data set portion 1310x by one of the storage devices 1100 of the storage device grid 1001 as part of multiple node devices 1300 of the node device grid 1003 being provided with multiple data set portions 1310 at least partially in parallel by the storage device grid 1001. The multiple data set portions 1310 provided to the node device grid 1003, including the data set portion 1310x, may each be a portion of a selected one of multiple data sets 1113 stored by the storage device grid 1001, such as one of the depicted example data sets 1113a, 1113b or 1113c. As previously discussed, the question of which data set 1113 is selected to be the next data set 1113 to be so provided to the node device grid 1003 may be based on which data set(s) 1113 have been fully assembled within the storage device grid 1001 as part of a strategy to make as thorough and efficient use of the processing resources of the node device grid 1003 as possible. However, in other embodiments, such selection of data sets 1113 may be based on any of a variety of factors. Regardless of the exact manner in which the selected data set 1113 is so selected, in executing the control routine 1340, the processor 1350 of the node device 1300x may be caused by its execution of the observation component 1341 to operate the network interface 1390 to receive the data set portion 1310x from one of the storage devices 1100 via the network 1999.

In other embodiments, and as discussed in reference to FIG. 12, the multiple node devices 1300 of the node device grid 1003, including the node device 1300x, may additionally perform the function of storing the multiple data sets 1113 in lieu of the distributed processing system 1000 including the storage device grid 1001 to do so. In such other embodiments, each of the node devices 1300, including the node device 1300x, may directly retrieve portions of a selected one of the data sets 1113.

Regardless of the exact manner in which the node device 1300x is provided with the data set portion 1310x, in executing the control routine 1340, the processor 1350 may be caused by the observation component 1341 to analyze the data set portion 1300x to determine various structural features of the data set portion 1310x at least partially in parallel with others of the node devices 1300 analyzing other data set portions 1310. More specifically, the processor 1350 may be caused to analyze the data set portion 1310x for occurrences of various bit values associated with various indications of the structure by which data items are organized within the data set portion 1310x. Such bit values may be ones associated with any of a variety of delimiters, including and not limited to, tab and/or space codes, carriage return and/or end-of-line codes, end-of-page and/or end-of-row codes, one or more punctuation characters, etc. The processor 1350 may employ such bit values as a guide to determining identifiers and/or range(s) of identifiers employed as indices of an index system by which data items are organized and made accessible within the data set portion 1310x, such as row and/or column identifiers, and/or identifiers of partitions into data items may be divided. In so doing, the processor 1350 may determine the type of the index system that may be used to so organize data items within at least the data set portion 1310x, including and not limited to, a binary tree, linked list, array of one or more dimensions (e.g., a hypercube), etc. The processor 1350 may be caused by the observation component 1341 to generate the observation data 1511x to include indications of such determined structural features of the data set portion 1310x, and may then be caused to operate the network interface 1390 to transmit the observation data 1511x to the coordinating device 1500 via the network 1999.

In some embodiments, along with the data set portion 1310x, the node device 1300x may be provided with metadata 1510x that provides indications of at least some structural features of the organization of data items within the data set portion 1310x. Just as the data set portion 1310x may be one of multiple data set portions 1310, the metadata 1510x may be one of multiple instances of metadata 1510 that may be provided to the multiple node devices 1300 of the node device grid 1003 along with the multiple data set portions 1310. In some embodiments, the processor 1350 may be caused to analyze the data set portion 1310x to verify the correctness of one or more indications in the metadata 1510x of structural features of the data set portion 1310x and/or to determine a degree of completeness of such indications. Depending on the determined degree of correctness and/or degree of completeness of such indications provided by the metadata 1510x, the processor 1350 may incorporate one or more of the structural indications provided by the metadata 1510x into the observation data 1511x. Alternatively or additionally, the processor 1350 may be caused to employ one or more indications of structural features of the data set portion 1310x provided by the metadata 1510x as a guide to determining one or more additional structural features of the data set portion 1310x. By way of example, the processor 1350 may be caused by the observation component 1341 to employ an indication of a row and/or column structure of the data set portion 1310x to identify a particular delimiter that is used in the data set portion 1310x to separate data items into rows and/or columns. Following the analysis of structural features of the data set portion 1310x, the processor 1350 may be caused by the observation component 1341 to operate the network interface 1390 to transmit the metadata 1510x to the coordinating device 1500 via the network 1999 along with or lieu of the observation data 1511x.

In other embodiments, the coordinating device 1500 may be provided with the metadata 1115 that provides indications of structural features of the organization of data items within the whole of the selected the data set 1113 of which the data set portion 1310x is a part. Such provision of the metadata 1115 to the coordinating device 1500 may be in lieu of or in addition to the provision of multiple instances of the metadata 1510 to the multiple node devices 1300 of the node device grid 1003, including the provision of the metadata 1510x to the node device 1300x. In executing the control routine 1540, the processor 1550 may be caused by the annotation routine 1542 to operate the network interface 1590 to transmit the metadata 1115 descriptive of structural features of the whole of the selected data set 1113 to the multiple node devices 1300 via the network 1999. Such provision of the metadata 1115 to the multiple node devices 1300 may enhance the aforedescribed analysis performed by the processors 1350 of corresponding ones of the data set portions 1310, including the data set portion 1310x.

Turning briefly to FIG. 14B, the provision and generation of a separate instance of the observation data 1511 by each one of multiple node devices 1300 of the node device grid 1003 to the coordinating device 1500 may occur at least partially in parallel. More specifically, and as depicted, the node device 1300x may generate and then provide the observation data 1511x to the coordinating device 1500 at least partially simultaneously with others of the node devices 1300 also generating and providing corresponding instances of the observation data 1511 to the coordinating device 1500, such as the depicted observation data 1511y so generated and provided by the node device 1300y. Again, in embodiments in which the multiple node devices 1300 are each provided with a corresponding instance of the metadata 1510, each of the multiple node devices 1300 may also provide its corresponding instance of the metadata 1510 to the coordinating device 1500, as incorporated into and/or as accompanying, its corresponding instance of the observation data 1511. Thus, in such embodiments, the node devices

1500x and 1500y may provide the metadata 1510x and 1510y to the coordinating device 1500, as incorporated into and/or as accompanying the observation data 1511x and 1511y, respectively, via the network 1999, and may do so at least partially in parallel.

Turning to FIG. 14C, in executing the control routine 1540, the processor 1550 of the coordinating device 1500 may be caused by the annotation component 1542 to generate the annotated metadata 1512 from the multiple instances of the observation data 1511 and/or multiple instances of the metadata 1510 that may be received from multiple node devices 1300 (including the metadata 1510x and 1510y received from the node devices 1300x and 1300y). More specifically, the processor 1550 may be caused to combine the separate indications of structural features of each of the multiple data sets 1310 received from each of the multiple node devices 1300 via the multiple received instances of observation data 1511 and/or via the multiple received instances of metadata 1510 into a single set of indications within the annotated metadata 1512 of structural features of the entire selected data set 1113. In so doing, the processor 1550 may match and combine indications of different portions of the index system that may be associated with different ones of the data set portions 1310 into indications of the index system that span the whole of the selected data set 1113. By way of example, the processor 1550 may, for each dimension of the index system, match corresponding identifiers and/or range(s) of identifiers employed as indices within each of the data set portions to derive a complete set and/or range of identifiers.

However, in embodiments in which the coordinating device 1500 is provided with the metadata 1115 that includes indications of structural features of the whole of the selected data set 1113, the processor 1550 may be caused to generate the annotated metadata 1512 by augmenting the metadata 1115 with the aforedescribed indications provided by the multiple received instances of the observation data 1511 and/or the multiple received instances of the metadata 1510. The processor 1550 may be caused to analyze the received metadata 1115 to determine whether it provides indications of all of the structural features of the selected data set 1113 that are to be included in the annotated metadata 1512. If so, then the processor 1550 may employ the received metadata 1115 as the annotated metadata 1512 with little or no modification, and may forego the performance of any analysis of any received instances of observation data 1511 and/or metadata 1510. However, if the received metadata 1115 does not do so, then the processor 1550 may proceed with analyzing received instances of observation data 1511 and/or metadata 1510, and may use the indications provided therein to so augment the metadata 1115 to generate the annotated metadata 1512.

As depicted, the rules data 1570 may include annotation rules 1572 for use with the annotation component 1542. More specifically, in causing the processor 1550 to perform such analyses and to generate the annotated metadata 1512, the annotation rules 1572 may specify the selection of analyses to be performed and/or various aspects of the generation of the metadata 1512. By way of example, the annotation rules 1572 may specify one or more bit patterns, delimiter characters, formatting codes and/or other cues that may be present in the metadata 1115 and/or 1510 and that may indicate the manner in which data items are organized within each of the data set portions 1310. Alternatively or additionally, the annotation rules 1572 may specify formatting information for one or more types of data items to assist in distinguishing data items from other data items and/or from other bit patterns employed in organizing data items within the data set portions 1310. In some embodiments, the annotation rules 1572 may be at least partially implemented as code in a scripting language (or other form of expression) that specifies an order in which various analyses are to be performed, as well as under what detected conditions, such that there may be one or more conditional branches of analyses and/or calculations that may be performed. Such conditional performances of analyses and/or computations may be deemed necessary to accommodate differences in features in the organization of data items within the data set portions 1310. By way of example, different analyses may be employed to identify indicators of organization of data items where the data items are organized into branches of a tree-like data structure, rather than into an array of one or more dimensions.

In some embodiments, the processor 1550 may be caused by the annotation component 1542 to operate the network interface 1590 to transmit at least a portion of the annotation rules 1572 to the multiple node devices 1300. In such embodiments, the processors 1350 may be caused by the observation component 1341 within each of the multiple node devices 1300 to employ the specifications of the one or more bit patterns, delimiter characters, formatting codes and/or other cues provided in the annotation rules 1572 in analyzing corresponding ones of the data set portions 1310 to determine structural features thereof.

Returning to FIG. 14B, regardless of the exact manner in which the processor 1550 is caused by annotation component to generate the annotated metadata 1512, the processor 1550 may also be caused to operate the network interface 1590 to provide the annotated metadata 1512 to the multiple node devices 1300 of the node device grid 1003 (including the node devices 1300x and 1300y) via the network 1999. Thus, the annotated metadata 1512 may be provided to the node devices 1300x and/or 1300y at least partially in parallel with the provision of the annotated metadata 1512 to still others of the multiple node devices 1300 of the node device grid 1003 (e.g., via a multicast network transmission). In some embodiments, this may be done to provide each of the node devices 1300 with access to indications of structural features of the entire selected data set 1113, including a more complete description of the indexing system thereof, to enable the performance of further operations by each of the node devices 1300 with their corresponding data set portions 1310.

Returning to FIG. 14A, among such further operations may be further analyses by the processors 1350 of the multiple node devices 1300 of their corresponding data set portions 1310 to determine additional features thereof. More specifically, for example, the processor 1350 of the node device 1300x may employ one or more indications in the received annotated metadata 1512 of structural features of the whole of the selected data set 1113 as a guide to determining further features of the data set portion 1310x. By way of example, the processor 1350 of the node device 1300x may be caused by the observation component 1341 to employ such indications of structural features of the whole of the selected data set 1113 as a guide to identify additional structural features of the manner in which data items are organized within the data set portion 1300x, such as the use of further delimiters employed to organize data items in one or more dimensions, and/or the use of further dimensions of the indexing scheme within the data set portion 1300x. As the processor 1350 of each of the multiple node devices 1300 performs such further analyses of their corresponding data set portions 1310, the processor 1350 of each of the multiple node devices 1300 may be caused to generate another instance of the observation data 1511 and to operate their corresponding network interface 1390 to provide such another instance of the observation data 1511 to the coordinating device 1500 via the network 1999. This may be done to enable the processor 1550 of the coordinating device 1500 to augment the annotated metadata 1512 with further indications of structural features of the selected data set 1113.

Returning again to FIG. 14B, in some embodiments, there may be multiple iterations of both the provision of instances of observation data 1511 by the multiple node devices 1300 to the coordinating device 1500 and the provision of augmented versions of the annotated metadata 1512 by the coordinating device 1500 to the multiple node devices 1300 as part of an iterative process to generate a more complete version of the annotated metadata 1512. In some embodiments, the processor 1550 may be caused by the annotation component 1542 to monitor the content of each new version of the annotated metadata 1512, and may cause the cessation of such iterations in response to making a determination that the newest version of the annotated metadata 1512 adds no new indications of structural features of the selected data set 1113. In other embodiments, the processor 1350 of each of the multiple node devices 1300 may monitor the content of each new instance of its corresponding observation data 1511, and may operate its corresponding network interface 1390 to transmit an indication to the coordinating device 1500 of there being no new indications of structural features of its corresponding data set portion 1310 added in its newest instance of observation data 1511. In such other embodiments, the processor 1550 may cause the cessation of such iterations in response to receiving such an indication from all of the multiple node devices 1300.

Along with analyses to determine structural features, in some embodiments, the processor 1350 of each of the multiple node devices 1300 may be caused to additionally analyze its corresponding data set portion 1310 to determine one or more features of the data items therein. Further, at least some of the processors 1350 of the multiple node devices 1300 (including the processors 1350 of the node devices 1300$x$ and 1300$y$) may each perform such an analysis at least partially in parallel. The processor 1350 of each of the multiple node devices 1300 may be caused to perform such an analysis prior to the receipt of any version of the annotated metadata 1512 that may be provided by the coordinating device 1500, if the coordinating device 1500 so provides the annotated metadata 1512 to the multiple node devices 1300. Alternatively or additionally, the processor 1350 of each of the multiple node devices 1300 may be caused to perform such an analysis in response to the receipt of each version of the annotated metadata 1512 provided by the coordinated device 1500, and may employ each such version of the annotated metadata 1512 as a guide to the organization of data items in so doing. Where such an analysis is caused to be performed iteratively in response to the receipt of multiple versions of the annotated metadata 1512, the processor 1350 of each of the multiple node devices 1300 may monitor the content of each new instance of its corresponding observation data 1511, and may operate its corresponding network interface 1390 to transmit an indication to the coordinating device 1500 of there being no new indications of features of the data items within its corresponding data set portion 1310 added in its newest instance of observation data 1511. In such other embodiments, the processor 1550 may cause the cessation of such iterations in response to receiving such an indication from all of the multiple node devices 1300.

Any of a variety of determinations concerning features of the data items within each of the data set portions 1310 may be made by the processors 1350 of the multiple node devices 1300, including those of the node devices 1300$x$ and 1300$y$. By way of example, the processor 1350 of each node device 1300 may determine the type(s) of data present among the data items within its corresponding data set portion 1310, including and not limited to, binary values, integer values, floating point values, text characters, bit mapped still images, frames of video data, samples of audio data, etc. Also by way of example, the processor 1350 of each node device 1300 may determine a density of the data items and/or an indication of the size of the data items within its corresponding data set portion 1310. The processor 1350 of each of the node devices 1300 may then be caused by the observation component 1341 to operate its corresponding network interface 1390 to provide indications of such features of the data items within its corresponding data set portion 1310 to the coordinating device 1500 as part of one or more of its corresponding instances of the observation data 1511. In some embodiments, such indications may include one or more statistical measures, including and not limited to, an indication of an average size, mean size, smallest size and/or largest size of data items measured in bits, bytes, words, doublewords, etc.; indications of an average value, mean value, smallest value and/or largest value of data items; and/or randomly selected samples of the data items that may represent a relatively small subset of a data set portion 1310, including and not limited to, a single row or column of data items.

In addition to the provision of one or more instances of observation data 1511 and/or the provision of an instance of metadata 1510 to the coordinating device 1500, the processor 1350 of each node device 1300 may also be caused to operate its corresponding network interface 1390 to provide an instance of node data 1330 to the coordinating device 1500 via the network 1999. Each such instance of the node data 1330 may include indications of various features of the processing environment provided within its corresponding one of the node devices 1300. Such features may include, and are not limited to, the type and/or speed of the processor 1350, quantity and/or type(s) of processing cores and/or caches within the processor 1350, the data storage capacity and/or data storage organization provided by the storage 1360, the quantity and/or type of one or more storage components employed by the storage 1360, the type and/or version of operating system used, and/or the types and/or versions of any compilers and/or interpreters used. In some embodiments, the instances of node data 1330 may additionally specify dynamic aspects of the processing environment provided by each of the node devices 1300, such as and not limited to, currently available quantities of storage and/or measures of current levels of performance of processor(s) and/or other components of a node device may be provided.

Figure 15A:
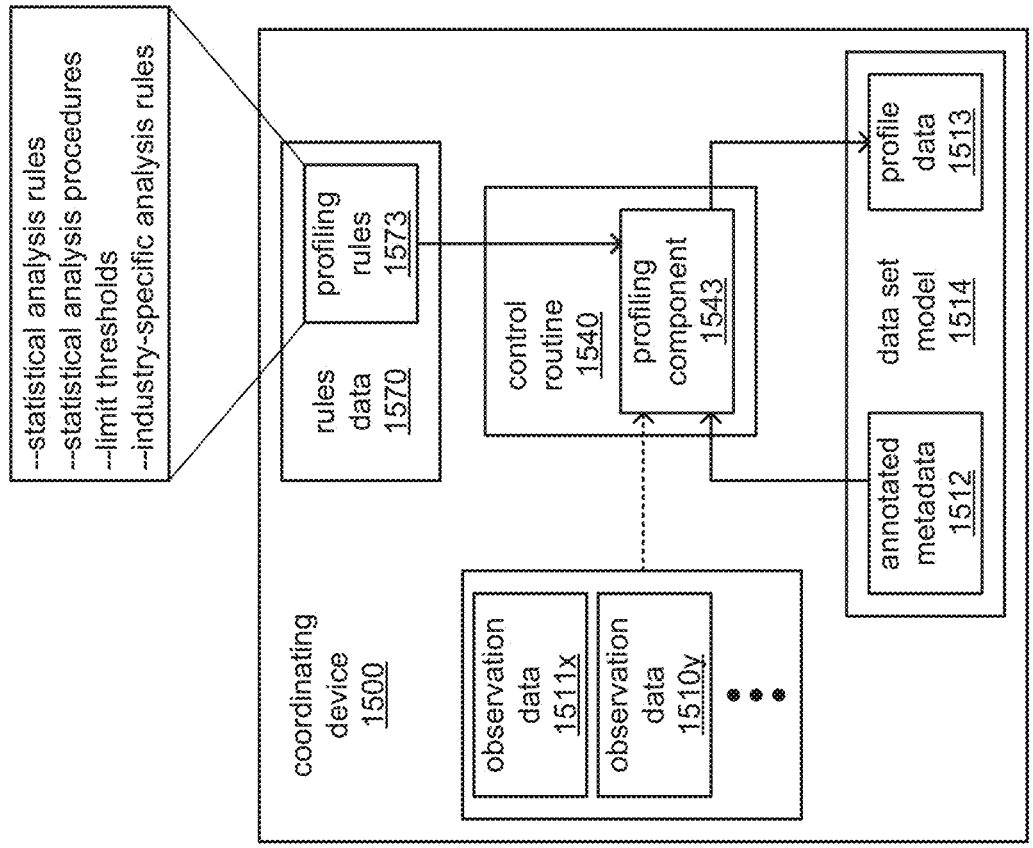
FIGS. 15A and 15B, together, illustrate an example of determination of one or more tasks to perform with the data set.
Figure 15B:
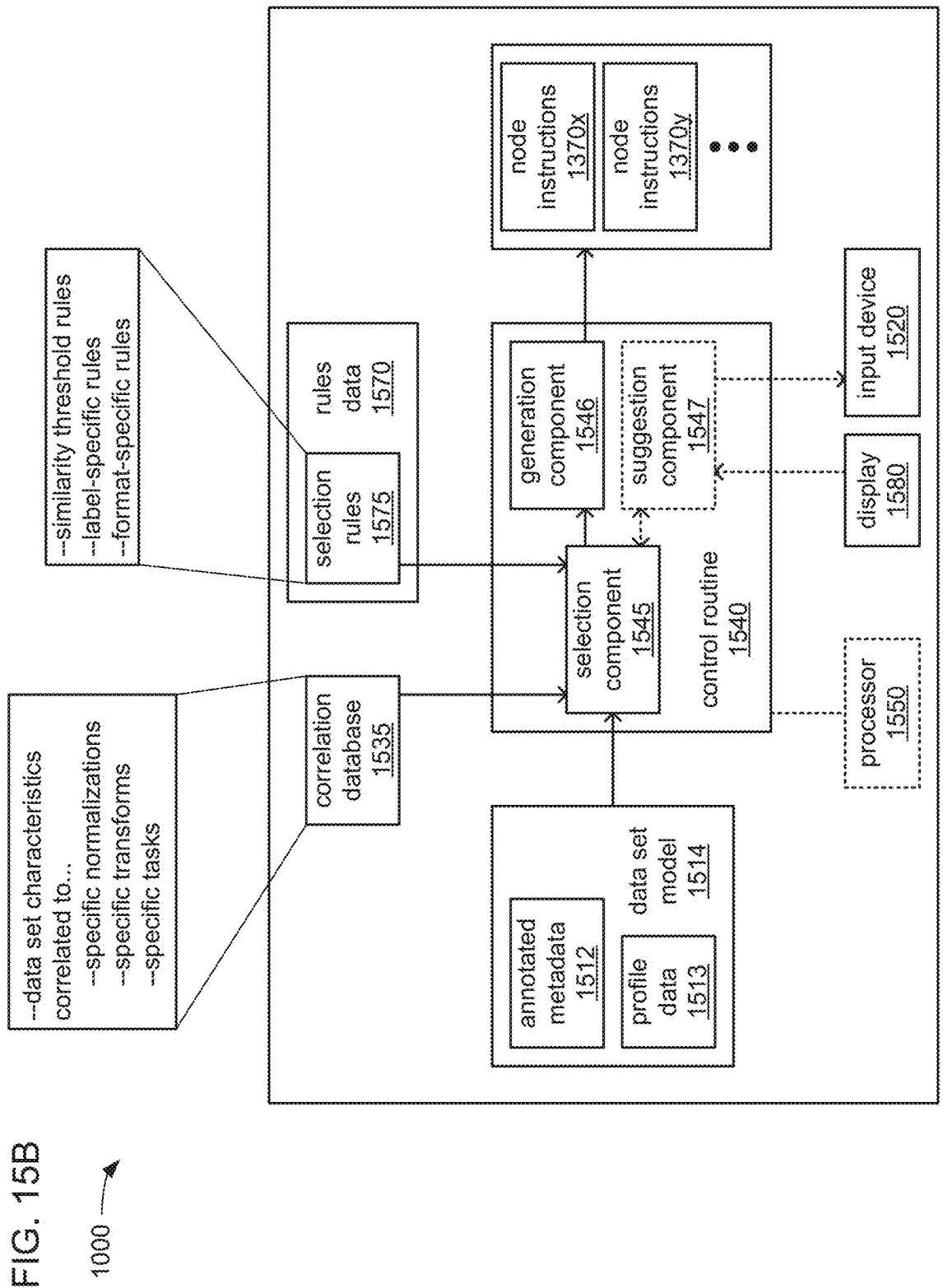

Returning to FIG. 13, as depicted, the control routine 1540 executed by the processor 1550 may include a profiling component 1543 to generate the profile data 1513 indicative of features of the data items within the selected data set 1113 from at least the multiple instances of the observation data 1511, including the observation data 1511$x$ and 1511$y$ provided by the node devices 1300$x$ and 1300$y$, respectively. The control routine 1540 may also include a selection component 1545 to automatically select one or more tasks to be performed by the multiple node devices 1300 with their corresponding data set portions 1310 of the selected data set 1113 based on the structural features indicated in the annotated metadata 1512 and the features of the data items indicated in the profile data 1513. FIGS. 15A-B depict aspects of such generation of the profile data 1513 and the selection of one or more tasks to perform with the selected data set 1113 in greater detail.

Turning to FIG. 15A, in executing the control routine 1540, the processor 1550 of the coordinating device 1500 may be caused by the profiling component 1543 to generate the profile data 1513 from the multiple instances of the observation data 1511 that may be received from the multiple node devices 1300 and/or the annotated metadata 1512 caused to be generated by the annotation component 1542. More specifically, the processor 1550 may be caused to combine indications by the instances of the observation data 1511 of features of data items within each of the data set portions 1310 as part of a statistical analysis to generate the profile data 1513 to include indications of features of data items within the whole of the selected data set 1113. Such indications may include average, mean, minimum and/or maximum values that specify such features, and/or one or more ranges of values associated with such features. Among such features may be highest, lowest, average and/or mean numeric values of the data items, ranges of letters of an alphabet included in data items, quantities of the instances of one or more particular values found among the data items (e.g., what value occurs most and/or least frequently among the data items), quantities of bits occupied by data items (e.g., size of data items expressed as quantities of bits, bytes, words, etc.), degree of sparsity of data items within spaces allocated within arrays of one or more dimensions, and/or degree of decimal place accuracy of values of data items.

As depicted, the rules data 1570 may include profiling rules 1573 for use with the profiling component 1543. More specifically, in causing the processor 1550 to perform such statistical analyses and/or calculations to derive the indications of data item features included in the profile data 1513, the profiling rules 1573 may specify the selection of analyses and/or calculations to be performed, and/or various aspects of the performances of various analyses and/or calculations. By way of example, the profiling rules 1573 may implemented as code in a scripting language (or other form of expression) that specifies an order in which various analyses and/or calculations are to be performed, as well as under what detected conditions, such that there may be one or more conditional branches of analyses and/or calculations that may be performed. Such conditional performances of analyses and/or computations may be deemed necessary to accommodate differences in features in the data items deemed likely to be encountered in different data sets that may become the selected data set 1113. By way of example, a comparison of indications of degrees of decimal place accuracy of values of data items may not be possible where the data items of one or both data sets includes no floating point values.

In some embodiments, the combination of the annotated metadata 1512 providing indications of structural features of the selected data set 1113 and the profile data 1513 providing indications of features of the data items within the selected data set 1113 may, together, form a data set model 1514 of the selected data set 1113. Thus, the data set model 1514 may provide a sufficient description of features of the selected data set 1113 as to enable the data set model 1514 to be employed as a proxy in making automated determinations of actions to be taken regarding the selected data set 1113. Yet, advantageously, the storage space within the storage 1560 that is occupied by the data set model 1514 may be significantly smaller than the total storage space within the storages 1360 of the multiple node devices 1300 that is occupied by all of the data set portions 1310 of the selected data set 1113.

Turning to FIG. 15B, in continuing to execute the control routine 1540, the processor 1550 may be caused by the selection component 1545 to compare the data set model 1514 associated with the selected data set 1113 to other data set models within the correlation database 1535. The correlation database 1535 may include multiple entries, where each entry includes a previously generated data set model of a previously analyzed data set, and each entry correlates its previously generated data set model to an indication of one or more tasks that were previously performed with its corresponding previously analyzed data set. In these comparisons, the processor 1550 may be caused to compare indications in the data set model 1514 of structural features and/or of features of data items of the selected data set 1113 to corresponding indications in each of the previously generated data set models of corresponding features of each of the previously analyzed data sets. Thus, in these comparisons, each of the previously generated data set models may serve as a proxy for a previously analyzed data set just as the data set model 1514 may serve as a proxy for the selected data set 1113. Through these comparisons, the processor 1550 may identify one or more of the previously analyzed data sets that are similar to the selected data set 1113 to within a predetermined degree. As will be explained in greater detail, if one or more of such sufficiently similar previously analyzed data sets are identified, the processor 1550 may be caused to automatically select the one or more tasks previously performed with one of such sufficiently similar previously analyzed data sets to be the one or more tasks to be performed with the selected data set 1113.

In performing each comparison between the data set model 1514 and one of the previously generated data set models of the correlation database 1535, the processor 1550 may be caused to compare indications of corresponding features of the data set models to determine whether there is a degree of similarity in each compared corresponding feature that meets a predetermined threshold of similarity. By way of example, the processor 1550 may be caused by the selection component to compare, between the data set model 1514 and each of the previously generated data set models within the correlation database 1535, indications of type of organization of data items, indications of quantity of dimensions of the indexing schemes (if applicable), indications of degree of sparsity of data items, indications of range(s) of data values of data items, indications of quantities of rows of data items, indications of identifiers given to rows, indications of data formats used, etc.

As depicted, the rules data 1570 may include selection rules 1575 for use with the selection component 1545. More specifically, the selection rules 1575 may specify what indications of structural features and/or indications of features of data items are to be compared, and/or the one or more predetermined thresholds of similarity. Similar to the profiling rules 1573, the selection rules 1575 may include code in a scripting language (or other form of expression) that specifies an order in which various comparisons are made, as well as under what detected conditions, such that there may be one or more conditional branches of comparisons that may be performed. Such conditional performances of comparisons may be deemed necessary to accommodate differences in at least the structural features between the selected data set 1113 and each of the previously analyzed data sets. By way of example, a comparison of indications of quantities of dimensions of indexing schemes may not be possible where the data items of one or both data sets associated with the comparison employs a tree structure to organize data items, instead of an array.

If more than one previously analyzed data set is identified as being sufficiently similar to the selected data set 1113, the processor 1550 may be caused by the selection component 1545 to determine relative degrees of similarity between the features of the selected data set 1113 as indicated by the data set model 1514 and the corresponding features of each of the sufficiently similar previously analyzed data sets as indicated by their corresponding previously generated data set models. The selection rules 1575 may specify relative weightings to be given to each of the structural features and/or features of data items that the processor 1550 may be caused to use in calculating the relative degrees of similarity. The processor 1550 may then be caused to compare the calculated relative degrees of similarity to identify a single one of the previously analyzed data sets that is most similar in its structural and/or data item features to the selected data set 1113. With the most similar one of the previously analyzed data sets so identified, the processor 1550 may then employ the correlation database 1535 to identify the one or more tasks that were previously performed with that previously analyzed data set, and may thereby select the identified previously performed one or more tasks as the one or more tasks to be performed with the selected data set 1113.

Figure 16A:
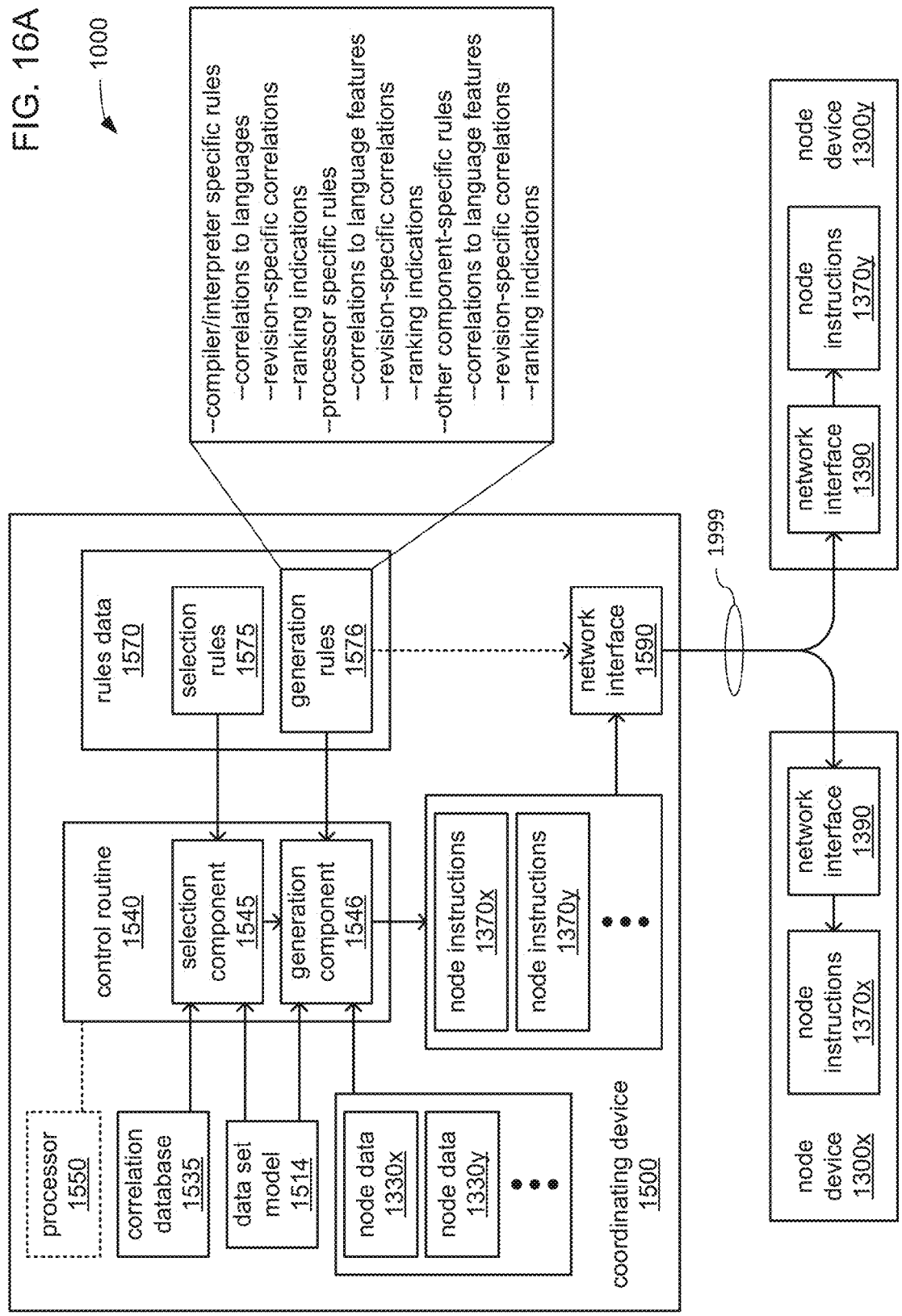
FIGS. 16A, 16B and 16C, together, illustrate an example of distributed performance of the one or more tasks with the data set.
Figure 16B:
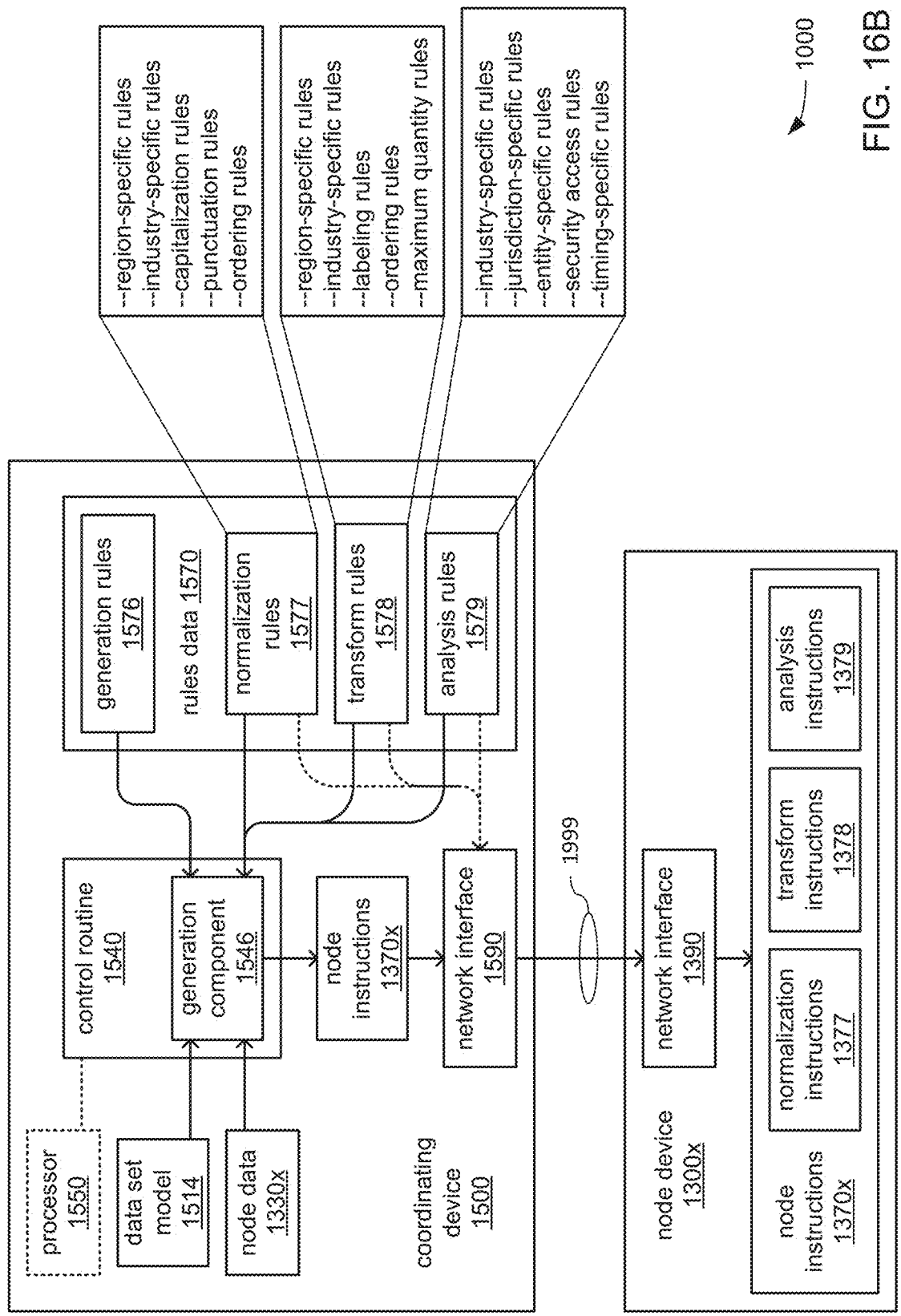
Figure 16C:
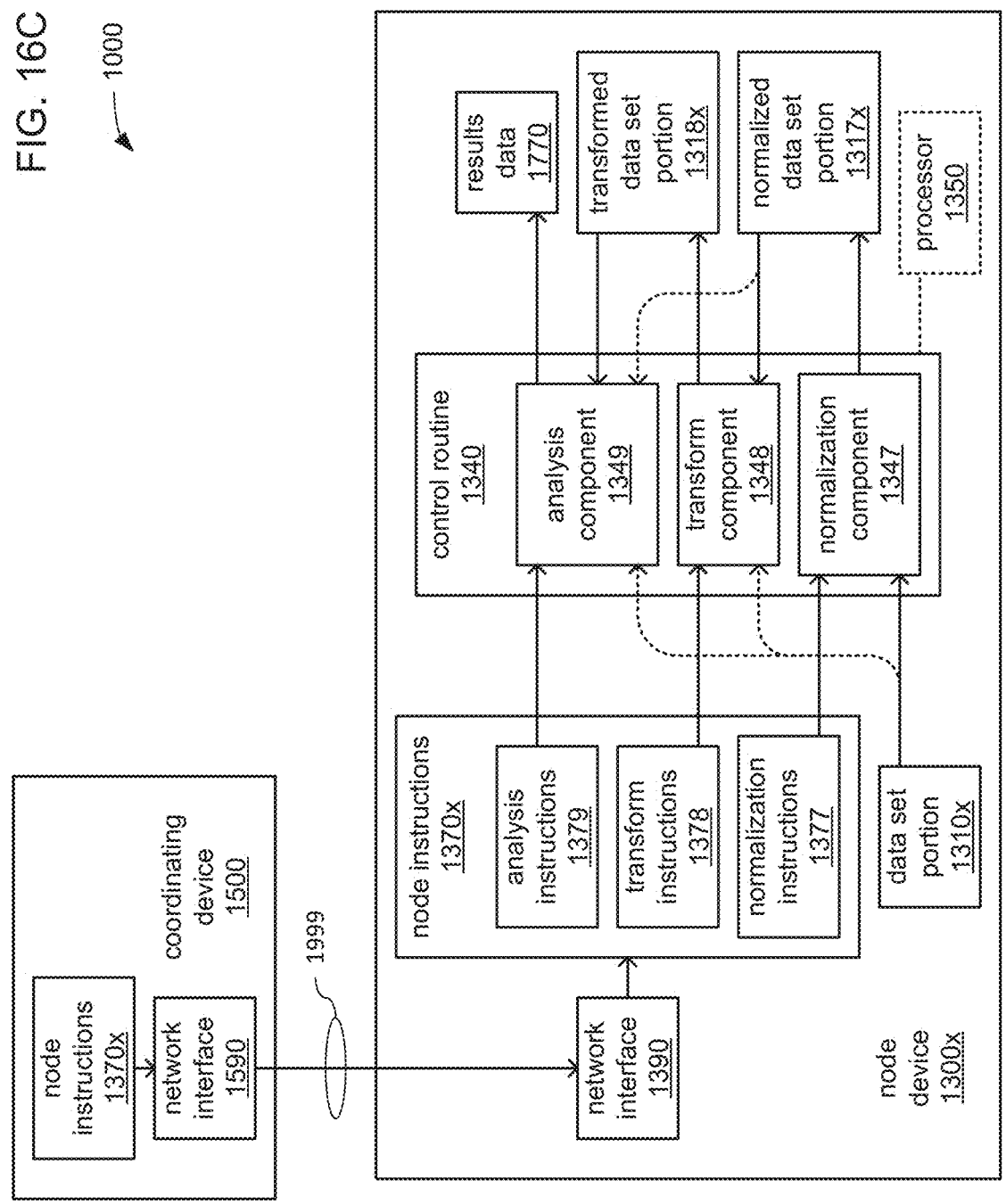

Referring to both FIGS. 13 and 15B, as depicted, the control routine 1540 executed by the processor 1550 may include a generation component 1546 to generate one or more instances of the node instructions 1370 (e.g., the node instructions 1370x and 1370y) to cause the processors 1350 of the node devices 1300 to perform the selected one or more tasks with corresponding ones of the data set portions 1310. The control routine 1540 may also include an interaction component 1547 to present an operator of the node device grid 1003 with an indication of the one or more tasks caused to be selected by the selection component 1545 to be performed with the selected data set 1113, and to do so with a request for input from the operator concerning such a selection. As also depicted, the instance of the control routine 1340 executed by the processor 1350 of the node device 1300x may include a normalization component 1347, a transform component 1348 and/or a task component 1349 to cause performance of a normalization task, a transformation task and/or an analysis task, respectively, within the processing environment provided by the node device 1300x. FIGS. 16A-C depict aspects of such generation of one or more instances of the node instructions 1370 and of such a presentation of the selected one or more tasks along with a request for input in greater detail.

Turning to FIG. 16A, in executing the control routine 1540, the processor 1550 of the coordinating device 1500 may be caused by the generation component 1546 to determine, based at least on the received instances of the node data 1330, how many different instances of the node instructions 1370 are to be generated to cause the multiple node devices 1300 to perform the one or more tasks selected by the selection component 1545. The processor 1550 may then be caused by the generation component 1546 to generate the one or more instances of the node instructions based at least on features of the selected data set 1113 indicated by the data set model 1514 and/or features of the processing environments of the multiple node devices 1300 indicated by the received instances of the node data 1330. As depicted, the rules data 1570 may include generation rules 1576 for use with the generation component 1546. The generation rules 1576 may specify various analyses of the received instances of the node data 1330 to be performed by the processor 1550, and/or may specify a policy that the processor 1550 is to be caused to strive toward, in determining how many different instances of the node instructions 1370 are to be generated. Similar to the profiling rules 1573 and/or the selection rules 1575, the generation rules 1576 may include code in a scripting language (or other form of expression) that specifies an order in which various tests are performed, as well as under what detected conditions, such that there may be one or more conditional branches of tests that may be performed.

In some embodiments, the processor 1550 may be caused to analyze instances of the node data 1330 received from multiple node devices 1300 to identify one or more programming, scripting, database and/or other languages that the processing environment within each node device 1300 may be capable of supporting the execution of. As previously discussed, instances of the node data 1330 may include indications of one or more language compilers, interpreters and/or libraries present within a node device 1300 that may each support the execution of one or more languages. The processor 1550 may correlate such indications of the presence of one or more compilers, interpreters and/or libraries with indications provided in the generation rules 1576 of what language(s) are supported by each. As also previously discussed, instances of the node data 1330 may include indications of a type, revision level, source, etc. of each such compiler, interpreter and/or library. The processor 1550 may correlate such indications of type, revision level, source, etc., with indications provided in the generation rules 1576 of what feature(s) of each language are supported by each. By way of example, a later revision of a compiler, interpreter and/or library may support the use of a specific language instruction that enables a more efficient performance of a particular task, while an earlier version of the same compiler, interpreter and/or library may not support the use of that specific language instruction.

Alternatively or additionally, the processor 1550 may be caused to analyze instances of the node data 1330 received from multiple node devices 1300 to identify one or more features of each node device 1300 that, if utilized, may improve the speed and/or efficiency with which each node device 1300 may be used to perform the one or more selected tasks with its corresponding data set portion 1310. As previously discussed, instances of the node data 1330 may include indications of one or more features associated with a processor, co-processor, storage, operating system, network interface and/or other components present within a node device 1300. As also previously discussed, instances of the node data 1370 may specify a type, revision level, source, etc. of a processor, a storage device, and/or other components present within a node device 1300. The processor 1550 may correlate such indications of the presence of one or more of such features, as well as such indications of types, revision levels and/or sources of components, with indications provided in the generation rules 1576 of what feature(s) of each language are supported by each. As further previously discussed, each instance of the node data 1330 may include indications of dynamically changing features and/or features with dynamically changing characteristics, such as and not limited to, measures of performance of processor(s), quantities of available storage space within storage component(s), and/or availability of one or more components that may be shared among processes. The processor 1550 may correlate such indications of dynamic changes in availability and/or status to indications provided in the generation rules 1576 of what features of one or more languages may be enabled for use, at least on a conditional basis.

In some embodiments, the generation rules 1576 may include ranking indications of relative levels of efficiency and/or speed of performance in the execution of particular languages and/or particular instructions of particular languages for each feature that may be indicated by one or more instances of the node data 1330. By way of example, the generation rules 1576 may provide a ranking that indicates higher efficiency and/or speed of performance in executing conditional branch instructions for a newer version of a processor that includes three cache levels, while the generation rules 1576 may provide a ranking that indicates lower efficiency and/or speed of performance in executing the same conditional branch instructions for an older version of the same processor that includes only two cache levels. By way of another example, the generation rules 1576 may provide a ranking of a newer revision level of a language interpreter that indicates higher efficiency and/or speed of performance when interpreting the instructions of a particular language, while the generation rules 1576 may provide a ranking of an earlier revision level of the same language interpreter that indicates lower efficiency and/or speed of performance.

In some embodiments, the generation rules 1576 may specify a policy of causing the processor 1550 to generate as few different instances of the node instructions 1370 as possible. In such embodiments, the processor 1550 may be caused to analyze instances of the node data 1330 received from each of the multiple node devices 1300 to identify what scripting, programming, database and/or other languages are supported for execution within the processing environment of each of the multiple node devices 1300. From such an analysis, the processor 1550 may be caused to determine a most minimal set of languages that may be used across the processing environments provided by the multiple node devices 1370 to enable the generation of a most minimal quantity of different instances of the node instructions 1370. Such a policy may dictate that minimizing the quantity of different instances of the node instructions 1370 is deemed to be of higher priority than speed or efficiency of execution of the one or more instances of the node instructions 1370 that are to be generated. Thus, the one or more languages within the most minimal set of languages may be selected with little or no regard to ranking information included in the generation rules 1576 that indicates how efficiently their instructions may be executed by one or more of the processors 1350 in the processing environments provided in the multiple node devices 1300.

In other embodiments, the generation rules 1576 may specify a policy of causing the processor 1550 to generate multiple different instances of the node instructions 1370 as needed to enable a higher speed of performance of tasks by the multiple node devices 1300 through use of various features present within the processing environment of each. However, the generation rules 1576 may also specify a maximum quantity of different instances of the node instructions 1370, or may specify a calculation to cause the processor 1550 to perform to derive the maximum quantity based at least on the quantity of node devices 1300 and/or one or more features of the coordinating device 1500 that may affect the generation of multiple instances of the node instructions 1370. The generation rules 1576 may include a list of prioritized features that are deemed to offer sufficiently higher speed of performance as to justify the generation of one or more additional instances of the node instructions 1370 to make use of those features. Alternatively or additionally, the generation rules 1576 may specify that the prioritized features include are limited features that are associated in the generation rules 1576 with a particular range of rankings in the ranking indications.

In such other embodiments, the processor 1550 may be caused to analyze instances of the node data 1330 received from each of the multiple node devices 1300 to identify ones of the prioritized features that may be present in the processing environment of each of the multiple node devices 1300. From such an analysis, the processor 1550 may be caused to determine the set of languages that include instructions and/or other features that may make use of each different combination of the prioritized features identified within each of the multiple node devices 1300. Where there is more than one of the multiple node devices 1300 with the same combination of the prioritized features identified as present therein, the processor 1550 may be caused to generate a single instance of the node instructions 1370 for execution within the processing environments of those ones of the multiple node devices 1300.

Regardless of the exact manner in which the one or more instances of the node instructions 1370 are generated, or how many instances of the node instructions 1370 are generated, the processor 1500 may be caused by the generation component 1546 to operate the network interface 1590 to transmit each of the one or more instances of the node instructions 1370 to one or more of the multiple node devices 1300 via the network 1999. Again, each instance of the node instructions 1370 that has been generated may be so provided to a single one of the multiple node devices 1300, or may be provided to multiple ones of the multiple node devices 1300. Thus, as specifically depicted in FIG. 16A, where separate instances of the node instructions 1370$x$ and 1370$y$ are generated for each of the node devices 1300$x$ and 1300$y$, respectively, the processor 1550 may be caused to operate the network interface 1590 to transmit the each of the node instructions 1370$x$ and 1370$y$ to corresponding ones of the node devices 1300$x$ and 1300$y$. Further, it may be that each of the instance of the node instructions 1370$x$ and 1370$y$ may also be provide to one or more others of the multiple node devices 1300. However, under alternate circumstances that are not specifically depicted where a single instance of the node instructions 1370 is generated for both of the node devices 1300$x$ and 1300$y$, that single instance of the node instructions 1370 may be provided to both of the node devices 1300$x$ and 1300$y$, and may additionally be provided to one or more others of the multiple node devices 1300.

Turning to FIG. 16B, as previously discussed, the tasks that each of the one or more instances of the node instructions 1370 may cause the processors 1350 of the node devices 1300 to perform may include normalization tasks, transformation tasks and/or analysis tasks. As also previously discussed, in embodiments in which multiple tasks are caused to be performed, at least one task may be performed as preparation for the performance of at least one other task. By way of example, one or more normalization and/or transformation tasks may be caused to be performed by the one or more instances of the node instructions 1370 as preparation for the performance of one or more analysis tasks.

As depicted, the node instructions 1370$x$ provided to at least the node device 1300$x$, may include normalization instructions 1377 for execution within the processing environment of at least the node device 1300$x$ to cause performance of one or more data normalization tasks. As also depicted, the rules data 1570 may include normalization rules 1577 for use with the generation component 1546 to cause the processor 1550 to generate at least the normalization instructions 1377 as part of generating at least the node instructions 1370x. In some embodiments, the normalization rules 1577 may specify aspects of the normalization of time, dates, monetary values, spacing of text characters, capitalization of proper nouns, use of delimiter characters and/or codes, orientation of images on a page, order of letters of alphabets, format of fractional values, bit widths of various values, use of floating point values versus integer values, quantities of bits to represent floating point and/or integer values, big or little Endian encoding, use of sign bits, use of abbreviations, capitalization of abbreviations, spelling of abbreviations, etc. At least a subset of such aspects may be specified for one or more particular geographic regions, cultures, countries, industries, legal systems, corporate and/or governmental entities, etc. Where one or more normalization tasks are selected to be performed by the multiple node devices 1300 with their corresponding data set portions 1310, the generation component 1546 may cause the processor 1550 to employ the normalization rules 1577 in generating the normalization instructions 1377 within each instance of the node instructions 1370.

As also depicted, the node instructions 1370x provided to at least the node device 1300x, may also include transform instructions 1378 for execution within the processing environment of at least the node device 1300x to cause performance of one or more data transformation tasks. As also depicted, the rules data 1570 may include transform rules 1578 for use with the generation component 1546 to cause the processor 1550 to generate at least the transform instructions 1378 as part of generating at least the node instructions 1370x. By way of example, in some embodiments, the transform rules 1578 may specify aspects of one or more row-based and/or column-based mathematical operations, including and not limited to, the adding, subtracting, averaging, incrementing, decrementing and/or performing still other mathematical operations involving numeric values of data items present within one or more rows and/or columns. Also by way of example, the transform rules 1578 may specify aspects of one or more filtering, data selection, ordering and/or sorting operations based on values within one or more rows, columns and/or along other dimensions of an array or similar data structure. At least a subset of such aspects may be specified for one or more particular geographic regions, cultures, countries, industries, legal systems, corporate and/or governmental entities, etc. Where one or more data transform tasks are selected to be performed by the multiple node devices 1300 with their corresponding data set portions 1310, the generation component 1546 may cause the processor 1550 to employ the transform rules 1578 in generating the transform instructions 1378 within each instance of the node instructions 1370.

As also depicted, the node instructions 1370x provided to at least the node device 1300x, may also include analysis instructions 1379 for execution within the processing environment of at least the node device 1300x to cause performance of one or more data analysis tasks. As also depicted, the rules data 1570 may include analysis rules 1579 for use with the generation component 1546 to cause the processor 1550 to generate at least the analysis instructions 1379 as part of generating at least the node instructions 1370x. By way of example, in some embodiments, the analysis rules 1579 may specify aspects of the manner in which searches among data items may be performed, including and not limited to, aspects of one or more search algorithms that may be employed in generating the analysis instructions 1379 to include one or more searches. Also by way of example, the analysis rules 1579 may specify aspects of performance of one or more forms of statistical analyses including and not limited to, aggregation, identifying and quantifying trends, subsampling, calculating values that characterize at least a subset of the data items within the selected data set, deriving models, testing hypothesis with such derived models, making predictions, generating simulated samples, etc. At least a subset of such aspects may be specified for one or more particular geographic regions, cultures, countries, industries, legal systems, corporate and/or governmental entities, etc. Where one or more data analysis tasks are selected to be performed by the multiple node devices 1300 with their corresponding data set portions 1310, the generation component 1546 may cause the processor 1550 to employ the analysis rules 1579 in generating the analysis instructions 1379 within each instance of the node instructions 1370.

Turning to FIG. 16C, in executing the control routine 1340, the processor 1350 of the node device 1300x may be caused by the normalization component 1347, the transform component 1348 and/or the analysis component 1349 to perform one or more tasks provided in the form of executable instructions within the node instructions 1370x. More specifically, where the node instructions 1370x include the normalization instructions 1377, the transform instructions 1378 and/or the analysis instructions 1379, the processor may be caused to perform data normalization, data transformation and/or data analysis tasks by the normalization component 1347, the transform component 1348 and/or the analysis component 1349, respectively.

As previously discussed, data normalization and/or data transformation tasks may be performed as preparation for subsequent data analysis tasks. Thus, as depicted, the processor 1350 may be caused by the normalization component 1347 to execute the normalization instructions 1377 (if present within the node instructions 1370x) to perform one or more data normalization tasks in which the data items of the data set portion 1310x may be normalized, thereby generating a normalized data set portion 1317x. As also depicted, the processor 1350 may be caused by the transform component 1348 to execute the transform instructions 1378 (if present within the node instructions 1370x) to perform one or more data transform tasks in which the data items of the either the data set portion 1310x or the normalized data set portion 1317x may be subjected to one or more data transformations, thereby generating a transformed data set portion 1318x. As further depicted, the processor 1350 may be caused by the analysis component 1349 to execute the analysis instructions 1379 (if present within the node instructions 1370x) to perform one or more data analysis tasks in which the data items of the data set portion 1310x, the normalized data set portion 1317x or the transformed data set portion 1318x may be subjected to one or more data analyses, thereby generating at least a portion of the results data 1770.

Following the performances of the selected one or more tasks by the multiple node devices 1300 with their corresponding data set portions 1310, including the node device 1300x with the data set portion 1310x, the results data 1770 may be provided to the coordinating device 1500 and/or the viewing device 1700. The an indication of the results of the performance of the selected one or more tasks, as indicated in the results data 1700, may then be visually presented to an operator of the node device grid 1003 via the display 1580 of the coordinating device 1500 and/or via the display 1780 of the viewing device 1700.

Figure 17A:
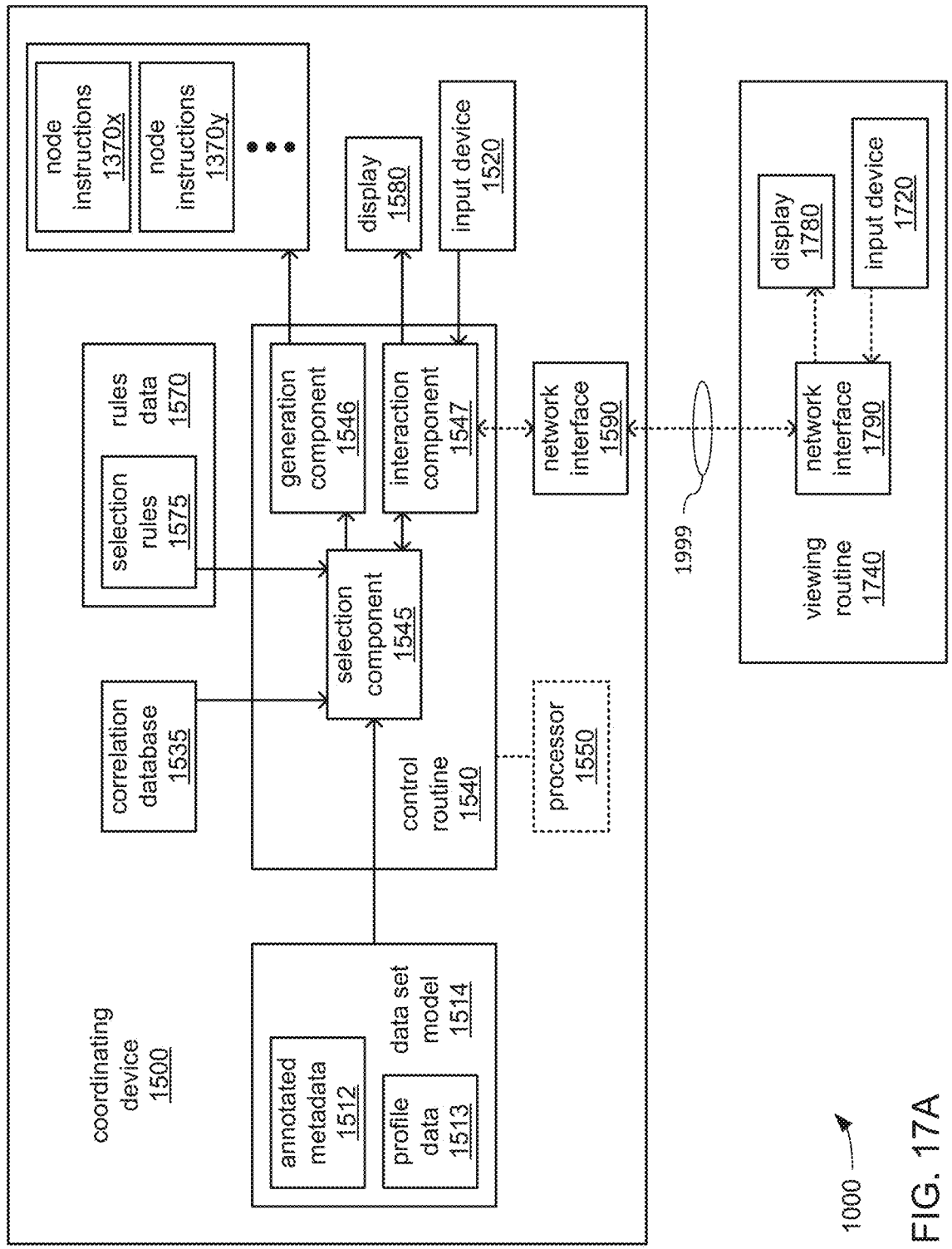
FIGS. 17A and 17B, together, illustrate an example of requesting and employing operator input to update rules associated with determining the one or more tasks to perform.
Figure 17B:
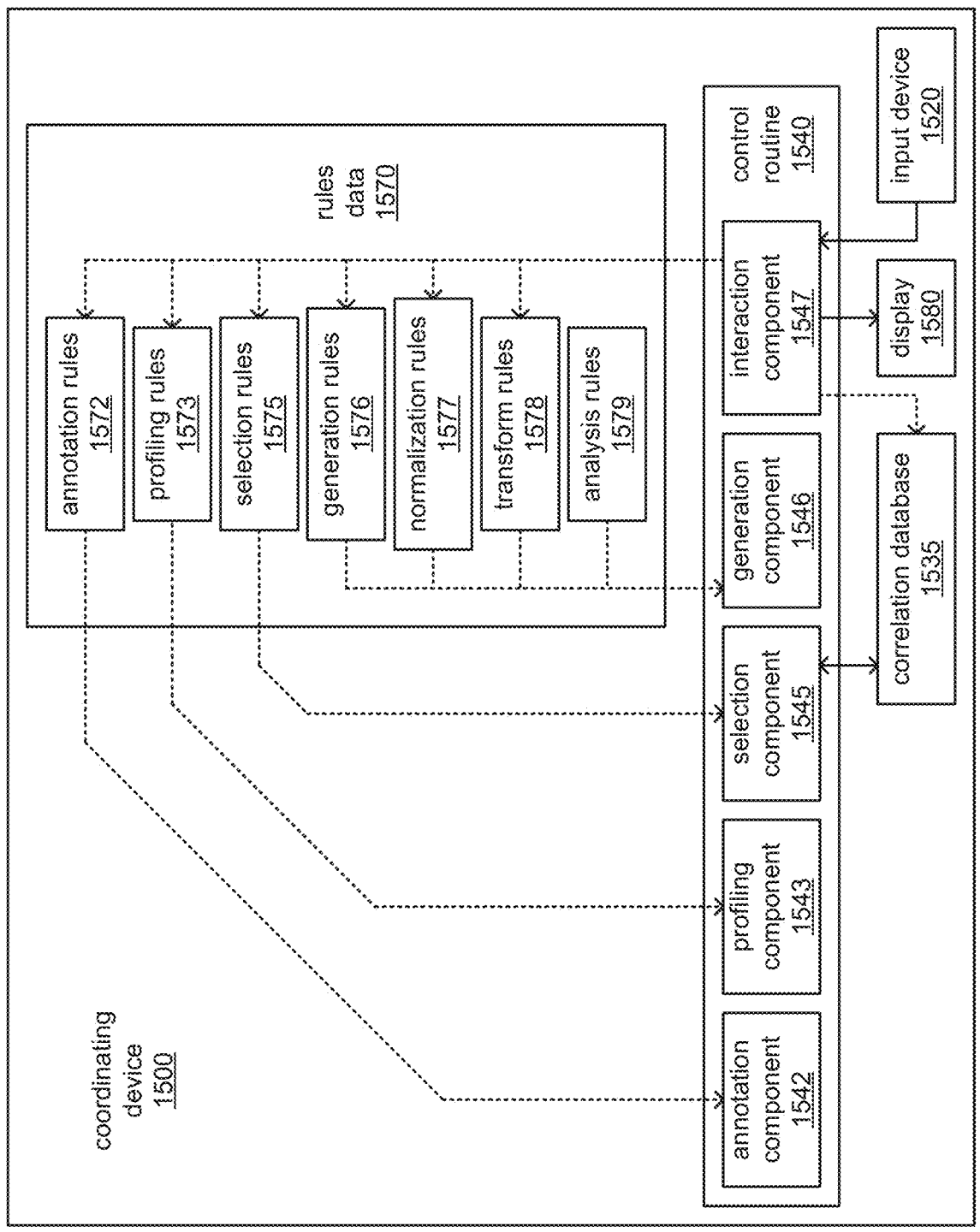

Returning again to FIG. 13, as previously discussed, the control routine 1540 executed by the processor 1550 may include the interaction component 1547 to present an operator of the node device grid 1003 with an indication of the one or more tasks selected by the selection component 1545 to be performed with the selected data set 1113, and to accompany the presentation with a request for input from the operator concerning such a selection. The interaction component 1547 may cooperate with the selection component 1545 to change the one or more tasks that were so selected in response to input received from the operator. Alternatively or additionally, the interaction component 1547 may cause one or more updates to be made within the rules data 1530 in response to input received from the operator. FIGS. 17A-B depict aspects of such a presentation to an operator, either directly or remotely, and the use of any input received thereby to alter a selection and/or to update the rules data 1530 in greater detail.

Turning to FIG. 17A, in executing the control routine 1540, the processor 1550 of the coordinating device 1500 may be caused by the interaction component 1547 to operate the input device 1520 and/or the display 1580 to provide a user interface (UI) to provide an operator of the node device grid 1003. Alternatively or additionally, the processor 1550 may be caused by the interaction component 1547 to operate the network interface 1590 to cooperate with the viewing device 1740 via the network 1999 to employ the input device 1720 and/or the display 1780 to do so. Through such a UI, whether directly or remote via the viewing device 1700, the processor 1550 may present an indication of the one or more tasks that the processor 1550 has been caused by the selection component 1575 to select as the one or more tasks to be performed with the selected data set 1113. Also through such a UI, the processor 1550 may present a request for the operator of the node device grid 1003 to provide input to either confirm such a selection of one or more tasks, or to alter the one or more tasks that have been so selected such that a different selection of one or more tasks is made.

More specifically, the processor 1550 of the coordinating device 1500 may be caused to employ the UI to present an assortment of tasks and/or combinations of tasks that may be performed on the display 1580 or 1780 for selection by the operator. Such tasks and/or combinations of tasks may be organized in a manner that reflects the tasks and/or combinations of tasks that are associated with the one or more previously generated data set models that were determined by the selection component 1545 to be more similar to the data set model 1514 generated from the selected data set 1113. The processor 1550 may then be caused by the interaction component 1547 to monitor the input device 1520 or 1720 for an indication of having been operated by the operator to provide input either confirming the selection of the one or more tasks made by the selection component 1545 (e.g., by the operator selecting the one or more tasks as presented on the display 1520 or 1720) or commanding a change to that selection (e.g., by the operator selecting a different one or more tasks as presented on the display 1520 or 1720). In some embodiments, the processor 1550 may be caused to provide such a presentation of selectable tasks and/or combinations of tasks along with a request for the operator to provide input in response to the presentation in a time-limited manner in which the operator is given a time-limited opportunity to provide input. If no input is received from the operator within a predetermined period of time, then the processor 1550 may be caused by the generation component 1546 to proceed with generating the one or more instances of the node instructions 1370.

In some embodiments, any input received from the operator may be employed to augment the correlation database 1535 with an indication of which selections of one or more tasks made by the selection component 1545 were confirmed by the operator, and which selections were not. By way of example in such embodiments, the correlation database 1535 may correlate a weighting value to each previously generated data set model within the stored therein. The weighting value of the one of the previously generated data set models that was determined by the selection component 1545 to be most similar to the data set model 1514 may be adjusted to reflect whether there is input received from the operator that confirms the selection of the one or more tasks previously performed with the corresponding previously analyzed data set as the one or more tasks to be performed with the selected data set 1113. Such a weighting value may be employed to prevent an anomalous selection of one or more tasks by the operator from exerting an outsized influence on future automatic selections of one or more tasks caused to be made by the processor 1550.

Figure 18A:
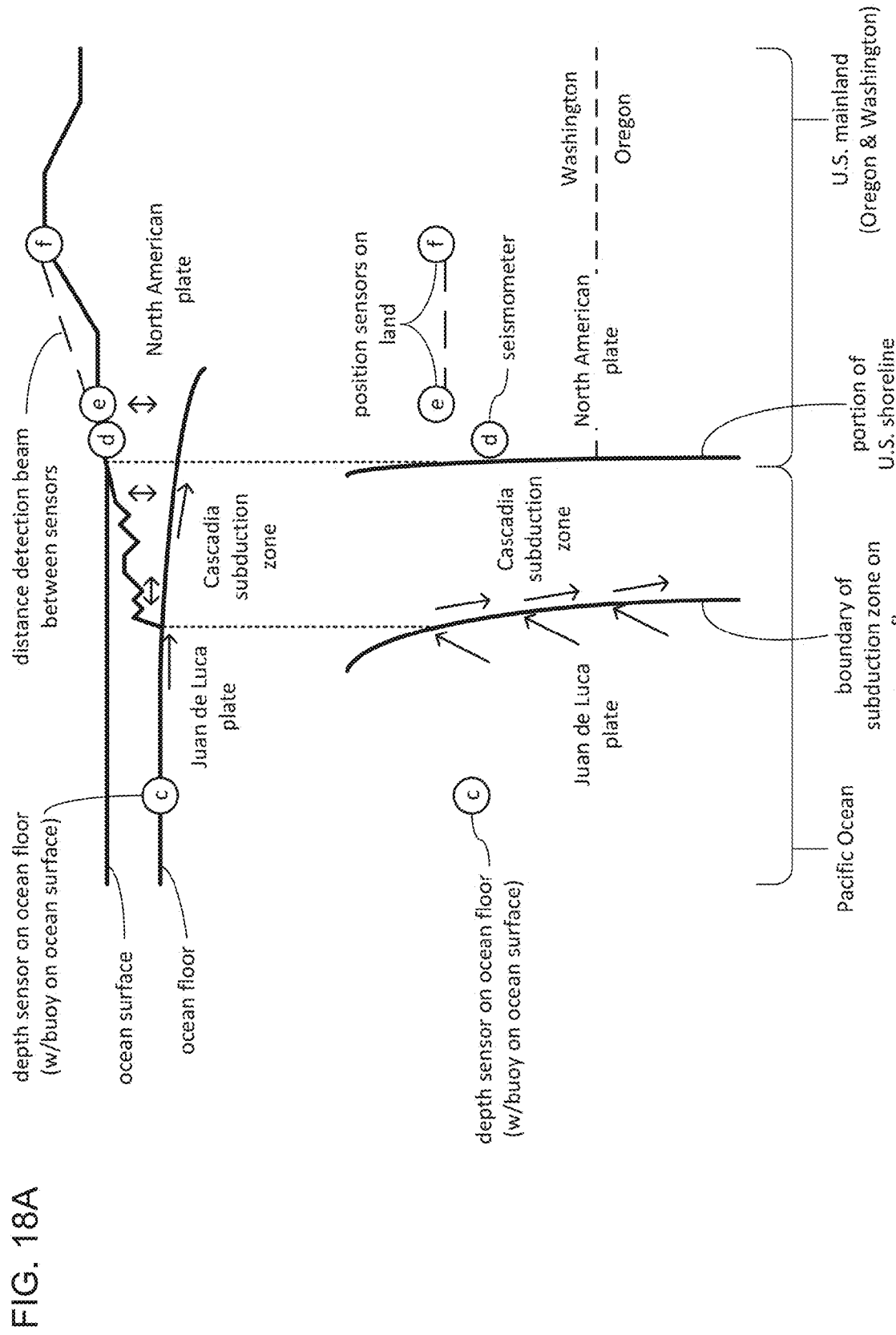
FIGS. 18A, 18B, 18C, 18D, 18E and 18F, together, illustrate an example of selection and performance of tasks with seismological and geological data sets.
Figure 18B:
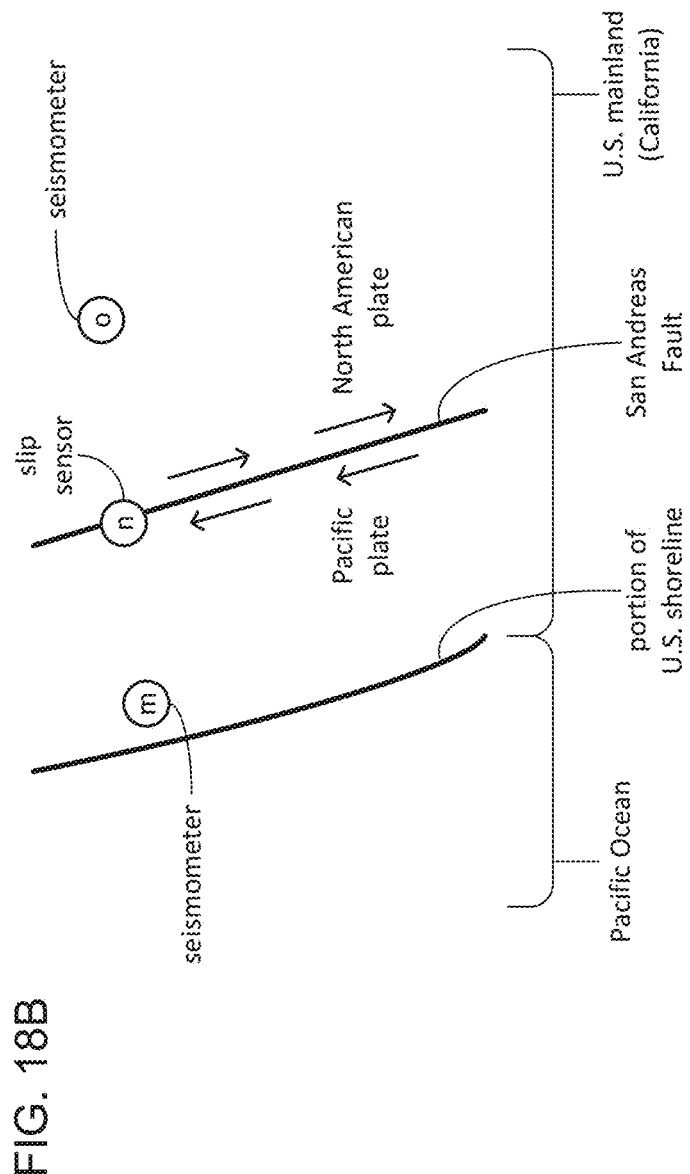
Figure 18C:
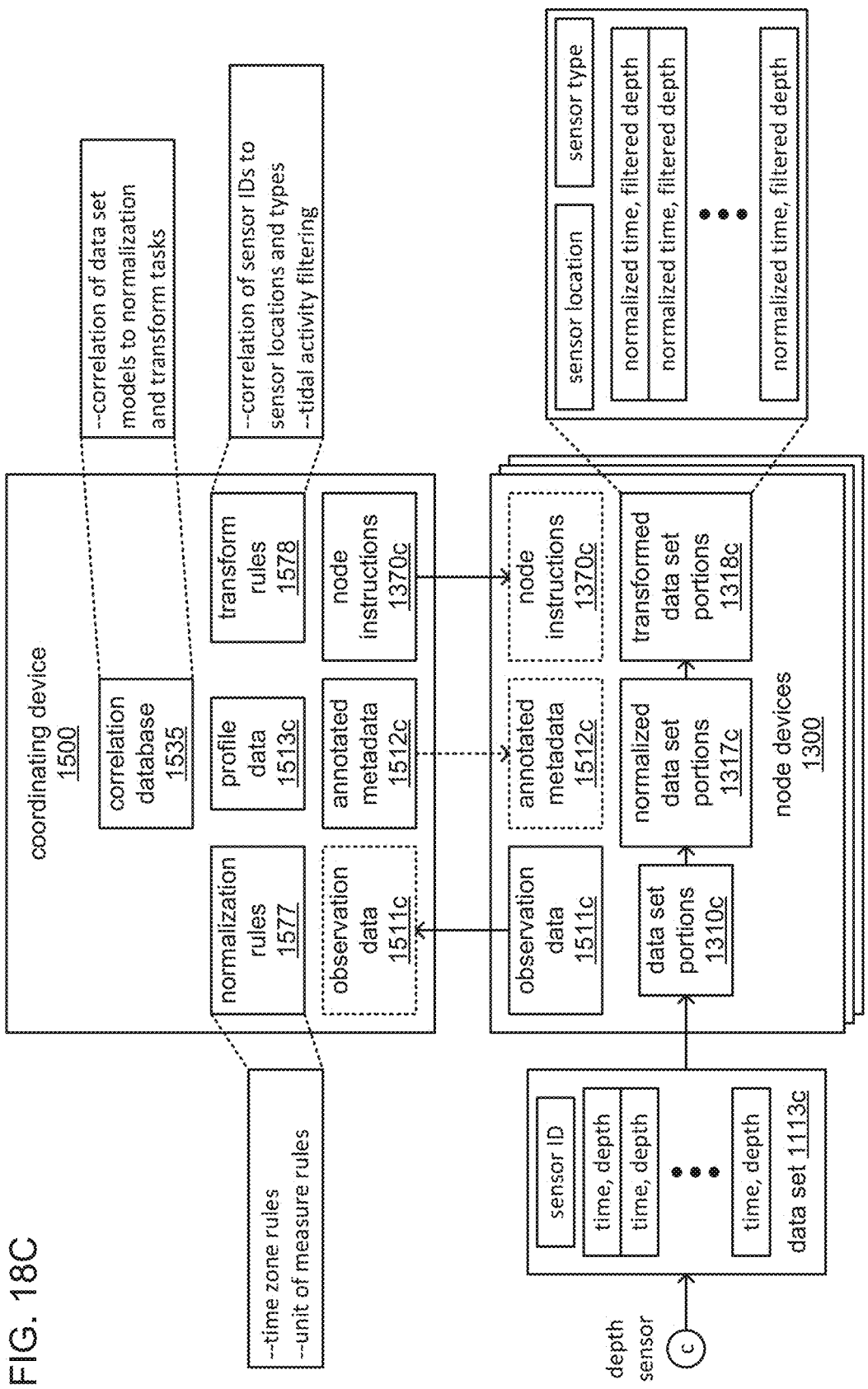
Figure 18D:
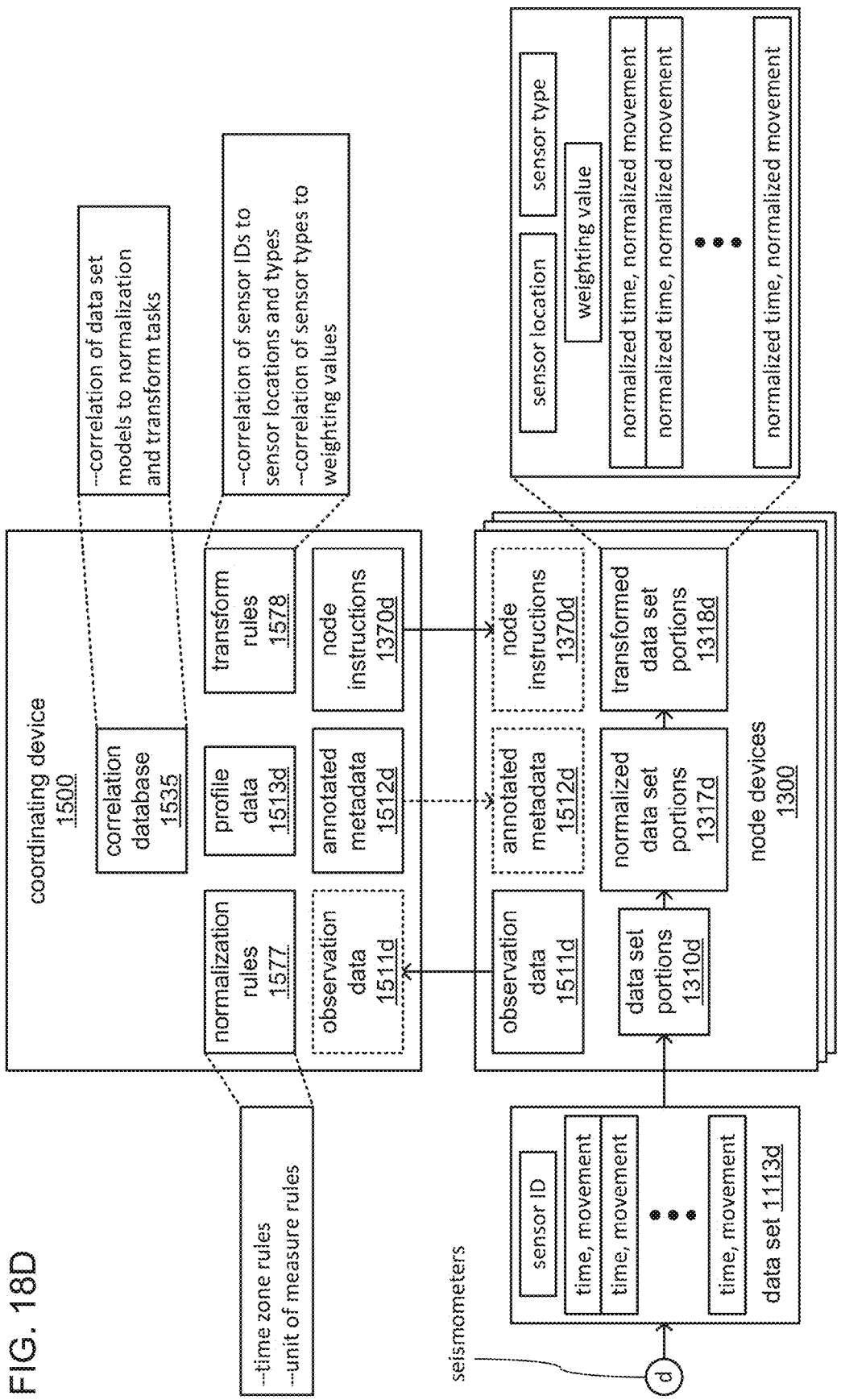
Figure 18E:
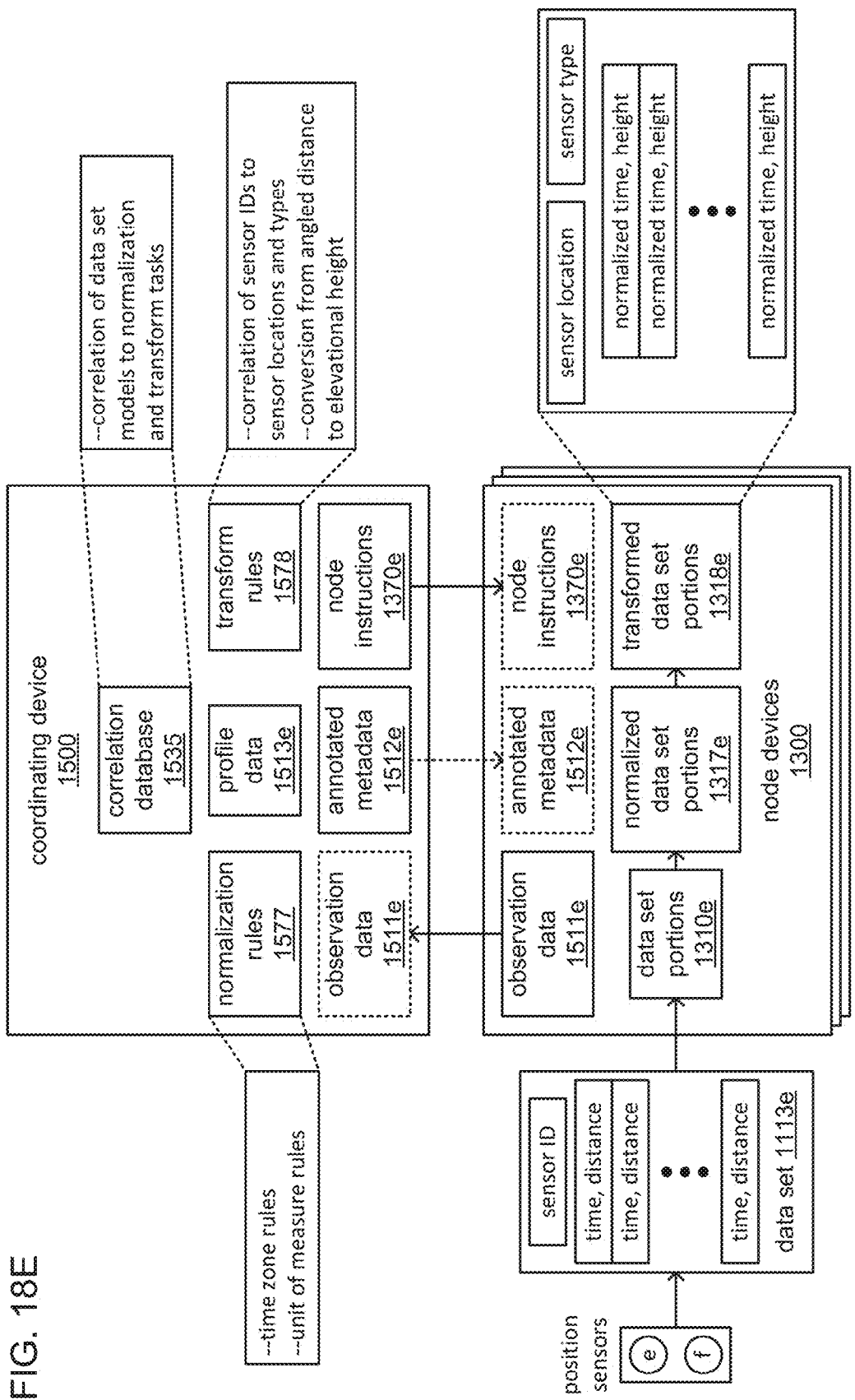
Figure 18F:
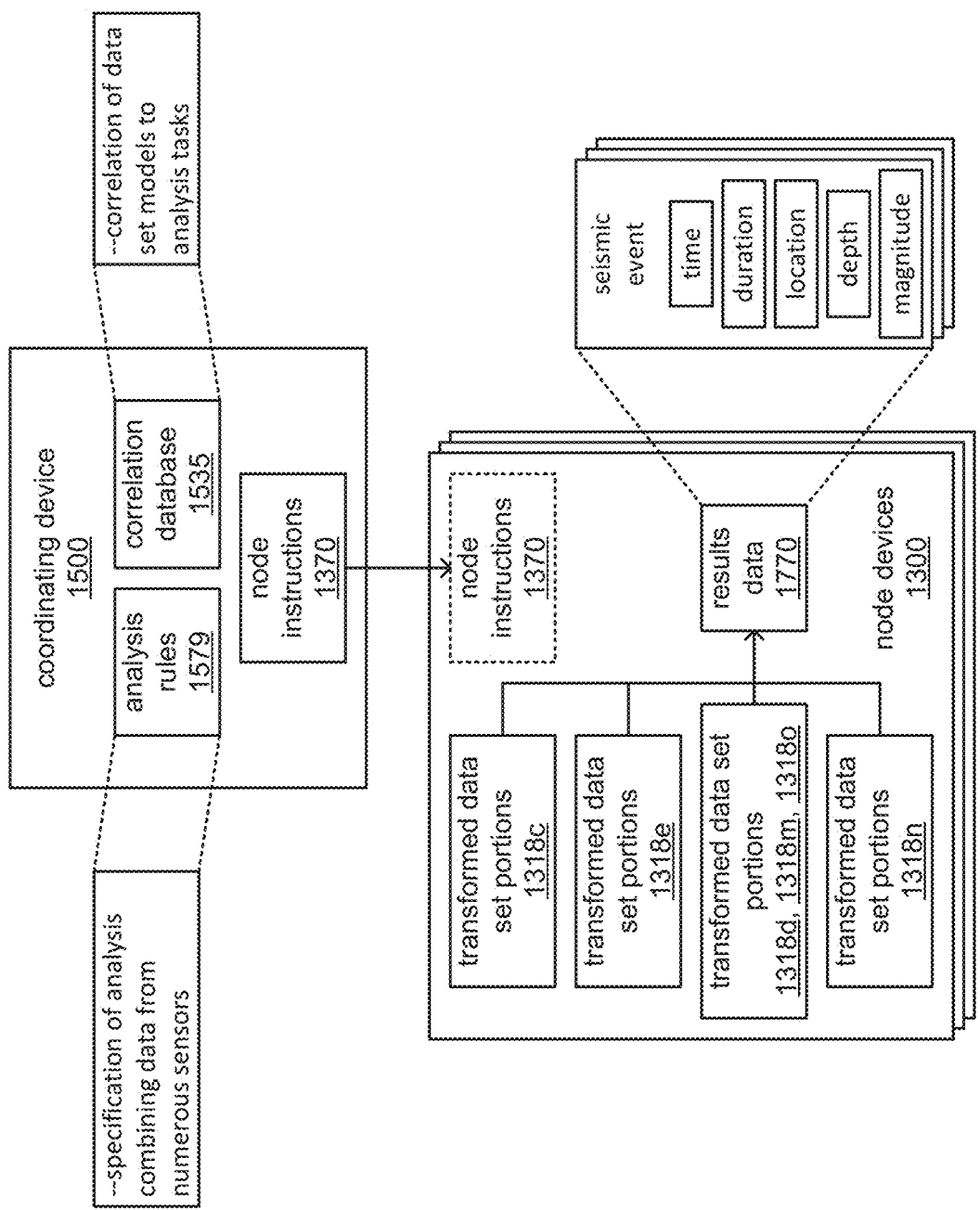

FIGS. 18A-F, together, illustrate an example of analyzing received data sets to select one or more tasks to perform with each in the area of seismology. FIG. 18A provides both an overhead geographic view and an edge-on view of a portion of the Cascadia Subduction Zone on the floor of the Pacific Ocean, just off the Pacific shorelines of the mainland U.S. states of Oregon and Washington. At the Cascadia Subduction Zone, the Juan De Luca plate is caused by tectonic forces to be pressed in an Eastward direction against the North American plate with such a magnitude of force that the Juan De Luca plate is being caused to descend beneath the North American plate, thereby becoming molten and eventually becoming part of the magma beneath the Earth's crust in a process called subduction. FIG. 18B provides an overhead geographic view of a portion of the San Andreas Fault, just inland from the Pacific Ocean within the mainland U.S. state of California. The San Andreas Fault is categorized as a strike-slip fault at which the Pacific plate and the North American plate slowly grind against and past each other with a largely horizontal relative movement. Each of FIGS. 18C, 18D and 18E illustrates aspects of the selection and performance of one or more normalization and/or data transform tasks on one or more data sets generated by one or more of the sensors depicted in, and discussed in reference to, FIGS. 18A-B. FIG. 18F illustrates aspects of the selection and performance of an analysis task employing normalized and/or transformed versions of at least the data sets associated with each of the sensors of FIGS. 18A-B.

It is believed that there is a relationship between the seismic events of the Cascadia Subduction Zone and the San Andreas Fault, at least to the extent that seismic activity in the Cascadia Subduction Zone appears to have a history of triggering seismic activity that starts at the Northern end of the San Andreas Fault, and propagates in a Southward therealong. As a result of the extensive histories of seismic activity along both the Cascadia Subduction Zone and the San Andreas Fault, and as a result of the large population concentrations along each, both are extensively monitored as a single combined seismic system using a large number and variety of sensors. Each of those sensors produces one or more types of data that is often combined in various analyses as part of ongoing efforts to learn more about such seismic activity, and to try to devise an accurate method of predicting seismic activity. It should be noted that what is depicted and described in this example is deliberately greatly simplified for purposes of clarity of presentation and understanding. Specifically, while only a limited quantity and variety of sensors is depicted and discussed in this example, those skilled in the art will readily recognize that each of these two linked and highly seismically active areas are each monitored with a far greater quantity and variety of sensors generated a far greater variety and quantity of data than what is depicted and discussed herein.

Turning to FIG. 18A, as a result of the location of the depicted portion of the Cascadia Subduction Zone being largely under the surface of the Pacific Ocean, off-shore sensors, as well as land-based sensors, may be used to monitor various aspects of the Cascadia Subduction Zone. More specifically, the depicted portion of the Cascadia Subduction Zone may be monitored by a depth sensor c, a seismometer d, and a pair of position sensors e and f. As is familiar to those skilled in the art, the seismic activity of the Cascadia Subduction Zone is believed to result from periods of years or decades in which there is sufficient friction between the Juan De Luca and North American plates that they become locked together. As a result, physical pressure for Juan De Luca plate to slide under the North American plate builds up over what may be many years until finally the built up pressure is enough to overcome the friction, and the Juan De Luca plate is caused to slide under the North American plate by a rather substantial amount over a period of mere seconds to minutes, thereby producing an earthquake. Both during the periods of years or decades in which movement is impeded by friction, and during the intervening earthquakes, the elevations of one or both of the plates may be caused to vary, at least in the vicinity of the Cascadia Subduction Zone. Also, the relatively sudden changes in elevation that occur near the boundary at which the two plates meet on the surface of Pacific Ocean floor can cause a sudden change in the depth of the Pacific Ocean near that boundary, leading to the creation of Tsunami waves that may swiftly impact the Pacific shorelines of Oregon and Washington.

The depth sensor c may be positioned on the Pacific Ocean floor relatively near the boundary between the Juan De Luca and North American plates on the Pacific Ocean floor, but not so near as to risk damage thereto. The depth sensor c may continuously sense the depth of the Pacific Ocean above it by monitoring the resulting water pressure at its location, and/or by any of a variety of other techniques. The depth sensor c may be coupled by an electric cable to an associated buoy on the surface of the Pacific Ocean that recurringly transmits signals to a satellite (not shown) that convey a recurringly updated indication of the depth of the Pacific Ocean above the depth sensor c.

The seismometer d may be positioned inland within either Oregon or Washington, and in the vicinity of the Cascadia Subduction Zone to measure on-land seismic activity at a location along the length of the Cascadia Subduction Zone. As familiar to those skilled in the field of seismology, the seismometer d may be of an older variety that measures ground movement only in a vertical dimension, or may be of a newer variety that measures ground movement in three dimensions (e.g., vertically, North-South and East-West).

The pair of position sensors e and f, one positioned closer to the Cascadia Subduction Zone than the other, may include a laser that emits pulses of laser light from one of the two locations and towards the other where the travel time of each pulse of laser light from the one location to the other is measured to recurringly determine the current distance between the two locations. As depicted, one of the two locations may be at a higher elevation than the other, thereby enabling changes in distance between the two locations to be used to detect changes in elevation of the one of the locations that is closer to the Cascadia Subduction Zone.

Turning to FIG. 18B, the depicted portion of the San Andreas Fault may be monitored by seismometers m and o, and a slip sensor n. As is familiar to those skilled in the art, the seismic activity of the San Andreas Fault is believed to result from periods of years or decades in which there is sufficient friction between the Pacific and North American plates that they become locked together along different portions of the length of the San Andreas Fault. As a result, the Pacific plate is prevented from continuously moving in its generally North-Northwest direction, and the North American plate is prevented from continuously moving in a South-Southeast direction along the San Andreas Fault. During these periods of impeded movement at such locations, physical pressure for each of these plates to resume their movement along the San Andreas Fault builds up over what may be many years until finally the built up pressure is enough to overcome the friction, and each of these two plates at such locations is caused to move by a rather substantial amount (e.g., multiple inches to multiple feet) over a period of mere seconds to minutes, thereby producing an earthquake.

It should be noted that the movement of the two plates along the length of the San Andreas Fault is not uniform. At various times, the two plates may move different relative distances and at different rates at different locations along the fault, and the two plates may become locked against each other at different times at different locations along the fault. This is believed to be due, at least partly, to the widely differing geologies along the length of the San Andreas Fault, where ground at some locations more easily gives way and is less likely to cause the plates to become locked together than the ground at other locations. More specifically, there are locations along the San Andreas Fault where the two plates may move continuously relative to each other much of the time with only rare instances of becoming locked against each other, or where the friction is never strong enough to allow a period of the two plates being locked against each other to last for more than a relatively small number of years. Earthquakes may be less common at such locations, and those that do occur may be of shorter duration and lesser magnitude.

Each of the seismometers m and o may be positioned on land within California that may be associated with either one or the other of the Pacific and North American plates, and in relatively close proximity to the San Andreas fault. Again, each of the seismometers m and o may be of an older variety measuring ground movement in only a vertical dimension or may be of a newer variety measuring ground movement in three dimensions. The slip sensor n may be made up of two anchored components that are each positioned on an opposite side of the San Andreas Fault such that one portion is anchored to bedrock of the Pacific plate while the other portion is anchored to bedrock of the North American plate. A cable or other elongate structure may be affixed to and extend from one of the two portions, and towards the other of the two portions that may recurringly measure the position of that cable or elongate structure relative to its location to recurringly detect changes in the distance between the two anchoring locations as a mechanism to detect any recent relative movement between the two plates at that location along the San Andreas Fault. Given the different aspects of seismic and geologically related activity measured by each of these sensors, it follows that the data sets generated by each of these sensors would differ in their contents and/or various structural features.

By way of example, and turning to FIG. 18C, the depth sensor c may generate a data set 1113c that may then be divided into multiple data set portions 1310c that may be distributed among multiple ones of the node devices 1300. The data set 1113c may include a code number, name, geographic coordinates or other identifier of the depth sensor c (e.g., text character labels such as "sensor ID" or "Serial No.") that may be identified by the processor 1350 of one or more of the node devices 1300 during their separate and/or at least partially parallel analyses of their corresponding data set portions 1310c.

The data set 1113c may also include multiple entries of data items indicating a time at which each measurement of the depth of the Pacific Ocean above was taken and what the depth measurement was at each such time. Such data items may be organized into any of a variety of data structures within the data set 1113c that may be identified by the processor 1350 of one or more of the node devices 1300 in corresponding data set portions 1310c, such as a linked list or an array. Where a one-dimensional array, an array of multiple dimensions or other tabular data structure is used, data items making up each of multiple entries may be organized into columns or other repetitive ordering of data items therein. For example, each row or other form of entry may be given a distinct label or other form of identifier as part of an indexing scheme, such as index numbers in an ascending or descending order. Alternatively or additionally, the columns or other form of ordering/positioning of data items within each entry may be given distinct labels or other identifiers as part of an indexing scheme (e.g., text character labels such as "time" and "depth"). Alternatively or additionally, the data items may be organized into a series of numbers separated by delimiters (e.g., punctuation, characters, separating characters such as dashes, space and/or tab codes, end-of-line codes, etc.) that may be used to distinguish at least the start and end of each entry, if not also to distinguish each number within each entry. Alternatively or additionally, each of the numbers specifying a time may be distinguishable from the depth measurements by its formatting (e.g., the presence of punctuation therein), such as a colon separating at least hour and minute values, and/or each of the depth measurements may be distinguishable from the times by the presence of a decimal point separating whole number and fractional number values. One or more of the node devices 1300 may include, in the observation data 1511c, indications of any distinct labels for "time" and/or "depth" (or other similar labels) that are identified in the data set 1113c by the processor 1350 of one or more devices 1300.

As previously discussed, the processor(s) 1350 of one or more of the node devices 1300 that have each been provided with at least one of the data set portions 1310c may generate corresponding instances of observation data 1511c from corresponding data set portions 1310c. Each instance of the observation data 1511c may include indications of aspects of the data items, including and not limited to, data types, units of measure associated with data values, minimum and/or maximum values, average values, mean values, indications of whether values are integers and/or floating point values, bit and/or byte widths, indications of whether values are signed values and/or all positive and/or negative values, etc. Also, each instance of the observation data 1511c may include indications of structural features of the organization of the data items within a corresponding one of the data set portions 1310c, including and not limited to, data structure(s) into which data items are organized, number of dimensions, size of each dimension, range of index values used along each dimension, labels and/or other aspects of indexing schemes employed to access data items within data structures, delimiters separating data items and/or defining the start and/or end of portions of a data structure, data types and/or data sizes (e.g., bit widths and/or byte widths of data items). The processors 1350 of the node devices 1300 that each generate an instance of the observation data 1511c may then transmit corresponding instances of the observation data 1511c to the coordinating device 1500.

Within the coordinating device 1500, the processor 1550 may analyze the indications within the instances of observation data 1511c of aspects of the data items to generate profile data 1513c to include indications of aspects of data items for the whole of the data set 1113c. The processor 1550 may also analyze the indications within the instances of observation data 1511c of structural features of the organization of corresponding data set portions 1310c to generate annotated data 1512c to include indications of structural features for the whole of the data set 1113c. As previously discussed, the processor 1550 may transmit one or more iterations of the annotated metadata 1512c to the multiple node devices 1300 that have each been provided with at least one of the data set portions 1310c, and the processors 1350 of those node devices 1300 may employ each such iteration of the annotated metadata 1512c in further analyses of corresponding data set portions 1310c to identify still more aspects of data items and/or structural features thereof. Indeed, as previously discussed, there may be multiple iterations of exchanges of instances of observation data 1511c and annotated metadata 1512c, and this may continue until a determination is made by the processors 1350 and/or the processor 1550 that there are no more of such aspects of the data items and/or structural features to be identified.

Following the generation of the annotated metadata 1512c and/or the profile data 1513c, the processor 1550 may then employ the combination of the annotated metadata 1512c and the profile data 1513c as a data set model of the data set 1113c in comparisons to previously generated data set models stored within the correlation database 1535. As has been discussed, such comparisons of data set models may entail comparisons to determine whether any of the previously generated data set models are a match in one or more characteristics within one or more thresholds. Thus, for example, it may be that the presence of labels such as "time" and "depth", the inclusion of colons in the values for time along with decimal points in the depth values, the particular range of values specifying the depth (e.g., the particular minimum and maximum values), the inclusion of only positive or negative values in the depth values, the average and/or mean values for depth, the use of values for time of a particular time zone, the use of an array data structure with only two values per entry, and/or any of a variety of other features and/or combination of features of the data set 1113c may enable the identification of one or more sufficiently close matches. Presuming one or more of such matches are found, then a selection of tasks to be performed with the data set 1113c may be made by the processor 1550 of the coordinating device based on indications within the correlation database 1535 of one or more tasks performed with a previously analyzed data set (presumably, a data set previously generated by a depth sensor) associated with the previously generated data set model that is determined to be the closest match to the data set model of the data set 1113c.

As depicted, the one or more tasks so selected by the processor 1550 of the coordination device 1500, based on the closest one of such sufficiently close matches, may be at least one normalization task and/or at least one data transform task. By way of example, it may be that the time for each depth measurement taken is specified based on the time zone of the portion of the Pacific Ocean within which the depth sensor c is located, and the processor 1550 of the coordinating device 1500 may select a normalization task to be performed in which each indication of time for a depth measurement is normalized to Coordinated Universal Time (UTC) as part of generating normalized data set portions 1317c from corresponding ones of the data set portions 1310c. Alternatively or additionally, a normalization task may be selected in which a unit of measurement used for the depth measurements is converted to another unit of measurement in generating the normalized data set portions 1317c.

Alternatively or additionally by way of another example, the fact that the data set 1113c was generated by a depth sensor may result in the processor 1550 selecting one or more data transform tasks to perform to generate corresponding transformed data set portions 1318c in which an identifier of the depth sensor c in the data set 1113c is correlated to its location in the Pacific Ocean. Based on such a correlated location, the processor 1550 of the coordinating device 1500 may select a data transform task in which the depth values are filtered and/or otherwise modified to account for normally occurring changes in depth of the Pacific Ocean at the correlated location due to normal tidal activity arising from the time of day and/or the position of the moon, etc., so as to distinguish changes in depth due to seismic activity from changes in depth due to other factors.

Upon the making of such a selection of one or more normalization tasks and/or one or more data transform tasks by the processor 1550 of the coordinating device 1500, the processor 1550 may then generate node instructions 1370c to instruct the processors 1350 of the node devices 1300 among which the data set portions 1310c have been distributed to each perform the selected task(s) with their corresponding data set portions 1310c. In so doing, the processors 1350 of those node devices 1300 may effect the generation of the corresponding normalized data set portions 1317c and/or the corresponding transformed data set portions 1318c.

Turning to FIG. 18D, each of the seismometers d, m and o may generate a corresponding data set (such as the depicted example data set 1113d generated by the seismometer d) that may then be divided into multiple data set portions 1310d that may be distributed among multiple ones of the node devices 1300. Like the data set 1113c, the depicted data set 1113d may include a code number, name, geographic coordinates or other identifier of the seismometer d that may be identified by the processor 1350 of one or more of the node devices 1300 during their separate and/or at least partially parallel analyses of their corresponding data set portions 1310d.

The data set 1113d may also include multiple entries of data items indicating a time at which each measurement of ground movement was taken and at least what the magnitude of the ground movement measured in the vertical dimension at each such time. As within the data set 1113c, the data items within the data set 1113d may be organized into any of a variety of data structures. Again, any of a variety of indexing schemes, labels (e.g., text characters such as "time" and "movement"), and/or delimiters may be used in organizing the data items. Also again, each of the data items may employ any of a variety of types of formatting and/or delimiters to enable the distinguishing of one value from another.

Again, the processor(s) 1350 of one or more of the node devices 1300 that have each been provided with at least one of the data set portions 1310d may generate corresponding instances of observation data 1511d from corresponding data set portions 1310d, and transmit the corresponding instances of the observation data 1511d to the coordinating device 1500. Each instance of the observation data 1511d may include indications of aspects of the data items and/or indications of structural features of the organization of the data items within a corresponding one of the data set portions 1310d from which the processor 1550 of the coordinating device 1500 may generate profile data 1513d and annotated metadata 1512d, respectively.

Again, the processor 1550 may then employ the combination of the annotated metadata 1512d and the profile data 1513d as a data set model of the data set 1113d in comparisons to previously generated data set models stored within the correlation database 1535. Thus, for example, it may be that the presence of labels such as "time" and "movement", the inclusion of colons in the values for time along with decimal points in the movement values, the particular range of values specifying the movement (e.g., the particular minimum and maximum values), the inclusion of only positive or negative values in the movement values, the average and/or mean values for movement, the use of values for time of a particular time zone, the use of a particular array data structure, and/or any of a variety of other features and/or combination of features of the data set 1113d may enable the identification of one or more sufficiently close matches. Presuming one or more of such matches are found, then a selection of tasks to be performed with the data set 1113d may be made by the processor 1550 of the coordinating device based on indications within the correlation database 1535 of one or more tasks performed with a previously analyzed data set (presumably, a data set previously generated by a seismometer) associated with the previously generated data set model that is determined to be the closest match to the data set model of the data set 1113d.

As depicted, the one or more tasks so selected by the processor 1550 of the coordination device 1500, based on the closest one of such sufficiently close matches, may be at least one normalization task and/or at least one data transform task. By way of example, and like the data set 1113c, the processor 1550 may select a time normalization task to be performed with the data set portions 1310d of the data set 1113d in which the time for each movement measurement taken is normalized to a different time zone as part of generating normalized data set portions 1317d from corresponding ones of the data set portions 1310d. Alternatively or additionally, a normalization task may be selected by the processor 1550 of the coordinating device 1500 in which a unit of measurement used for the movement measurements is converted to another unit of measurement in generating the normalized data set portions 1317d.

Alternatively or additionally by way of another example, the fact that the data set 1113d was generated by a seismometer may result in the processor 1550 selecting one or more data transform tasks to perform to generate corresponding transformed data set portions 1318d in which an identifier of the seismometer d in the data set 1113d is correlated to aspects of its functionality. For example, such a correlation may reveal that the seismometer d is an older type of seismometer that is deemed to have somewhat limited accuracy and/or that it is not installed in a manner in which it is fixed to bedrock or another secure footing that enables a higher degree of accuracy. Based on such a correlation, the processor 1550 may select a normalization task in which the value of each movement measurement is rounded off to a lesser quantity of decimal positions after the decimal point. Alternatively or additionally, such correlation may reveal whether the seismometer d is of an older variety that measures only vertical ground movement or is of a newer variety that measures ground movement in three dimensions. Where the correlation is to such an older model of seismometer, the processor 1550 may select a normalization task in which the normalized data set portions 1317d are generated to include zero values or another form of "null" value for all measurements of movement along any non-vertical axis as a result of the seismometer d not taking such measurements.

Alternatively or additionally, the correlation to such an older model or such a newer model may lead the processor 1550 of the coordinating device 1500 to select a data transform task to be performed in which a calculation of the distances from the seismometer d to the locations of other known newer seismometers that take measurements in three dimensions may be used to calculate a weighting value to be added to corresponding transformed data set portions 1318d. By way of example, where an older model of seismometer that provides only vertical measurements is located in a region that is sparsely covered by other newer seismometers, then the weighting may be calculated to give greater weight to the vertical measurements of that older seismometer. In contrast, where such an older seismometer is located within closer proximity to one or more newer seismometers that are able to provide measurements in other dimensions (often North-South and East-West horizontal dimensions) in addition to vertical dimensions, then the weighting may be calculated to give lesser weight to the vertical measurements of that older seismometer.

Upon the making of such a selection of one or more normalization tasks and/or one or more data transform tasks by the processor 1550 of the coordinating device 1500, the processor 1550 may then generate node instructions 1370d to instruct the processors 1350 of the node devices 1300 among which the data set portions 1310d have been distributed to each perform the selected task(s) with their corresponding data set portions 1310d. In so doing, the processors 1350 of those node devices 1300 may effect the generation of the corresponding normalized data set portions 1317d and/or the corresponding transformed data set portions 1318d.

Turning to FIG. 18E, the pair of position sensors e and f may cooperate to generate the data set 1113e that, in a manner similar to the data sets 1113c and 1113d, may be divided into multiple data set portions 1310e that may be distributed among multiple ones of the node devices 1300. Also like the data sets 1113c and 1113d, the data set 1113e may include a code number, name, geographic coordinates or other identifier of the pair of position sensors e and f that may be identified by the processor 1350 of one or more of the node devices 1300 during their separate and/or at least partially parallel analyses of their corresponding data set portions 1310e.

The data set 1113e may also include multiple entries of data items indicating a time at which each measurement was taken of the distance between the position sensors e and f, and what the distance measured at each such time. As within each of the data sets 1113c and 1113d, the data items within the data set 1113e may be organized into any of a variety of data structures. Again, any of a variety of indexing schemes, labels (e.g., text characters such as "time" and "distance"), and/or delimiters may be used in organizing the data items. Also again, each of the data items may employ any of a variety of types of formatting and/or delimiters to enable the distinguishing of one value from another.

Again, the processor(s) 1350 of one or more of the node devices 1300 that have each been provided with at least one of the data set portions 1310e may generate corresponding instances of observation data 1511e from corresponding data set portions 1310e, and transmit the corresponding instances of the observation data 1511e to the coordinating device 1500. Each instance of the observation data 1511e may include indications of aspects of the data items and/or indications of structural features of the organization of the data items within a corresponding one of the data set portions 1310e from which the processor 1550 of the coordinating device 1500 may generate profile data 1513e and annotated metadata 1512e, respectively.

Again, the processor 1550 may then employ the combination of the annotated metadata 1512e and the profile data 1513e as a data set model of the data set 1113e in comparisons to previously generated data set models stored within the correlation database 1535. Thus, for example, it may be that the presence of labels such as "time" and "distance", the inclusion of colons in the values for time along with decimal points in the distance values, the particular range of values specifying the distance (e.g., the particular minimum and maximum values), the inclusion of only positive or negative values in the distance values, the average and/or mean values for distance, the use of values for time of a particular time zone, the use of a particular array data structure, and/or any of a variety of other features and/or combination of features of the data set 1113e may enable the identification of one or more sufficiently close matches. Presuming one or more of such matches are found, then a selection of tasks to be performed with the data set 1113e may be made by the processor 1550 of the coordinating device based on indications within the correlation database 1535 of one or more tasks performed with a previously analyzed data set (presumably, a data set previously generated by a seismometer) associated with the previously generated data set model that is determined to be the closest match to the data set model of the data set 1113e.

As depicted, the one or more tasks so selected by the processor 1550 of the coordination device 1500, based on the closest one of such sufficiently close matches, may be at least one normalization task and/or at least one data transform task. By way of example, and like the data sets 1113c and 1113d, the processor 1550 may select a time normalization task to be performed with the data set portions 1310e of the data set 1113e in which the time for each distance measurement taken is normalized to a different time zone as part of generating normalized data set portions 1317e from corresponding ones of the data set portions 1310e. Alternatively or additionally, a normalization task may be selected by the processor 1550 of the coordinating device 1500 in which a unit of measurement used for the distance measurements is converted to another unit of measurement in generating the normalized data set portions 1317e.

Alternatively or additionally by way of another example, the fact that the data set 1113e was generated by a pair of position sensors may result in the processor 1550 selecting one or more data transform tasks to perform to generate corresponding transformed data set portions 1318e in which an identifier of the pair of position sensors e and f in the data set 1113e are correlated to their locations. Based on such a correlated location, the processor 1550 of the coordinating device 1500 may select a data transform task in which the distance values are converted to vertical distance values indicating differences in relative elevation or height. For example, such a correlation may reveal the horizontal distance between the positions of the two position sensors e and f. As familiar to those skilled in the art, and as depicted in FIG. 18A, the two position sensors e and f may be placed at locations that differ in elevation, where the elevation of one of them relative to the other may fluctuate over time due to the local subduction activity, but with a horizontal distance that is known and highly unlikely to change over time as a result of both position sensor being located atop the same tectonic plate. Such positioning may, therefore, allow the fluctuations in relative elevation (relative heights) to be detected as changes in the direct line-of-sight distance between the two position sensors. As the line of sight distance is along a laser beam directed at an angle between the lower and higher positions of the two sensors, a simple trigonometric calculation may be recurringly performed to convert each new line-of-sight distance measurement therebetween into a relative vertical heights (elevations) therebetween. Thus, the processor 1550 may select a transformation task to be performed in which the known horizontal distance between the two position sensors e and f is used to perform the trigonometric calculation with every distance value in the data set 1113e as part of generating the transformed data set portions 1318e.

Upon the making of such a selection of one or more normalization tasks and/or one or more data transform tasks by the processor 1550 of the coordinating device 1500, the processor 1550 may then generate node instructions 1370e to instruct the processors 1350 of the node devices 1300 among which the data set portions 1310d have been distributed to each perform the selected task(s) with their corresponding data set portions 1310e. In so doing, the processors 1350 of those node devices 1300 may effect the generation of the corresponding normalized data set portions 1317e and/or the corresponding transformed data set portions 1318e.

Turning to FIG. 18F, with the receipt of data sets for each of the sensors c, d, e, f, m, n and o, and with the selection and performance of various normalization and/or transform tasks on each of those data sets, multiple ones of the node devices 1300 may have access to corresponding transformed data set portions 1318c, 1318d, 1318e, 1318m, 1318n and 1318o. Also, the processor 1550 of the coordinating device 1500 may have additionally selected one or more analysis tasks to be performed on such a combination of data sets from such a combination of sensors to arrive at a determination of whether an earthquake has been detected within a particular span of time and/or various characteristics thereof. The processor 1550 may generate node instructions 1370 to cause the processors 1350 of the multiple ones of the node devices 1300 to perform the selected one or more analysis tasks to generate results data 1770 to include an indication of various characteristics of an earthquake that may have occurred within the particular span of time, such as the time at which such an earthquake began, its duration, its location, its depth below the surface of the ground of its location, and its magnitude.

Figure 19A:
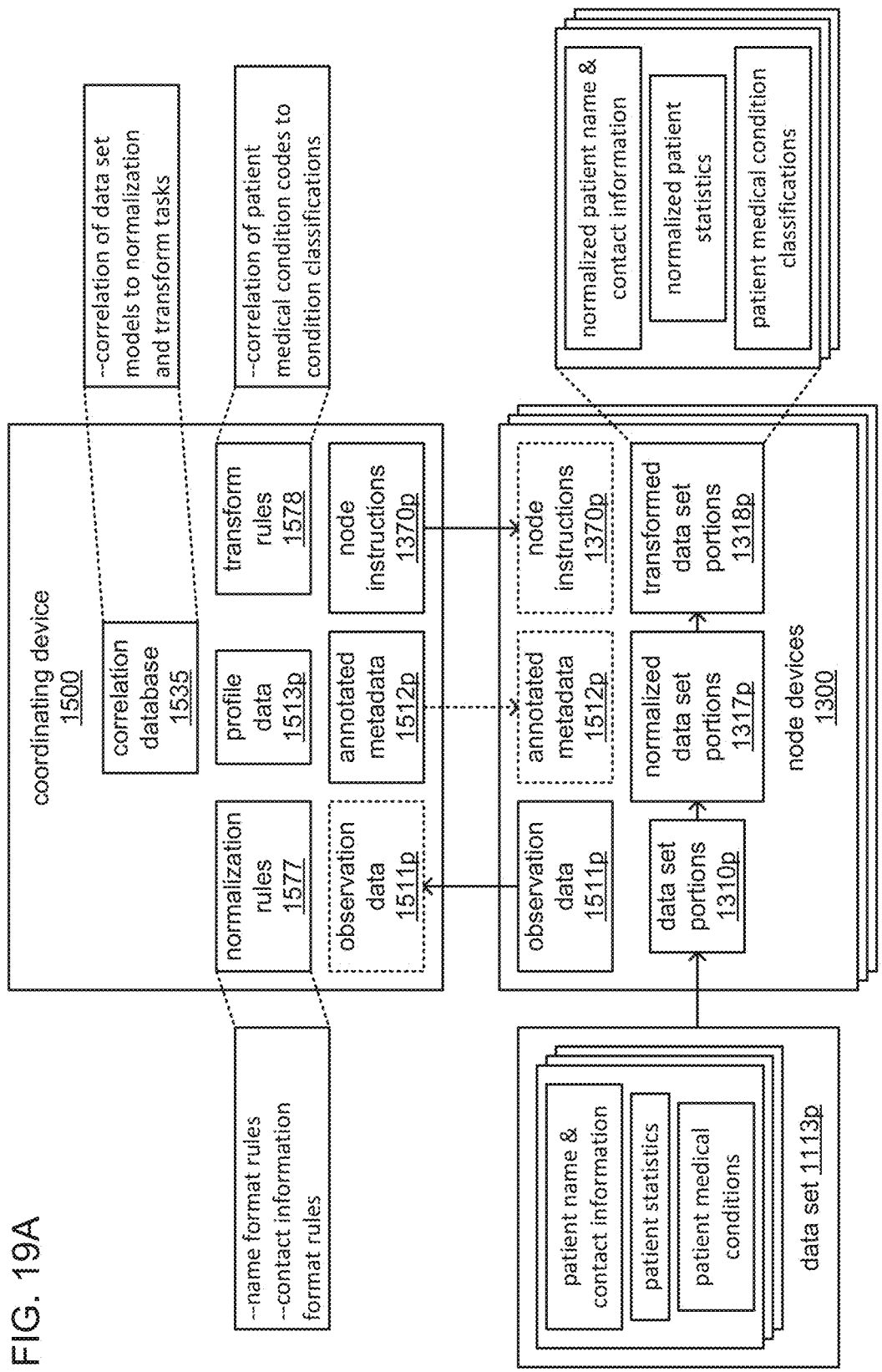
FIGS. 19A, 19B, 19C and 19D, together, illustrate an example of selection and performance of tasks with pharmaceutical and medical data sets.
Figure 19B:
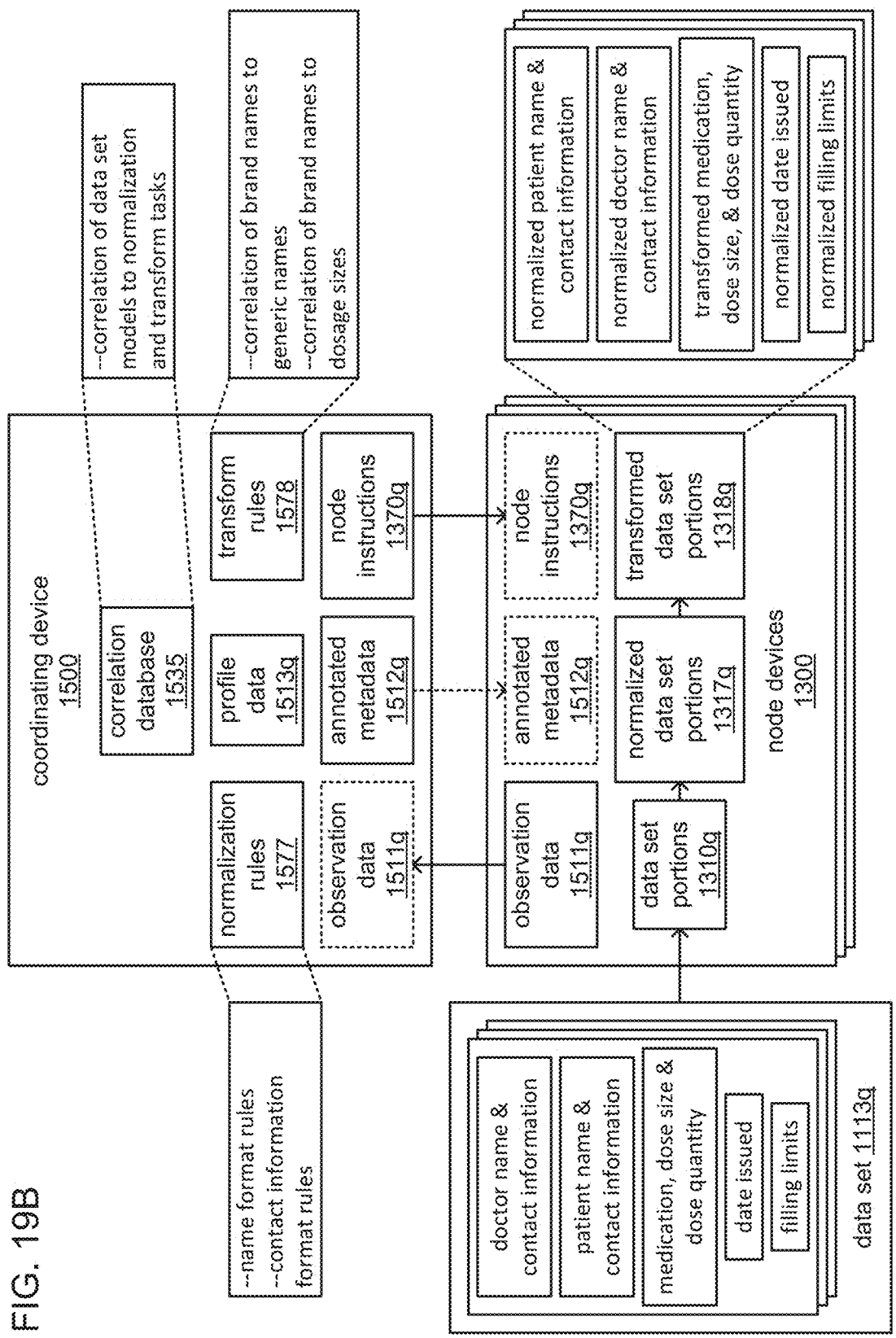
Figure 19C:
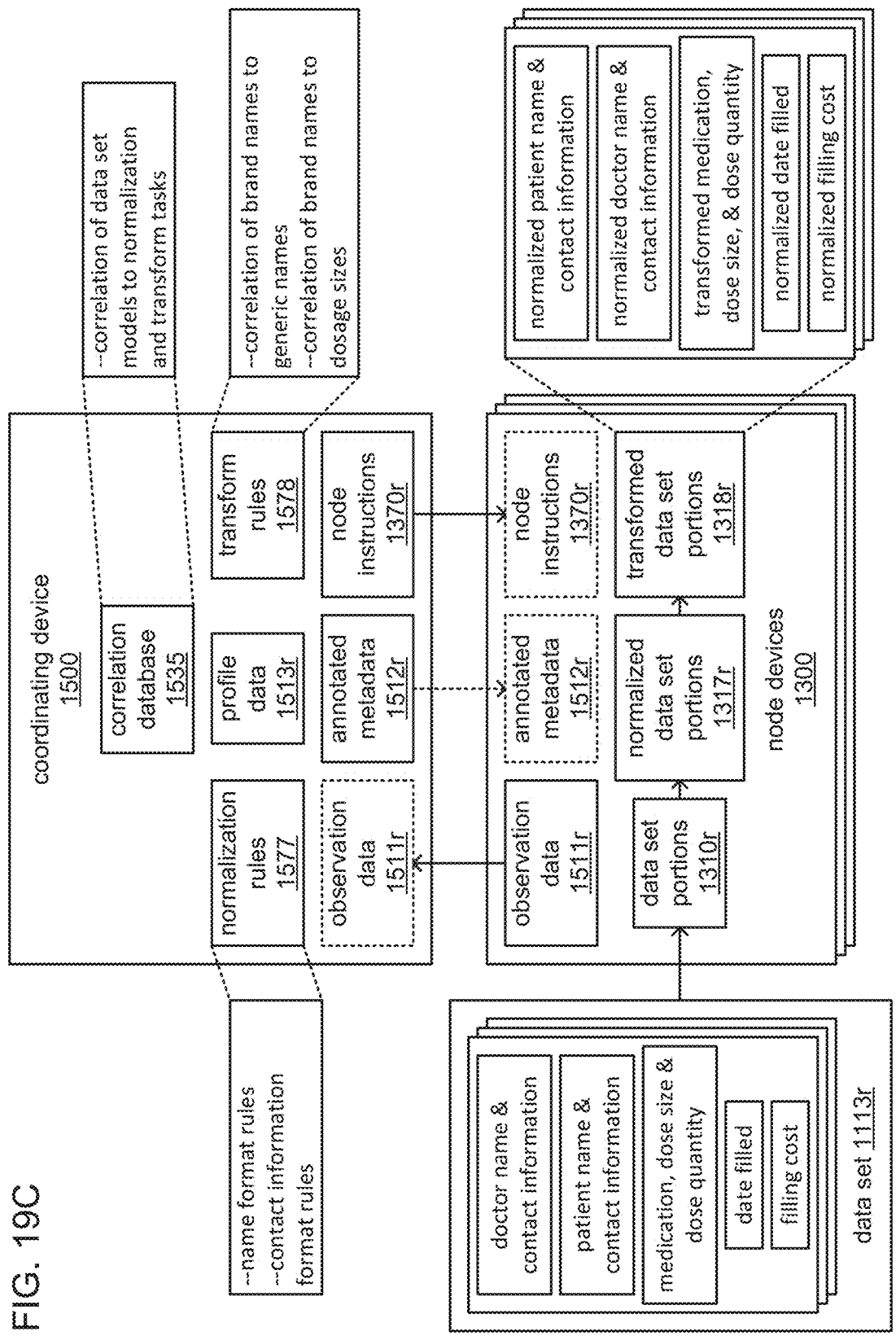
Figure 19D:
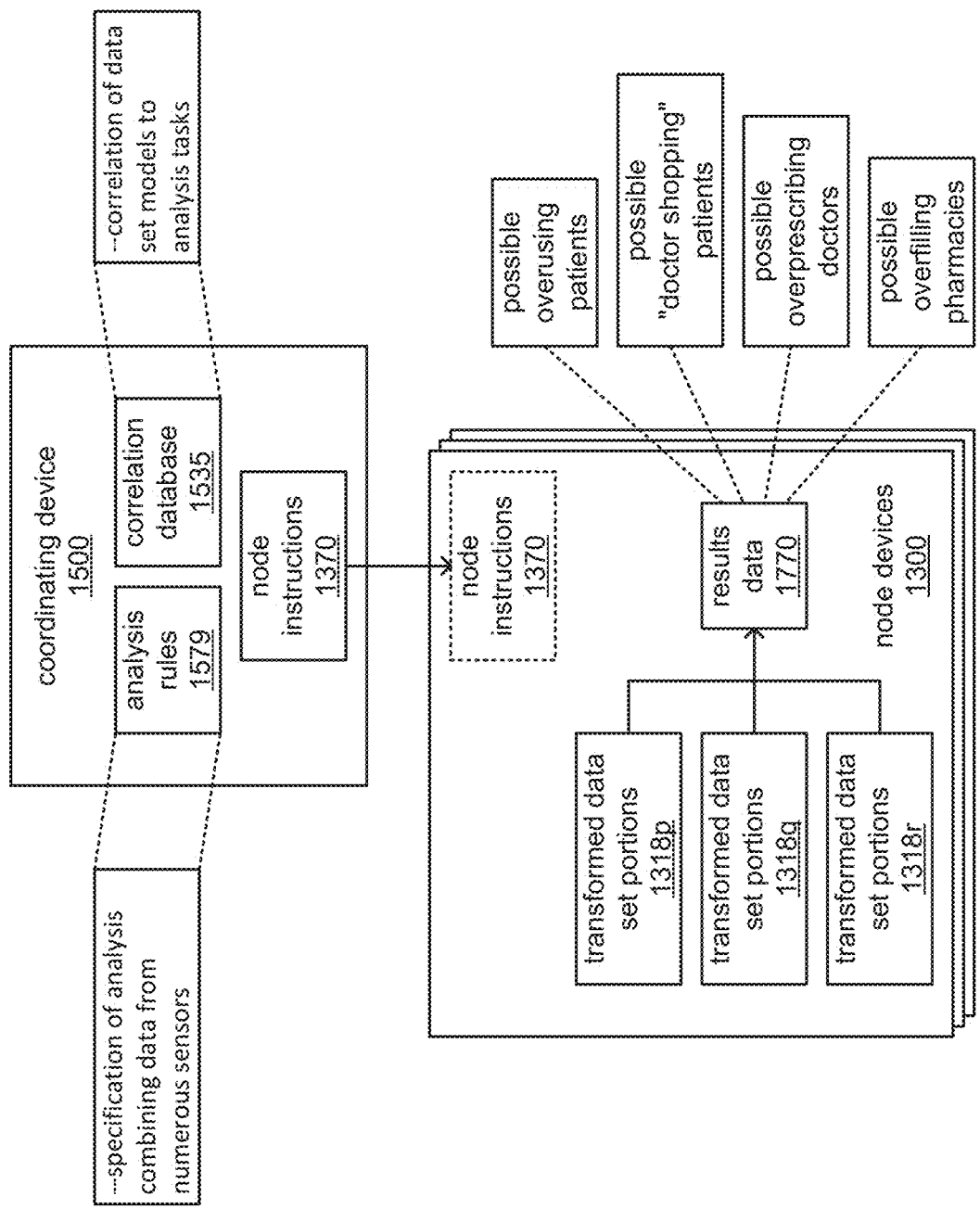

FIGS. 19A-D, together, illustrate an example of analyzing received data sets to select one or more tasks to perform with each in the area of pharmacology. A growing problem is the abuse of prescription medications, especially narcotic pain relieving medications. Rates of hospitalization and deaths among patients have risen sharply within the last decade. Each of FIGS. 19A, 19B and 19C illustrates aspects of the selection and performance of one or more normalization and/or data transform tasks on one or more data sets generated by hospitals, doctors and pharmacies concerning patients and their prescriptions. FIG. 19D illustrates aspects of the selection and performance of various analysis tasks employing normalized and/or transformed versions of at least the data sets associated with each of the sensors of FIGS. 19A-C to identify patients who may be abusing prescription medications, as well as doctors and/or pharmacies that may be acting in a manner that enables such abuse.

A review, in FIGS. 19A-C, of the patient data set 1113p, prescription issuance data set 1113q, and prescription filling data set 1113r reveals considerable cross-over of data items among these data sets, most notably with regard to names and contact information. As familiar to those with experience in investigating patient abuse of prescription medications, a common tactic used by patients in seeking to acquire larger quantities of the medications they have become addicted to is misleading use of variations of names and addresses.

Turning to FIG. 19A, a hospital, doctor's office or other medical facility may provide the patient data set 1113p that may then be divided into multiple data set portions 1310p that may be distributed among multiple ones of the node devices 1300 for separate and/or at least partially parallel analyses. The data items of the data set 1113p may be organized into any of a wide variety of data structures that enable association of various data items with each patient. Such data items may include a patient name, their contact information, various statistics about the patient (e.g., age, sex, weight, height, etc.), and indications of their medical conditions. By way of example, a linked list of one-dimensional arrays, an array of multiple dimensions or other data structure may be used in which data items making up each an entry or row for each patient may be organized into columns or other repetitive ordering of data items therein. Each row or other form of entry may be given a distinct label or other form of identifier as part of an indexing scheme, such as patient social security numbers in an ascending or descending order. Alternatively or additionally, the columns or other form of ordering/positioning of data items within each entry may be given distinct labels or other identifiers as part of an indexing scheme (e.g., text character labels such as "name", "address", "phone", "email", "age", "sex", "height", "weight", "date of last visit", "diagnosis codes", etc.). Alternatively or additionally, the data items may be organized into a series of data values separated by delimiters (e.g., punctuation, characters, separating characters such as dashes, space and/or tab codes, end-of-line codes, etc.) that may be used to distinguish at least the start and end of each entry, if not also to distinguish each data value within each entry. Alternatively or additionally, each of the data values specifying a time may be distinguishable from the depth measurements by its formatting (e.g., the presence of punctuation therein), such as the spacing and punctuation often used in setting apart portions of a name, and/or the spacing and punctuation often used in setting apart a city from a state and from a zip code in an address. One or more of the node devices 1300 may include, in the observation data 1511p, indications of any distinct labels that are identified in the data set 1113p by the processor 1350 of one or more devices 1300.

As previously discussed, the processor(s) 1350 of one or more of the node devices 1300 that have each been provided with at least one of the data set portions 1310p may generate corresponding instances of observation data 1511p from corresponding data set portions 1310p, and transmit the corresponding instances of the observation data 1511p to the coordinating device 1500. Each instance of the observation data 1511p may include indications of aspects of the data items and/or indications of structural features of the organization of the data items within a corresponding one of the data set portions 1310p from which the processor 1550 of the coordinating device 1500 may generate profile data 1513p and annotated metadata 1512p, respectively. As previously discussed, the processor 1550 may transmit one or more iterations of the annotated metadata 1512p to the multiple node devices 1300 that have each been provided with at least one of the data set portions 1310p, and the processors 1350 of those node devices 1300 may employ each such iteration of the annotated metadata 1512p in further analyses of corresponding data set portions 1310p to identify still more aspects of data items and/or structural features thereof. Indeed, as previously discussed, there may be multiple iterations of exchanges of instances of observation data 1511p and annotated metadata 1512p, and this may continue until a determination is made by the processors 1350 and/or the processor 1550 that there are no more of such aspects of the data items and/or structural features to be identified.

Following the generation of the annotated metadata 1512p and/or the profile data 1513p, the processor 1550 may then employ the combination of the annotated metadata 1512p and the profile data 1513p as a data set model of the data set 1113p in comparisons to previously generated data set models stored within the correlation database 1535. As has been discussed, such comparisons of data set models may entail comparisons to determine whether any of the previously generated data set models are a match in one or more characteristics within one or more thresholds. Thus, for example, it may be that the presence of labels such as "last visit" and/or "diagnosis codes", the inclusion of address formatting, the inclusion of ranges of values often associated with heights and weights of people, the inclusion of a variety of values associated with patient diagnosis codes, and/or any of a variety of other features and/or combination of features of the data set 1113p may enable the identification of one or more sufficiently close matches. Presuming one or more of such matches are found, then a selection of tasks to be performed with the data set 1113p may be made by the processor 1550 of the coordinating device based on indications within the correlation database 1535 of one or more tasks performed with a previously analyzed data set (presumably, a previous patient data set) associated with the previously generated data set model that is determined to be the closest match to the data set model of the data set 1113p.

As depicted, the one or more tasks so selected by the processor 1550 of the coordination device 1500, based on the closest one of such sufficiently close matches, may be at least one normalization task and/or at least one data transform task. Such normalization tasks may include normalization of patient names in which titles, portions of names, designations of "Sr." or "Jr.", and/or other aspects are organized and formatted in a consistent manner. Alternatively or additionally, a normalization task to similarly normalize patient contact information may be selected. Alternatively or additionally by way of another example, the inclusion of diagnosis codes may result in the processor 1550 selecting one or more data transform tasks to perform to correlate the diagnosis codes to classifications of the one or more medical conditions of each patient, where the classifications may each be correlated to one or more types of particular prescription medications or particular classifications of medications that may be deemed appropriate.

Upon the making of such a selection of one or more normalization tasks and/or one or more data transform tasks by the processor 1550 of the coordinating device 1500, the processor 1550 may then generate node instructions 1370p to instruct the processors 1350 of the node devices 1300 among which the data set portions 1310p have been distributed to each perform the selected task(s) with their corresponding data set portions 1310p. In so doing, the processors 1350 of those node devices 1300 may effect the generation of the corresponding normalized data set portions 1317p and/or the corresponding transformed data set portions 1318p.

Turning to FIG. 19B, a hospital, doctor's office or other medical facility may provide the prescription issuance data set 1113q that may then be divided into multiple data set portions 1310q that may be distributed among multiple ones of the node devices 1300 for separate and/or at least partially parallel analyses. Again, the data items of the data set 1113q may be organized into any of a wide variety of data structures that enable association of various data items with each patient. Such data items may include a patient name and their contact information, doctor name and their contact information, name and dosage details of prescribed medication(s), date of issuance of the prescription, and indications of any limits placed on the prescription (e.g., expiration date, number of times it can be filled, maximum quantity of doses, etc.). The columns or other form of ordering/positioning of data items within each entry for each prescription may be given distinct labels or other identifiers as part of an indexing scheme (e.g., text character labels such as "name", "address", "phone", "medication name", "dose size", "dose quantity", "date issued", etc.). One or more of the node devices 1300 may include, in the observation data 1511q, indications of any distinct labels that are identified in the data set 1113q by the processor 1350 of one or more devices 1300.

Again, the processor(s) 1350 of one or more of the node devices 1300 that have each been provided with at least one of the data set portions 1310q may generate corresponding instances of observation data 1511q from corresponding data set portions 1310q, and transmit the corresponding instances of the observation data 1511q to the coordinating device 1500. Each instance of the observation data 1511q may include indications of aspects of the data items and/or indications of structural features of the organization of the data items within a corresponding one of the data set portions 1310q from which the processor 1550 of the coordinating device 1500 may generate profile data 1513q and annotated metadata 1512q, respectively.

Again, the processor 1550 may then employ the combination of the annotated metadata 1512q and the profile data 1513q as a data set model of the data set 1113q in comparisons to previously generated data set models stored within the correlation database 1535. Presuming that one or more of sufficiently close matches are found, a selection of tasks to be performed with the data set 1113q may be made by the processor 1550 of the coordinating device based on indications within the correlation database 1535 of one or more tasks performed with a previously analyzed data set (presumably, a previous prescription data set) associated with the previously generated data set model that is determined to be the closest match to the data set model of the data set 1113q.

As depicted, the one or more tasks so selected by the processor 1550 of the coordination device 1500, based on the closest one of such sufficiently close matches, may be at least one normalization task and/or at least one data transform task. Such normalization tasks may include normalization of patient names and addresses, doctor names and addresses, dates on which prescriptions were issued, and/or the manner in which any limitations are expressed.

Alternatively or additionally by way of another example, the inclusion of indications of dose sizes and/or dose quantities may result in the processor 1550 selecting one or more data transform tasks to perform to correlate brand names of prescription medications to generic names and/or particular dose sizes. As familiar to those skilled in the art, medications offered under brand names also have generic names that are more descriptive of their chemical compounds. A selected transform task may include correlating and converting brand names given in prescriptions to generic names. As will also be familiar to those skilled in the art, a doctor may neglect to include an indication of dose size, and may presume that the fact of a brand name version of the prescribed medication being offered in only one prescription size makes the specification of the brand name, alone, sufficient. Thus, such a transform task may include deriving dose sizes in instances where a brand name is specified, but no specific does is given.

Upon the making of such a selection of one or more normalization tasks and/or one or more data transform tasks by the processor 1550 of the coordinating device 1500, the processor 1550 may then generate node instructions 1370$q$ to instruct the processors 1350 of the node devices 1300 among which the data set portions 1310$q$ have been distributed to each perform the selected task(s) with their corresponding data set portions 1310$q$. In so doing, the processors 1350 of those node devices 1300 may effect the generation of the corresponding normalized data set portions 1317$q$ and/or the corresponding transformed data set portions 1318$q$.

Turning to FIG. 19C, a pharmacy or other medical facility may provide the prescription filling data set 1113$r$ that may then be divided into multiple data set portions 1310$r$ that may be distributed among multiple ones of the node devices 1300 for separate and/or at least partially parallel analyses. Again, the data items of the data set 1113$r$ may be organized into any of a wide variety of data structures that enable association of various data items with each patient. Such data items may include a patient name and their contact information, doctor name and their contact information, name and dosage details of prescribed medication(s), date of filling of the prescription, and cost of filling the prescription. The columns or other form of ordering/positioning of data items within each entry for each prescription may be given distinct labels or other identifiers as part of an indexing scheme (e.g., text character labels such as "name", "address", "phone", "medication name", "dose size", "dose quantity", "date filled", etc.). One or more of the node devices 1300 may include, in the observation data 1511$r$, indications of any distinct labels that are identified in the data set 1113$r$ by the processor 1350 of one or more devices 1300.

Again, the processor(s) 1350 of one or more of the node devices 1300 that have each been provided with at least one of the data set portions 1310$r$ may generate corresponding instances of observation data 1511$r$ from corresponding data set portions 1310$r$, and transmit the corresponding instances of the observation data 1511$r$ to the coordinating device 1500. Each instance of the observation data 1511$r$ may include indications of aspects of the data items and/or indications of structural features of the organization of the data items within a corresponding one of the data set portions 1310$r$ from which the processor 1550 of the coordinating device 1500 may generate profile data 1513$r$ and annotated metadata 1512$r$, respectively.

Again, the processor 1550 may then employ the combination of the annotated metadata 1512$r$ and the profile data 1513$r$ as a data set model of the data set 1113$r$ in comparisons to previously generated data set models stored within the correlation database 1535. Presuming that one or more of sufficiently close matches are found, a selection of tasks to be performed with the data set 1113$r$ may be made by the processor 1550 of the coordinating device based on indications within the correlation database 1535 of one or more tasks performed with a previously analyzed data set (presumably, a previous prescription data set) associated with the previously generated data set model that is determined to be the closest match to the data set model of the data set 1113$r$.

As depicted, the one or more tasks so selected by the processor 1550 of the coordination device 1500, based on the closest one of such sufficiently close matches, may be at least one normalization task and/or at least one data transform task. Such normalization tasks may include normalization of patient names and addresses, doctor names and addresses, dates on which prescriptions were filled, and/or amounts of currency for costs of filling. Alternatively or additionally, and like the prescription issuance data set 1113$q$, the inclusion of indications of dose sizes and/or dose quantities may result in the processor 1550 selecting one or more data transform tasks to perform to correlate brand names of prescription medications to generic names and/or particular dose sizes.

Upon the making of such a selection of one or more normalization tasks and/or one or more data transform tasks by the processor 1550 of the coordinating device 1500, the processor 1550 may then generate node instructions 1370$r$ to instruct the processors 1350 of the node devices 1300 among which the data set portions 1310$r$ have been distributed to each perform the selected task(s) with their corresponding data set portions 1310$r$. In so doing, the processors 1350 of those node devices 1300 may effect the generation of the corresponding normalized data set portions 1317$r$ and/or the corresponding transformed data set portions 1318$r$.

Turning to FIG. 19D, with the selection and performance of various normalization and/or transform tasks with each of the data sets 1113$p$, 1113$q$ and 1113$r$, multiple ones of the node devices 1300 may have access to corresponding transformed data set portions 1318$p$, 1318$q$ and 1318$r$. Also, the processor 1550 of the coordinating device 1500 may have additionally selected one or more analysis tasks to be performed on such a combination of data sets to identify patients who may be overusing prescription drugs (including patients who may be engaged in "doctor shopping" to obtain multiple prescriptions from multiple doctors), doctors who may be over prescribing medications to their patients, and/or pharmacies that may be overfilling prescriptions. The processor 1550 may generate node instructions 1370 to cause the processors 1350 of the multiple ones of the node devices 1300 to perform the selected one or more of these analysis tasks to generate results data 1770 with such indications of possible abuse of prescription medications and/or the actions of medical professionals who may be enabling such abuse.

Figure 20:
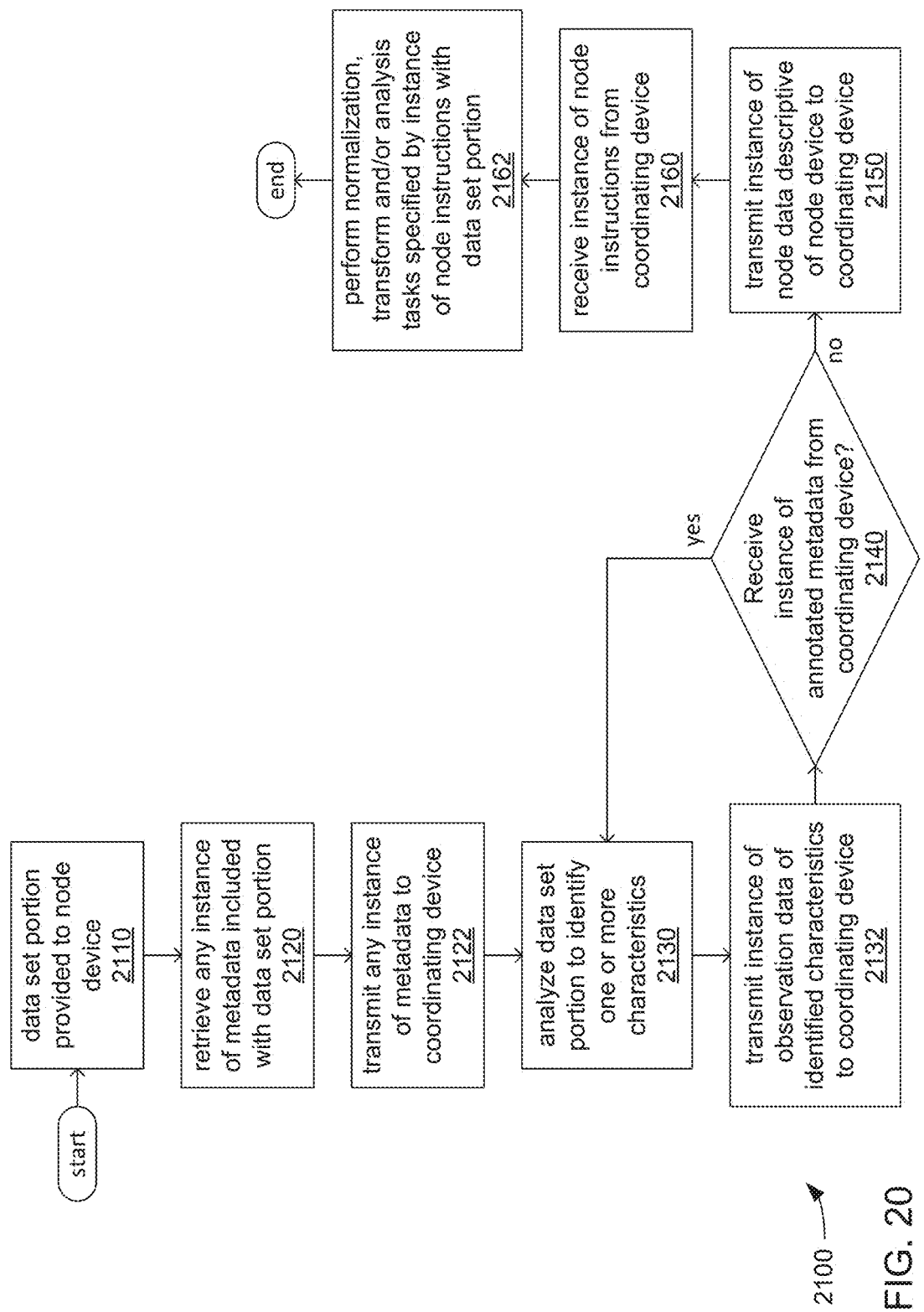
FIG. 20 illustrates an example embodiment of a logic flow of a node device analyzing and performing one or more tasks with a data set portion.

FIG. 20 illustrates an example embodiment of a logic flow 2100. The logic flow 2100 may be representative of some or all of the operations executed by one or more embodiments described herein. More specifically, the logic flow 2100 may illustrate operations performed by the processor 1350 in executing the control routine 1340, and/or performed by other component(s) of at least one of the node devices 1300.

At 2110, a processor of a node device of a node device grid of a distributed processing system (e.g., the processor 1350 of one of the node devices 1300 of the node device grid 1003 of the distributed processing system 1000) may receive and/or retrieve a data set portion of a selected data set from a storage device of a storage device grid of the distributed processing system (e.g., one of the data set portions 1310 of the selected data set 1113 from one of the storage devices 1100 of the storage device grid 1001). As has been discussed, in various embodiments, the storage device may transmit the data set portion to the node device via a network (e.g., the network 1999) without prompting from the node device, or the processor of the node device may operate its corresponding network interface (e.g., a network interface 1390) to transmit a request and/or other signal to the storage device grid to cause the node device to be provided with the data set portion.

At 2120, the processor of the node device may retrieve any instance of metadata that may have been included with the data set portion from the storage device (e.g., any instance of metadata 1510 incorporated into or provided along with a data set portion 1310). As has been discussed, in various embodiments, a data set portion may incorporate an instance of metadata providing indications of structural features of at least the data set portion, if not the whole of the selected data set. Alternatively, such an instance of metadata may not be incorporated into the data set portion, but may be provided to the node device along with the data set portion. However, as also previously discussed, in other embodiments, the data set portion may be provided to the node device without an accompanying instance of metadata.

At 2122, the processor of the node device may operate its corresponding network interface to transmit any such provided instance of metadata to a coordinating device (e.g., the coordinating device 1500) via the network. As has been discussed, in some embodiments, another node device (e.g., another of the node devices 1300) may serve as the coordinating device in lieu of there being a distinct coordinating device, and may do so in addition to serving as another node device.

At 2130, the processor of the node device may analyze the data set portion to identify one or more characteristics of the data set portion. As previously discussed, such identified characteristics may include structural features of the data set portion, such as the manner in which data items are organized within the data set portion, including and not limited to aspects of any indexing scheme that may be used. As also previously discussed, such identified characteristics may include features of the data items, such as aspects of the data values of the data items, including and not limited to highest and/or lowest values, mean and/or average values, etc. At 2132, the processor may operate its corresponding network interface to transmit an instance of observation data (e.g., an instance of the observation data 1511) that includes indications of such identified characteristics to the coordinating device.

At 2140, the processor of the node device may check whether annotated metadata (e.g., the annotated metadata 1512) has been provided to the node device by the coordinating device. If so, then the processor may perform another analysis of the data set portion at 2130. As previously discussed, the coordinating device may employ instances of metadata from the node devices, instances of observation from the node devices and/or metadata from the storage device grid (e.g., the metadata 1115) to generate the annotated metadata to include indications of structural features of the whole of the selected data set. The coordinating device may then provide the annotated metadata to the multiple node devices that have received data set portions of the selected data set to enable the node devices to use the indications of structural features of the whole of the selected data set to further analyze their corresponding data set portions to identify further characteristics. The node devices may then provide more instances of the observation data that indicate any additional identified characteristics to the coordinating device to enable the coordinating device to generate a more complete instance of the annotated metadata. As also previously discussed, in various embodiments, the provision of ever more complete instances of the annotated metadata by the coordinating device to the node devices and the provision of new instances of the observation data by the node devices to the coordinating device may occur in multiple iterations. Such iterations may stop when the node devices and/or the coordinating device determines that no further characteristics have been identified during the most recent iteration that would enable another more complete iteration of the annotated metadata to be generated.

However, if at 2140, another instance of the annotated data has not been received since the processor of the node device last performed an analysis of the data set portion at 2130 and/or transmitted an instance of observation data at 2132, then at 2150, the processor may operate its corresponding network interface to transmit an instance of node data (e.g., an instance of the node data 1330) to the coordinating device. As previously discussed, each of the multiple node devices that is provided with a data set portion of the selected data set may transmit at least one instance of node data indicative of characteristics of the node device to coordinating device for use in generating an instance of node instructions (e.g., an instance of the node instructions 1370) for execution by the processor of the node device.

At 2160, the processor of the node device may operate its corresponding network interface to receive the instance of the node instructions generated by the coordinating device for the node device. At 2162, the processor may execute the received instance of the node instructions to perform the normalization, transform and/or analysis tasks specified by the received instance of the node instructions with the data set portion.

Figure 21A:
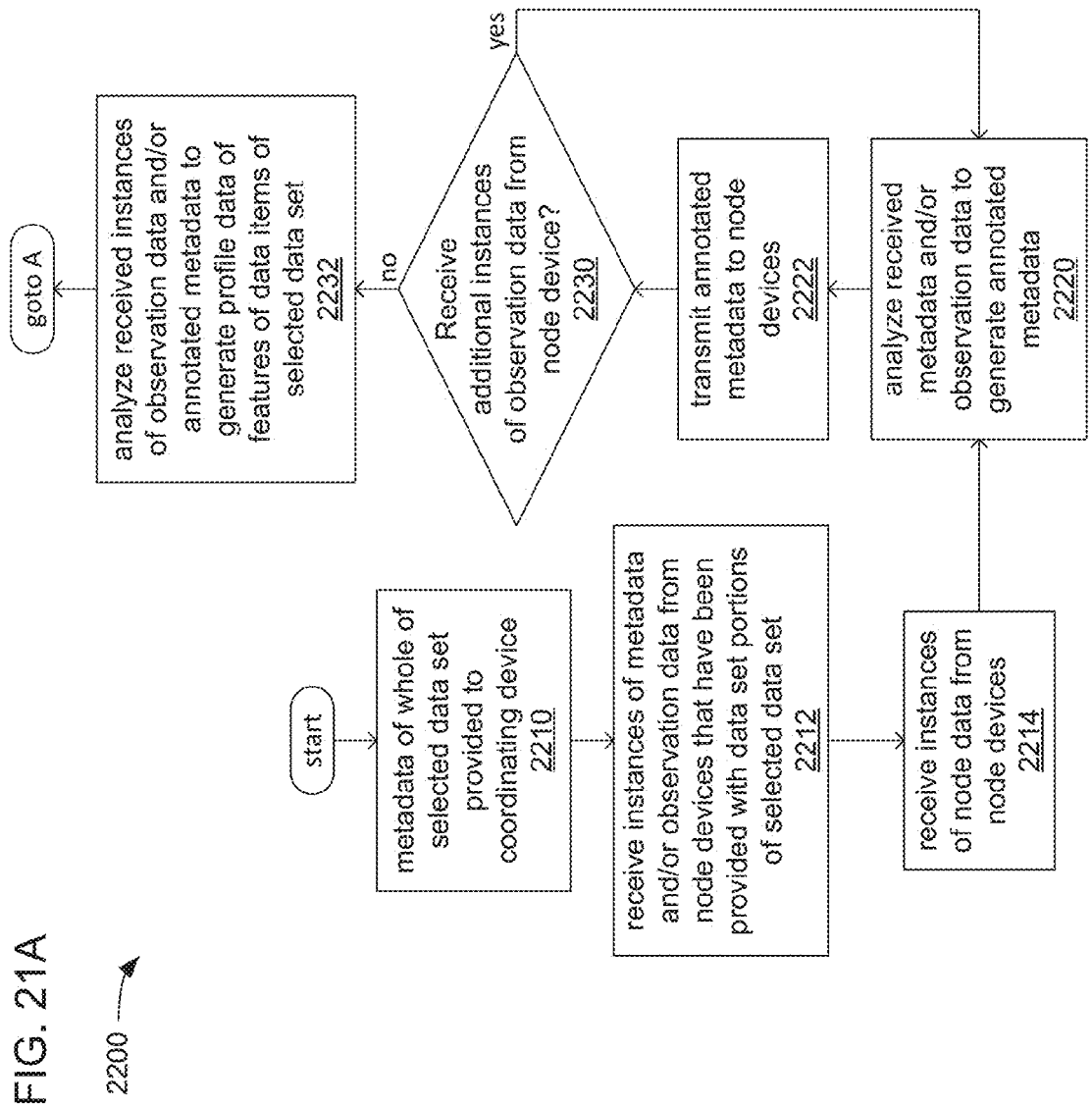
FIGS. 21A and 21B, together, illustrate an example embodiment of a logic flow of a coordinating device selecting one or more tasks for node devices to perform with a selected data set.
Figure 21B:
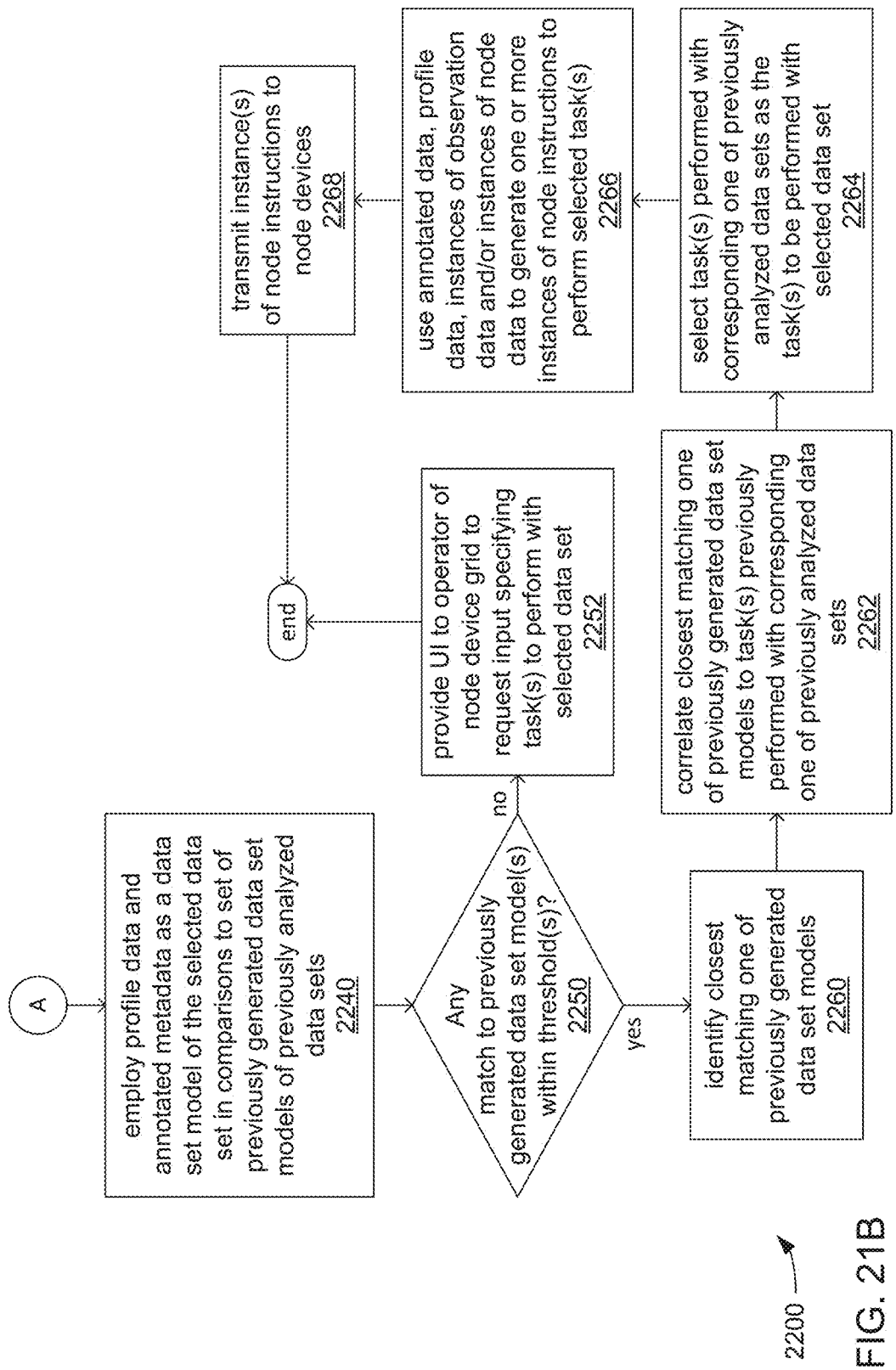

FIGS. 21A and 21B, together, illustrate an example embodiment of a logic flow 2200. The logic flow 2200 may be representative of some or all of the operations executed by one or more embodiments described herein. More specifically, the logic flow 2200 may illustrate operations performed by the processor 1550 in executing the control routine 1540, and/or performed by other component(s) of the coordinating device 1500, or of a node device 1300 serving as a coordinating device in lieu of a separate and distinct coordinating device 1500.

At 2210, a processor of a coordinating device of a distributed processing system (e.g., the processor 1550 of the coordinating device 1500 of the distributed processing system 1000, or the processor 1350 of a node device 1300 that additionally serves as the coordinating device) may receive and/or retrieve metadata descriptive of a selected data set from a storage device of a storage device grid of the distributed processing system (e.g., the metadata 1115 descriptive of the selected data set 1113 from one of the storage devices 1100 of the storage device grid 1001). As has been discussed, in various embodiments, the storage device may transmit the metadata to the coordinating device via a network (e.g., the network 1999) without prompting from the coordinating device, or the processor of the coordinating device may operate its corresponding network interface (e.g., a network interface 1590) to transmit a request and/or other signal to the storage device grid to cause the coordinating device to be provided with the data set portion.

At 2212, the processor of the coordinating device may operate the network interface to receive instances of metadata and/or instances of observation data (e.g., instances of the metadata 1510 and/or instances of the observation data 1511) from multiple node devices of a node device grid (e.g., the node devices 1300 of the node device grid 1003) of the distributed processing system that have each been provided with a data set portion of the selected data set from the storage device grid (e.g., the data set portions 1310 of the selected data set 1113). As has been discussed, the coordinating device may receive metadata from the storage device grid that includes indications of structural features of the whole of the selected data set, or the coordinating device may receive instances of metadata from the multiple node devices that include indications of structural features of separate data set portions, or both. At 2214, the processor may operate the network interface to receive instances of node data (e.g., instances of the node data 1330) from the multiple node devices that are descriptive of aspects of the processing environment present within each of the multiple node devices.

At 2220, the processor of the coordinating device may analyze the instances of metadata from the multiple node devices, the instances of observation from the multiple node devices and/or the metadata from the storage device grid to generate annotated metadata (e.g., the annotated metadata 1512) to include indications of structural features of the whole of the selected data set. As has been discussed where metadata indicative of structural features of the whole of the selected data set was provided by the storage device grid, the processor may augment the metadata with indications of structural features of separate data set portions provided by the multiple node devices via the instances of metadata and/or instances of the observation data. Alternatively, where no metadata indicative of the structural features of the whole of the selected data set was provided to the coordinating device, the processor may generate the annotated metadata by combine indications of structural features of separate data set portions provided by the multiple node devices via the instances of metadata and/or instances of the observation data.

At 2222, the processor of the coordinating device may then operate the network interface to transmit the annotated metadata to the multiple node devices to enable the each of the multiple node devices to use the indications of structural features of the whole of the selected data set to further analyze their corresponding data set portions to identify further characteristics. The node devices may then provide more instances of the observation data that indicate any additional identified characteristics to the coordinating device to enable the coordinating device to generate a more complete instance of the annotated metadata.

At 2230, the processor of the coordinating device may check whether additional instances of the observation data have been provided to the coordinating device by the multiple node devices. If so, then the processor may, at 2220, again analyze the instances of observation from the multiple node devices to generate a more complete instance of the annotated metadata, and may transmit the now augmented instance of the annotated metadata to the multiple node devices at 2222. Again, in various embodiments, the provision of ever more complete instances of the annotated metadata by the coordinating device to the node devices and the provision of new instances of the observation data by the node devices to the coordinating device may occur in multiple iterations. Such iterations may stop when the node devices and/or the coordinating device determines that no further characteristics have been identified during the most recent iteration that would enable another more complete iteration of the annotated metadata to be generated.

However, if at 2230, further instances of the observation data have not been received since the processor of the coordinating device last generated the annotated metadata at 2220 and/or transmitted the annotated metadata at 2222, then at 2232, the processor may analyze the received instances of the observation data, and may do so along with the annotated metadata, to generate profile data that includes indications of features of the data items within the selected data set. As previously discussed, the annotated metadata descriptive of structural features of the selected data set, and the profile data descriptive of features of the data items of the selected data set, may together define a data set model of the selected data set. At 2240, the processor may compare such a data set model of the selected data set to each of a set of previously generated data set models that were each earlier generated from one of a set of previously analyzed data sets.

At 2250, if the processor of the coordinating device determines, from the performance of the comparisons at 2240, that none of the previously generated data set models match the data set model generated from the selected data set to a degree that is within one or more predetermined thresholds, then the processor may provide a user interface (UI) to an operator of the node device grid to present the operator with a request for input specifying one or more tasks to be performed with the selected data set at 2252. As previously discussed, the processor may employ one or both of a display and an input device (e.g., the display 1580 and/or input device 1520 of the coordinating device 1500, or the display 1780 and/or input device 1720 of the viewing device 1700) to provide the UI.

However, if at 2250, there is one or more of the previously generated data set models that is such a match, then at 2260, the processor of the coordinating device may identify the closest match among the one or more matching previously generated data set models. At 2262, the processor may then correlate the closest matching one of the previously generated data set models to the one or more tasks previously performed with the previously analyzed data set that corresponds to the closest matching one of the previously generated data set models. At 2264, the processor may select the correlated one or more previously performed tasks to be the one or more tasks to be performed with the selected data set. As previously discussed, the data set model is generated to include indications of characteristics of the selected data set, just as each of the previously generated data set models were previously generated to include indications of characteristics of a corresponding one of the previously analyzed data sets. Thus, in performing comparisons between the data set model and each of the previously generated data set models, the data set model and each of the previously generated data set models are employed as a proxy for its corresponding data set. And therefore, a sufficiently close match between the data set model and one of the previously generated data set model may be deemed an indication that the data sets corresponding to each are sufficiently similar that it may be desirable to perform the same one or more tasks on the selected data set as were performed on the corresponding previously analyzed data set.

Accordingly, at 2266, the processor of the coordinating device may employ the annotated metadata, received instances of the observation data and/or received instances of the node data to generate one or more instances of node instructions for execution by processors of the multiple node devices to perform the one or more selected tasks with their corresponding data set portions of the selected data set. As previously discussed, received instances of node data may be employed to determine how many instances of the node instructions are needed to provide the processor of each of the node devices with node instructions that are executable by that processor. At 2268, the processor may operate the network interface to transmit the one or more instances of the node instructions to the multiple node devices via the network.

FIG. 22 illustrates an example embodiment of a logic flow 2300. The logic flow 2300 may be representative of some or all of the operations executed by one or more embodiments described herein. More specifically, the logic flow 2300 may illustrate operations performed by the processor 1550 in executing the control routine 1540, and/or performed by other component(s) of the coordinating device 1500, or of a node device 1300 serving as a coordinating device in lieu of a separate and distinct coordinating device 1500.

At 2310, a processor of a coordinating device of a distributed processing system (e.g., the processor 1550 of the coordinating device 1500 of the distributed processing system 1000, or the processor 1350 of a node device 1300 that additionally serves as the coordinating device) may compare a data set model of a selected data set (e.g., the data set model 1514 of the selected data set 1113) to each of a set of previously generated data set models that were each earlier generated from one of a set of previously analyzed data sets. Again, as previously discussed, the data set model is generated to include indications of characteristics of the selected data set, and each of the previously generated data set models were previously generated to include indications of characteristics of a corresponding one of the previously analyzed data sets. Thus, in performing comparisons between the data set model and each of the previously generated data set models, the data set model and each of the previously generated data set models are employed as a proxy for its corresponding data set.

At 2320, if the processor of the coordinating device determines, from the performance of the comparisons at 2310, that at least one of the previously generated data set models does match the data set model generated from the selected data set to a degree that is within one or more predetermined thresholds, then at 2322, the processor may correlate the closest matching one of the previously generated data set models to the one or more tasks previously performed with the previously analyzed data set that corresponds to the closest matching one of the previously generated data set models, and may select the one or more previously performed tasks to be the one or more tasks to perform with the selected data set. At 2324, the processor may employ previously generated annotated metadata and/or profile data of the data set model (e.g., the annotated metadata 1512 and/or the profile data 1513), and/or instances of observation data and/or node data (e.g., instances of the observation data 1511 and/or the node data 1330) received from multiple node devices of a node device grid of the distributed processing system (e.g., the node devices 1300 of the node device grid 1003) to generate one or more instances of node instructions for execution by processors of the multiple node devices (e.g., instance of the node instructions 1370 by the processors 1350 of the node devices 1300) to perform the one or more selected tasks with corresponding data set portions of the selected data set.

However, if at 2330, if the processor of the coordinating device determines, from the performance of the comparisons at 2240, that none of the previously generated data set models match the data set model generated from the selected data set to a degree that is within one or more predetermined thresholds, then the processor may identify multiple ones of the previously generated data set models that most closely match the data set model of the selected data set at 2330. The processor may then organize the identified closest matching ones of the previously generated data set models by relative degree of match to the data set model of the selected data set at 2332. At 2334, the processor may then correlate each of the closest matching ones of the previously generated data set models to the one or more tasks previously performed with a corresponding one of the previously analyzed data sets.

At 2340, the processor of the coordinating device may employ a user interface (UI) to present an operator of the node device grid with a request for input selecting the one or more tasks to be performed with the selected data set. In so doing, the processor may employ the UI to present each of the previously performed one or more tasks correlated to one of the closest matching ones of the previously generated data set models, and may do so in an order that corresponds to the relative degrees of match of the closest matching ones of the previously generated data set models to the data set model of the selected data set. At 2342, the processor may receive the requested input selecting the one or more tasks to perform with the selected data set.

In various embodiments, each of the processors 1150, 1350, 1550 and 1750 may include any of a wide variety of commercially available processors. Further, one or more of these processors may include multiple processors, a multi-threaded processor, a multi-core processor (whether the multiple cores coexist on the same or separate dies), and/or a multi-processor architecture of some other variety by which multiple physically separate processors are linked.

However, in a specific embodiment, the processor 1550 of the coordinating device 1500 may be selected to efficiently perform the analysis of multiple instances of the metadata 1510 and/or the observation data 1511 in generating the annotated metadata 1512. Alternatively or additionally, the processor 1350 of each of the node devices 1300 may be selected to efficiently perform analyses of and/or tasks with corresponding ones of the data set portions 1310 at least partially in parallel. By way of example, the processor 1350 and/or 1550 may incorporate a single-instruction multiple-data (SIMD) architecture, may incorporate multiple processing pipelines, and/or may incorporate the ability to support multiple simultaneous threads of execution per processing pipeline. Alternatively or additionally by way of example, the processor 1350 of at least one of the node devices 1300 may incorporate multi-threaded capabilities and/or multiple processor cores to enable parallel performances of the functions of both the coordinating device 1500 and a node device 1300 in embodiments of the distributed processing system 1000 that, like the embodiment depicted in FIG. 12, do not include a separate and distinct coordinating device 1500.

In various embodiments, each of the control routines 1140, 1340, 1540 and 1740, including the components of which each is composed, may be selected to be operative on whatever type of processor or processors that are selected to implement applicable ones of the processors 1150, 1350, 1550 and/or 1750 within corresponding ones of the devices

1100, 1300, 1500 and/or 1700. In various embodiments, each of these routines may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the processors 1150, 1350, 1550 and/or 1750. Where one or more device drivers are included, those device drivers may provide support for any of a variety of other components, whether hardware or software components, of the devices 1100, 1300, 1500 and/or 1700.

In various embodiments, each of the storages 1160, 1360, 1560 and 1760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, non-volatile storage class memory, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

However, in a specific embodiment, the storage 1360 of one or more of the node devices 1300 that stores one or more of the data set portions 1310 may be implemented with a redundant array of independent discs (RAID) of a RAID level selected to provide fault tolerance to prevent loss of one or more of these datasets and/or to provide increased speed in accessing one or more of these datasets.

In various embodiments, each of the input devices 1520 and 1720 may each be any of a variety of types of input device that may each employ any of a wide variety of input detection and/or reception technologies. Examples of such input devices include, and are not limited to, microphones, remote controls, stylus pens, card readers, finger print readers, virtual reality interaction gloves, graphical input tablets, joysticks, keyboards, retina scanners, the touch input components of touch screens, trackballs, environmental sensors, and/or either cameras or camera arrays to monitor movement of persons to accept commands and/or data provided by those persons via gestures and/or facial expressions. In various embodiments, each of the displays 1580 and 1780 may each be any of a variety of types of display device that may each employ any of a wide variety of visual presentation technologies. Examples of such a display device includes, and is not limited to, a cathode-ray tube (CRT), an electroluminescent (EL) panel, a liquid crystal display (LCD), a gas plasma display, etc. In some embodiments, the display 1580 of the coordinating device 1500 and/or the display 1780 of the viewing device 1700 may be a touchscreen display such that the input device 1520 may be incorporated into the display 1580 and/or the input device 1720 may be incorporated into the display 1780. In such embodiments, the input device 1520 and/or the input device 1720 may be a touch-sensitive component of the display 1580 and/or the display 1780, respectively.

In various embodiments, the network interfaces 1190, 1390, 1590 and 1790 may employ any of a wide variety of communications technologies enabling these devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processors (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

However, in a specific embodiment, the network interface 1390 of one or more of the node devices 1300 that stores one or more of the data set portions 1310 may be implemented with multiple copper-based or fiber-optic based network interface ports to provide redundant and/or parallel pathways in exchanging one or more of the data set portions 1310 with the one or more storage devices 1100.

In various embodiments, the division of processing and/or storage resources among the coordinating device 1500 and/or the node devices 1300, and/or the API architectures supporting communications among the coordinating device 1500 and/or the node devices 1300, may be configured to and/or selected to conform to any of a variety of standards for distributed processing, including without limitation, IEEE P2413, AllJoyn, IoTivity, etc. By way of example, a subset of API and/or other architectural features of one or more of such standards may be employed to implement the relatively minimal degree of coordination described herein to provide greater efficiency in parallelizing processing of data, while minimizing exchanges of coordinating information that may lead to undesired instances of serialization among processes. However, it should be noted that the parallelization of storage, retrieval and/or processing of the data set portions 1310 of the selected data set 1113 are not dependent on, nor constrained by, existing API architectures and/or supporting communications protocols. More broadly, there is nothing in the manner in which the selected data set 1113 may be organized in storage, transmission and/or distribution via the network 1999 that is bound to existing API architectures or protocols.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing.

The invention claimed is:

1. An apparatus comprising a processor and a storage to store instructions that, when executed by the processor, cause the processor to perform operations comprising:
    retrieve node data, from a node device, wherein the node data is descriptive of at least one characteristic of an execution environment of the node device;
    generate a current data set model, wherein the current data set model is descriptive of at least one characteristic of a current data set;
    compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set;
    in response to detection of a match that meets the similarity threshold between the at least one characteristic described in the current data set model and the at least one characteristic described in the at least one previously generated data set model:
        retrieve an indication from a correlation database of at least one previously performed action previously performed on the at least one previously analyzed data set, wherein the at least one previously performed action comprises at least one of normalization, a transform or a task performed on the at least one previously analyzed data set;
        select a computer language based on the node data;
        generate node instructions, in the selected computer language and based on at least the current data set model, to cause the node device to perform the at least one previously performed action on at least a portion of the current data set; and
        transmit the node instructions to the node device;
    in response to detection of a lack of a match that meets the similarity threshold between the at least one characteristic described in the current data set model and the at least one characteristic described in the at least one previously generated data set model, present a request for input indicative of a current action to perform on the current data set, wherein the current action comprises at least one of normalization, a transform or a task to be performed on the current data set;
    monitor previously performed actions performed on each previously analyzed data set of the at least one previously analyzed data set;
    for each previously analyzed data set of the at least one previously analyzed data set, store previously generated data set model that corresponds to the previously analyzed data set correlated to an indication of a previously performed action performed on the previously analyzed data set in the correlation database;
    derive a correlation between the at least one characteristic and the at least one previously performed action from the correlation database; and
    determine the at least one previously performed action to cause the node device to perform on the current data set based on the correlation.

2. The apparatus of claim 1, wherein the processor is caused to perform operations comprising:
    retrieve a first portion of the current data set from a storage device;
    identify at least one characteristic of the first portion to generate first descriptive data descriptive of the at least one characteristic of the portion of the current data set;
    retrieve, from the node device, second descriptive data that is descriptive of at least one characteristic of a second portion of the current data set stored by the node device;
    combine at least the first and second descriptive data to generate an annotated metadata, wherein the annotated metadata comprises an indication of at least one of a label by which the current data set is organized, a delimiter used to separate two data items within the current data set, or a format of a data item within the current data set; and
    generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set.

3. The apparatus of claim 2, wherein the processor, in response to the detection of a match that meets the similarity threshold between the at least one characteristic described in the current data set model and the at least one characteristic described in the at least one previously generated data set model, is caused to perform operations comprising:
    select at least one computer language from which to generate multiple instances of node instructions to cause at least the processor to perform the previously performed action on the first portion of the current data set and to cause the node device to perform the previously performed action on the second portion of the current data set, wherein in the multiple instances of node instructions comprises the node instructions transmitted to the node device.

4. The apparatus of claim 1, comprising a display and an input device, wherein the processor is caused to present the request on the display and monitor the input device for receipt of the requested input.

5. The apparatus of claim 1, wherein the task performed on the at least one previously analyzed data set comprises at least one of a region-specific normalization, an industry-specific transform, a statistical analysis, or an aggregation of results of multiple statistical analyses.

6. The apparatus of claim 1, wherein the node data comprises an indication of at least one of a processor type of the node device, a quantity of storage space within the node device, a type of operating system executed by the node device, a type of language interpreter executed by the node device, or a configuration setting of the node device.

7. The apparatus of claim 1, wherein the computer language is selected from a group consisting of a programming language, a scripting language, a database query language and a machine language.

8. An apparatus comprising a processor and a storage to store instructions that, when executed by the processor, cause the processor to perform operations comprising:
retrieve node data, from a node device, wherein the node data is descriptive of at least one characteristic of an execution environment of the node device;
generate a current data set model, wherein the current data set model is descriptive of at least one characteristic of a current data set;
compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set;
in response to detection of a match that meets the similarity threshold between the at least one characteristic described in the current data set model and the at least one characteristic described in the at least one previously generated data set model;
retrieve an indication from a correlation database of at least one previously performed action previously performed on the at least one previously analyzed data set, wherein the at least one previously performed action comprises at least one of normalization, a transform or a task performed on the at least one previously analyzed data set;
select a computer language based on the node data;
generate node instructions, in the selected computer language and based on at least the current data set model, to cause the node device to perform the at least one previously performed action on at least a portion of the current data set; and
transmit the node instructions to the node device;
in response to detection of a lack of a match that meets the similarity threshold between the at least one characteristic described in the current data set model and the at least one characteristic described in the at least one previously generated data set model, present a request for input indicative of a current action to perform on the current data set, wherein the current action comprises at least one of normalization, a transform or a task to be performed on the current data set; and
in response to the detection of a lack of a match that meets the similarity threshold between the at least one characteristic described in the current data set model and the at least one characteristic described in the at least one previously generated data set model:
select a predetermined quantity of previously generated data set models in which the at least one characteristic described in each of the previously generated data set models is more similar to the at least one characteristic described in the current data set model than all other previously generated data set models among multiple previously generated data set models that are included in the correlation database;
for each selected previously generated data set model, retrieve an indication of a corresponding previously performed action previously performed on a corresponding previously analyzed data set correlated to the selected previously generated data set model by the correlation database; and
present the request for input along with a listing of the corresponding previously performed action previously performed on each of the corresponding previously analyzed data sets correlated by the correlation database to one of the selected previously generated data set models in an order based on a degree of similarity in the at least one characteristic of each of the selected previously generated data set models to the at least one characteristic of the current data set model.

9. An apparatus comprising a processor and a storage to store instructions that, when executed by the processor, cause the processor to perform operations comprising:
retrieve node data, from a node device, wherein the node data is descriptive of at least one characteristic of an execution environment of the node device;
generate a current data set model, wherein the current data set model is descriptive of at least one characteristic of a current data set;
compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set;
in response to detection of a match that meets the similarity threshold between the at least one characteristic described in the current data set model and the at least one characteristic described in the at least one previously generated data set model:
retrieve an indication from a correlation database of at least one previously performed action previously performed on the at least one previously analyzed data set, wherein the at least one previously performed action comprises at least one of normalization, a transform or a task performed on the at least one previously analyzed data set;
select a computer language based on the node data;
generate node instructions, in the selected computer language and based on at least the current data set model, to cause the node device to perform the at least one previously performed action on at least a portion of the current data set; and
transmit the node instructions to the node device;
in response to detection of a lack of a match that meets the similarity threshold between the at least one characteristic described in the current data set model and the at least one characteristic described in the at least one previously generated data set model, present a request for input indicative of a current action to perform on the current data set, wherein the current action comprises at least one of normalization, a transform or a task to be performed on the current data set;
retrieve multiple instances of descriptive data from multiple node devices, wherein the multiple node devices comprises the node device, and each instance of descriptive data is descriptive of at least one characteristic of a portion of the current data set that is stored by a corresponding one of the multiple node devices;
combine the multiple instances of descriptive data to generate an annotated metadata, wherein the annotated metadata comprises an indication of at least one of a label by which the current data set is organized, a delimiter used to separate two data items within the current data set, or a format of data item within the current data set; and generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set.

10. The apparatus of claim 9, wherein the processor is caused to perform operations comprising:

retrieve multiple instances of node data from the multiple node devices, wherein the multiple instances of node data comprises the node data retrieved from the node device; and in response to the detection of a match that meets the similarity threshold between the at least one characteristic described in the current data set model and the at least one characteristic described in the at least one previously generated data set model:

select at least one computer language from which to generate multiple instances of node instructions to cause each node device of the multiple node devices to perform the at least one previously performed action on a corresponding portion of the current data set, wherein in the multiple instances of node instructions comprises the node instructions transmitted to the node device; and transmit the multiple instances of node instructions to the multiple node devices.

11. The apparatus of claim 10, wherein the processor is caused to perform operations comprising:

minimize a quantity of instances of the node instructions generated for the multiple node devices by minimizing a quantity of computer languages within the at least one computer language.

12. A computer-program product tangibly embodied in a non-transitory machine-readable storage medium, the computer-program product including instructions operable to cause a processor to perform operations comprising:

retrieve node data, from a node device, wherein the node data is descriptive of at least one characteristic of an execution environment of the node device;

generate a current data set model, wherein the current data set model is descriptive of at least one characteristic of a current data set;

compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set;

in response to detection of a match that meets the similarity threshold between the at least one characteristic described in the current data set model and the at least one characteristic described in the at least one previously generated data set model:

retrieve an indication from a correlation database of at least one previously performed action previously performed on the at least one previously analyzed data set, wherein the at least one previously performed action comprises at least one of normalization, a transform or a task performed on the at least one previously analyzed data set;

select a computer language based on the node data;

generate node instructions, in the selected computer language and based on at least the current data set model, to cause the node device to perform the at least one previously performed action on at least a portion of the current data set; and transmit the node instructions to the node device;

in response to detection of a lack of a match that meets the similarity threshold between the at least one characteristic described in the current data set model and the at least one characteristic described in the at least one previously generated data set model present a request for input indicative of a current action to perform on the current data set, wherein the current action comprises at least one of normalization, a transform or a task to be performed on the current data set;

monitor previously performed actions performed on each previously analyzed data set of the at least one previously analyzed data set;

for each previously analyzed data set of the at least one previously analyzed data set, store previously generated data set model that corresponds to the previously analyzed data set correlated to an indication of a previously performed action performed on the previously analyzed data set in the correlation database;

derive a correlation between the at least one characteristic and the at least one previously performed action from the correlation database; and determine the at least one previously performed action to cause the node device to perform on the current data set based on the correlation.

13. The computer-program product of claim 12, wherein the processor is caused to perform operations comprising:

retrieve a first portion of the current data set from a storage device;

identify at least one characteristic of the first portion to generate first descriptive data descriptive of the at least one characteristic of the portion of the current data set;

retrieve, from the node device, second descriptive data that is descriptive of at least one characteristic of a second portion of the current data set stored by the node device;

combine at least the first and second descriptive data to generate an annotated metadata, wherein the annotated metadata comprises an indication of at least one of a label by which the current data set is organized, a delimiter used to separate two data items within the current data set, or a format of a data item within the current data set; and generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set.

14. The computer-program product of claim 13, wherein the processor, in response to the detection of a match that meets the similarity threshold between the at least one characteristic described in the current data set model and the at least one characteristic described in the at least one previously generated data set model, is caused to perform operations comprising:

selecting at least one computer language from which to generate multiple instances of node instructions to cause at least the processor to perform the previously performed action on the first portion of the current data set and to cause the node device to perform the previously performed action on the second portion of the current data set, wherein in the multiple instances of node instructions comprises the node instructions transmitted to the node device.

15. The computer-program product of claim 12, wherein the processor is caused to visually present the request on a display and monitor an input device for receipt of the requested input.

16. The computer-program product of claim 12, wherein the node data comprises an indication of at least one of a processor type of the node device, a quantity of storage space within the node device, a type of operating system executed by the node device, a type of language interpreter executed by the node device, or a configuration setting of the node device.

17. The computer-program product of claim 12, wherein the task performed on the at least one previously analyzed data set comprises at least one of a region-specific normalization, an industry-specific transform, a statistical analysis, or an aggregation of results of multiple statistical analyses.

18. A computer-program product tangibly embodied in a non-transitory machine-readable storage medium, the computer-program product including instructions operable to cause a processor to perform operations comprising:
retrieve node data, from a node device, wherein the node data is descriptive of at least one characteristic of an execution environment of the node device;
generate a current data set model, wherein the current data set model is descriptive of at least one characteristic of a current data set;
compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set;
in response to detection of a match that meets the similarity threshold between the at least one characteristic described in the current data set model and the at least one characteristic described in the at least one previously generated data set model:
retrieve an indication from a correlation database of at least one previously performed action previously performed on the at least one previously analyzed data set, wherein the at least one previously performed action comprises at least one of normalization, a transform or a task performed on the at least one previously analyzed data set;
select a computer language based on the node data;
generate node instructions, in the selected computer language and based on at least the current data set model, to cause the node device to perform the at least one previously performed action on at least a portion of the current data set; and
transmit the node instructions to the node device;
in response to detection of a lack of a match that meets the similarity threshold between the at least one characteristic described in the current data set model and the at least one characteristic described in the at least one previously generated data set model present a request for input indicative of a current action to perform on the current data set, wherein the current action comprises at least one of normalization, a transform or a task to be performed on the current data set; and
in response to the detection of a lack of a match that meets the similarity threshold between the at least one char-
acteristic described in the current data set model and the at least one characteristic described in the at least one previously generated data set model, is caused to perform operations comprising:
select a predetermined quantity of previously generated data set models in which the at least one characteristic described in each of the previously generated data set models is more similar to the at least one characteristic described in the current data set model than all other previously generated data set models among multiple previously generated data set models that are included in the correlation database;
for each selected previously generated data set model, retrieve an indication of a corresponding previously performed action previously performed on a corresponding previously analyzed data set correlated to the selected previously generated data set model by the correlation database; and
present the request for input along with a listing of the corresponding previously performed action previously performed on each of the corresponding previously analyzed data sets correlated by the correlation database to one of the selected previously generated data set models in an order based on a degree of similarity in the at least one characteristic of each of the selected previously generated data set models to the at least one characteristic of the current data set model.

19. A computer-program product tangibly embodied in a non-transitory machine-readable storage medium, the computer-program product including instructions operable to cause a processor to perform operations comprising:
retrieve node data, from a node device, wherein the node data is descriptive of at least one characteristic of an execution environment of the node device;
generate a current data set model, wherein the current data set model is descriptive of at least one characteristic of a current data set;
compare the current data set model to at least one previously generated data set model of at least one previously analyzed data set to detect a match in the at least one characteristic that meets a similarity threshold, wherein the at least one previously generated data set model is descriptive of the at least one characteristic of the at least one previously analyzed data set;
in response to detection of a match that meets the similarity threshold between the at least one characteristic described in the current data set model and the at least one characteristic described in the at least one previously generated data set model:
retrieve an indication from a correlation database of at least one previously performed action previously performed on the at least one previously analyzed data set, wherein the at least one previously performed action comprises at least one of normalization, a transform or a task performed on the at least one previously analyzed data set;
select a computer language based on the node data;
generate node instructions, in the selected computer language and based on at least the current data set model, to cause the node device to perform the at least one previously performed action on at least a portion of the current data set; and
transmit the node instructions to the node device;
in response to detection of a lack of a match that meets the similarity threshold between the at least one characteristic described in the current data set model and the at least one characteristic described in the at least one previously generated data set model present a request for input indicative of a current action to perform on the current data set, wherein the current action comprises at least one of normalization, a transform or a task to be performed on the current data set;
retrieve multiple instances of descriptive data from multiple node devices, wherein the multiple node devices comprises the node device, and each instance of descriptive data is descriptive of at least one characteristic of a portion of the current data set that is stored by a corresponding one of the multiple node devices;
combine the multiple instances of descriptive data to generate an annotated metadata, wherein the annotated metadata comprises an indication of at least one of a label by which the current data set is organized, a delimiter used to separate two data items within the current data set, or a format of data item within the current data set; and
generate the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set.

20. The computer-program product of claim 19, wherein the processor is caused to perform operations comprising:
retrieve multiple instances of node data from the multiple node devices, wherein the multiple instances of node data comprises the node data retrieved from the node device; and
in response to the detection of a match that meets the similarity threshold between the at least one characteristic described in the current data set model and the at least one characteristic described in the at least one previously generated data set model:
select at least one computer language from which to generate multiple instances of node instructions to cause each node device of the multiple node devices to perform the at least one previously performed action on a corresponding portion of the current data set, wherein in the multiple instances of node instructions comprises the node instructions transmitted to the node device; and
transmit the multiple instances of node instructions to the multiple node devices.

21. The computer-program product of claim 20, wherein the processor is caused to perform operations comprising:
minimize a quantity of instances of the node instructions generated for the multiple node devices by minimizing a quantity of computer languages within the at least one computer language.

22. A computer-implemented method comprising:
retrieving node data, from a node device, wherein the node data is descriptive of at least one characteristic of an execution environment of the node device;
generating a current data set model, at a coordinating device, wherein the current data set model is descriptive of at least one characteristic of a current data set;
comparing the current data set model to at least one previously generated data set model of at least one previously analyzed data set to detect a match in the at least one characteristic that meets a similarity threshold, wherein the at least one previously generated data set model is descriptive the of at least one characteristic of the at least one previously analyzed data set;
in response to detection of a match that meets the similarity threshold between the at least one characteristic described in the current data set model and the at least one characteristic described in the at least one previously generated data set model:
retrieving an indication from a correlation database of at least one previously performed action previously performed on the at least one previously analyzed data set, wherein the at least one previously performed action comprises at least one of normalization, a transform or a task performed on the at least one previously analyzed data set;
selecting a computer language based on the node data;
generating, at the coordinating device, node instructions, in the selected computer language and based on at least the current data set model, to cause the node device to perform the at least one previously performed action on at least a portion of the current data set; and
transmitting the node instructions to the node device;
monitoring previously performed actions performed on each previously analyzed data set of the at least one previously analyzed data set;
for each previously analyzed data set of the at least one previously analyzed data set, storing previously generated data set model that corresponds to the previously analyzed data set correlated to an indication of a previously performed action performed on the previously analyzed data set in the correlation database;
deriving a correlation between the at least one characteristic and the at least one previously performed action from the correlation database; and
determining the at least one previously performed action to cause the node device to perform on the current data set based on the correlation.

23. The computer-implemented method of claim 22, comprising:
retrieving a first portion of the current data set from a storage device;
identifying at least one characteristic of the first portion to generate first descriptive data descriptive of the at least one characteristic of the portion of the current data set;
retrieving, from the node device, second descriptive data that is descriptive of at least one characteristic of a second portion of the current data set stored by the node device;
combining at least the first and second descriptive data to generate an annotated metadata, wherein the annotated metadata comprises an indication of at least one of a label by which the current data set is organized, a delimiter used to separate two data items within the current data set, or a format of a data item within the current data set; and
generating, at the coordinating device, the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set.

24. The computer-implemented method of claim 23, comprising, in response to the detection of a match that meets the similarity threshold between the at least one characteristic described in the current data set model and the at least one characteristic described in the at least one previously generated data set model:

selecting at least one computer language from which to generate multiple instances of node instructions to cause at least the coordinating device to perform the previously performed action on the first portion of the current data set and to cause the node device to perform the previously performed action on the second portion of the current data set, wherein in the multiple instances of node instructions comprises the node instructions transmitted to the node device.

25. The computer-implemented method of claim 22, wherein the node data comprises an indication of at least one of a processor type of the node device, a quantity of storage space within the node device, a type of operating system executed by the node device, a type of language interpreter executed by the node device, or a configuration setting of the node device.

26. The computer-implemented method of claim 22, wherein the computer language is selected from a group consisting of a programming language, a scripting language, a database query language and a machine language.

27. The computer-implemented method of claim 22, comprising:
visually presenting the request on a display; and
monitoring an input device for receipt of the requested input.

28. A computer-implemented method comprising:
retrieving node data, from a node device, wherein the node data is descriptive of at least one characteristic of an execution environment of the node device:
generating a current data set model, at a coordinating device, wherein the current data set model is descriptive of at least one characteristic of a current data set;
comparing the current data set model to at least one previously generated data set model of at least one previously analyzed data set to detect a match in the at least one characteristic that meets a similarity threshold, wherein the at least one previously generated data set model is descriptive the of at least one characteristic of the at least one previously analyzed data set;
in response to detection of a match that meets the similarity threshold between the at least one characteristic described in the current data set model and the at least one characteristic described in the at least one previously generated data set model:
retrieving an indication from a correlation database of at least one previously performed action previously performed on the at least one previously analyzed data set, wherein the at least one previously performed action comprises at least one of normalization, a transform or a task performed on the at least one previously analyzed data set;
selecting a computer language based on the node data;
generating, at the coordinating device, node instructions, in the selected computer language and based on at least the current data set model, to cause the node device to perform the at least one previously performed action on at least a portion of the current data set; and
transmitting the node instructions to the node device;
retrieving multiple instances of descriptive data from multiple node devices, wherein the multiple node devices comprises the node device, and each instance of descriptive data is descriptive of at least one characteristic of a portion of the current data set that is stored by a corresponding one of the multiple node devices;
combining the multiple instances of descriptive data to generate an annotated metadata, wherein the annotated metadata comprises an indication of at least one of a label by which the current data set is organized, a delimiter used to separate two data items within the current data set, or a format of a data item within the current data set; and
generating, at the coordinating device, the current data set model from the annotated metadata, wherein the at least one characteristic of the current data set comprises at least one of a quantity of rows into which the current data set is organized, a quantity of data items that employ a specified format, a degree of sparseness of the current data set, or a degree of cardinality of the current data set.

29. The computer-implemented method of claim 28, comprising:
retrieving multiple instances of node data from the multiple node devices, wherein the multiple instances of node data comprises the node data retrieved from the node device; and
in response to the detection of a match that meets the similarity threshold between the at least one characteristic described in the current data set model and the at least one characteristic described in the at least one previously generated data set model:
selecting at least one computer language from which to generate multiple instances of node instructions to cause each node device of the multiple node devices to perform the at least one previously performed action on a corresponding portion of the current data set, wherein in the multiple instances of node instructions comprises the node instructions transmitted to the node device; and
transmitting the multiple instances of node instructions to the multiple node devices.

30. The computer-implemented method of claim 29, wherein selecting the computer language comprises minimizing a quantity of instances of the node instructions generated for the multiple node devices by minimizing a quantity of computer languages within the at least one computer language.

* * * * *